United States Patent [19]
Itoh et al.

[11] Patent Number: 6,082,480
[45] Date of Patent: Jul. 4, 2000

[54] ROTATION TRANSMISSION DEVICE

[75] Inventors: Kenichiro Itoh, Iwata-gun; Makoto Yasui, Kakegawa; Shiro Goto, Iwata, all of Japan

[73] Assignee: NTN Corporation, Osaka, Japan

[21] Appl. No.: 09/318,836

[22] Filed: May 26, 1999

Related U.S. Application Data

[62] Division of application No. 08/873,299, Jun. 11, 1997, Pat. No. 5,924,510.

[51] Int. Cl.⁷ .................................................. B60K 23/08
[52] U.S. Cl. ............................................. 180/247; 180/249
[58] Field of Search ..................................... 180/233, 197, 180/247–249; 303/20, 122.06, 138, 143, 199; 364/424.08, 424.94, 424.098, 424.096; 477/176, 180

[56] References Cited

U.S. PATENT DOCUMENTS

| | | |
|---|---|---|
| 5,620,072 | 4/1997 | Engle . |
| 5,651,749 | 7/1997 | Wilson et al. . |

FOREIGN PATENT DOCUMENTS

| | | |
|---|---|---|
| 6-17853 | 1/1994 | Japan . |
| 6-33957 | 2/1994 | Japan . |

*Primary Examiner*—Christopher P. Schwartz
*Assistant Examiner*—C. T. Bartz
*Attorney, Agent, or Firm*—Wenderoth, Lind & Ponack, L.L.P

[57] ABSTRACT

A rotation transmission device is mounted in a drive train of a four-wheel drive vehicle to selectively distribute driving force to selected vehicle wheels according to the travel condition of the vehicle. This device includes an outer ring and an input shaft. A cylindrical face is formed on one of the opposed surfaces of the outer ring and the input shaft, while cam faces are formed on the other opposed surface to define a wedge-shaped space between the cylindrical face and each cam face. Rollers are mounted in pockets formed in a retainer mounted between the input shaft and the outer ring. An electromagnetic clutch is coupled to the retainer. A switch spring is mounted between the retainer and the input shaft. A two-way clutch is provided between the outer ring and the input shaft. A control unit controls the two-way clutch by adjusting the amount of current fed through a coil of the electromagnetic clutch according to the travel condition of the vehicle, thus selectively distributing driving force to selected vehicle wheels. A method of controlling the rotation transmission device is also proposed. Also, another transmission device is proposed which is mounted in the transfer of a vehicle.

24 Claims, 53 Drawing Sheets

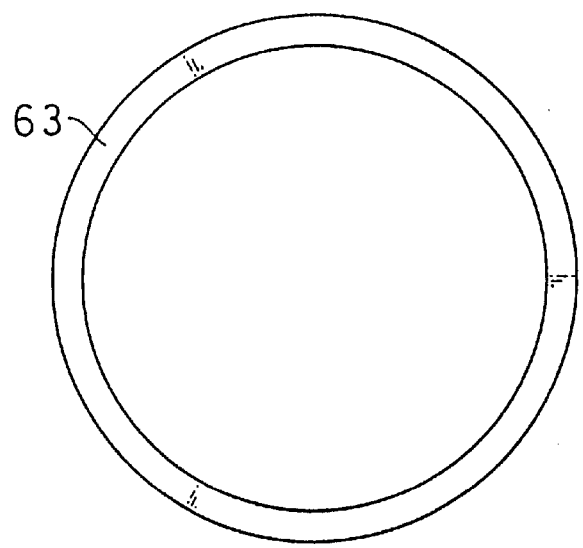
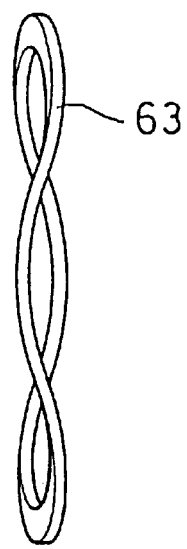
FIG.16A  FIG.16B
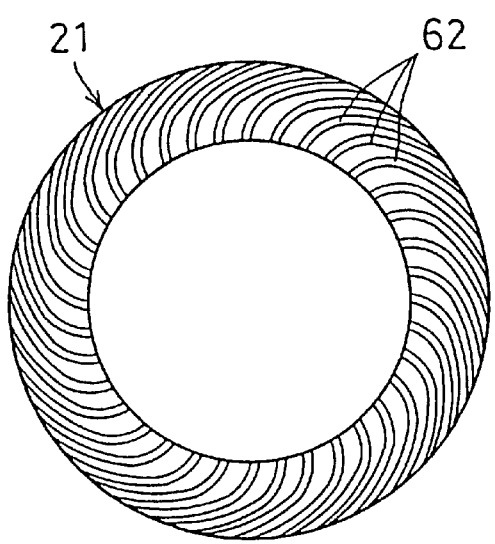
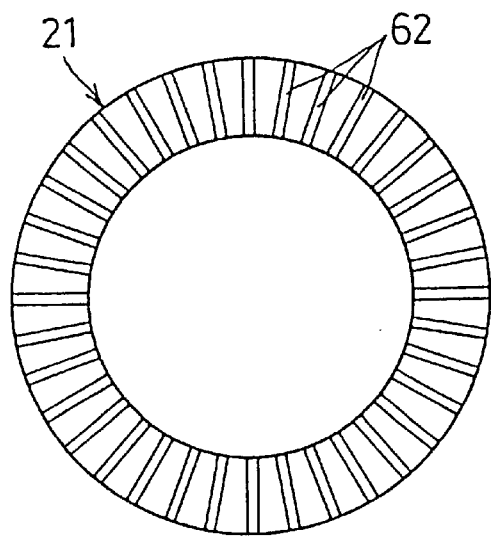
FIG.17A  FIG.17B

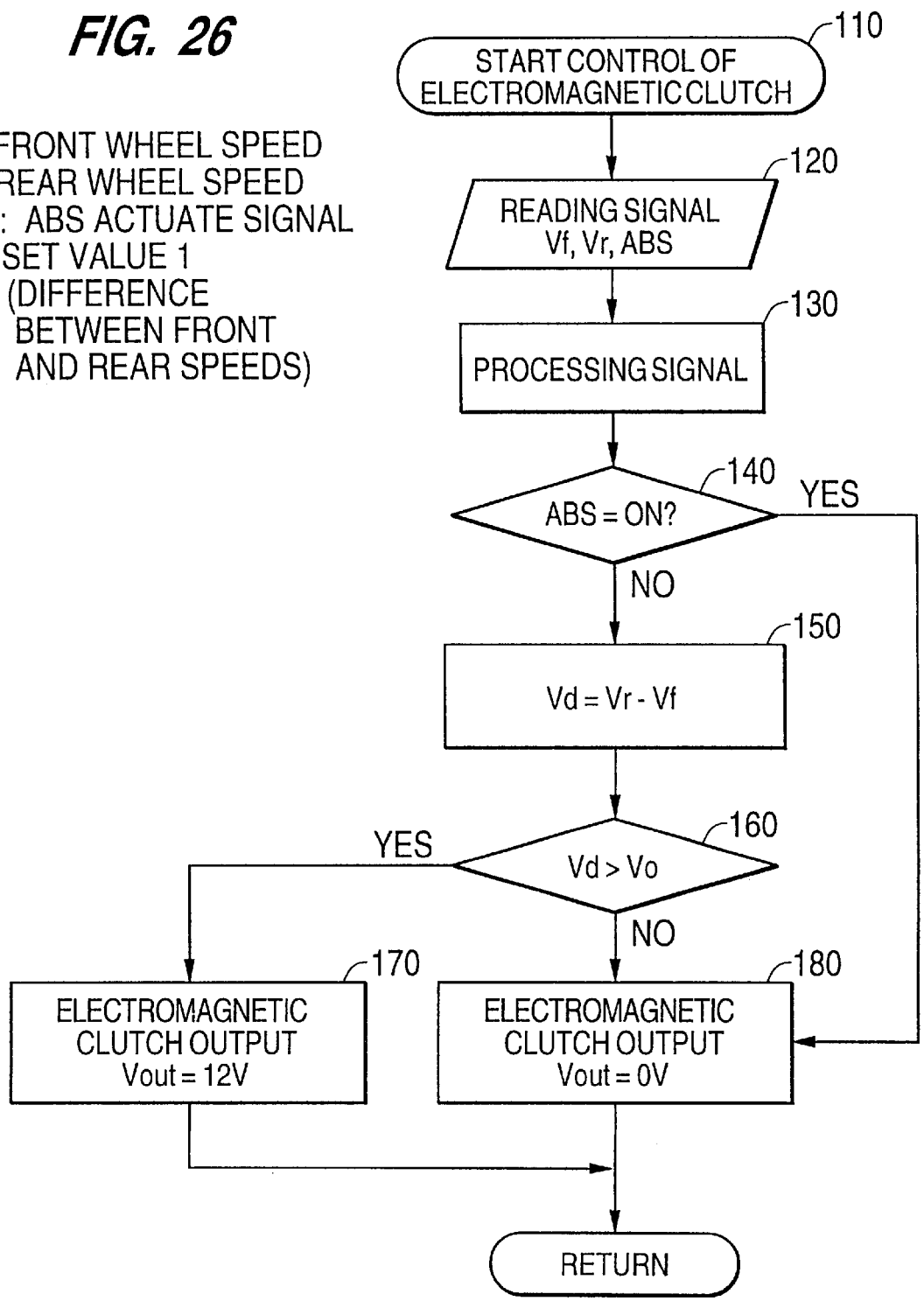

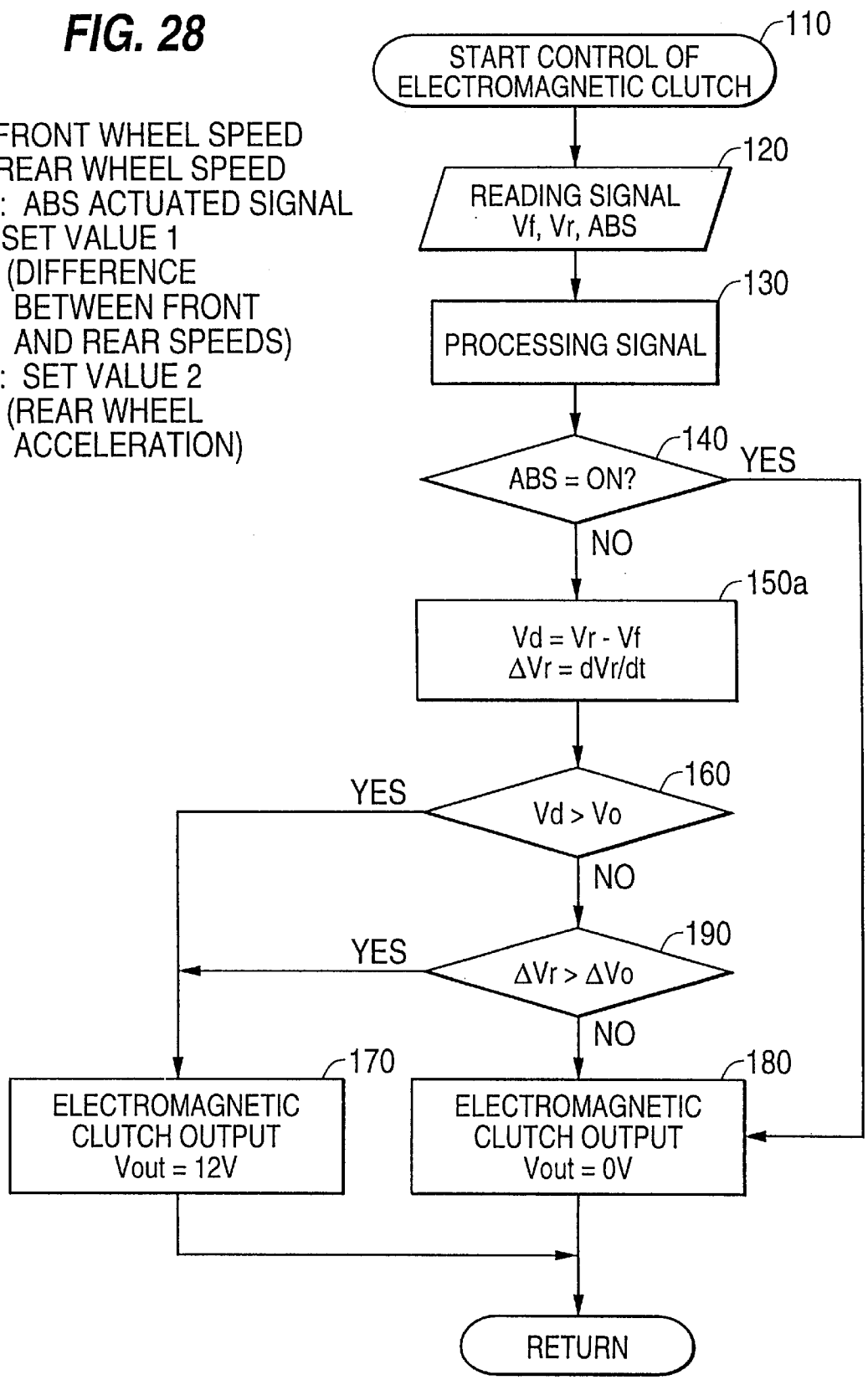

Acceleration on low-$\mu$ road

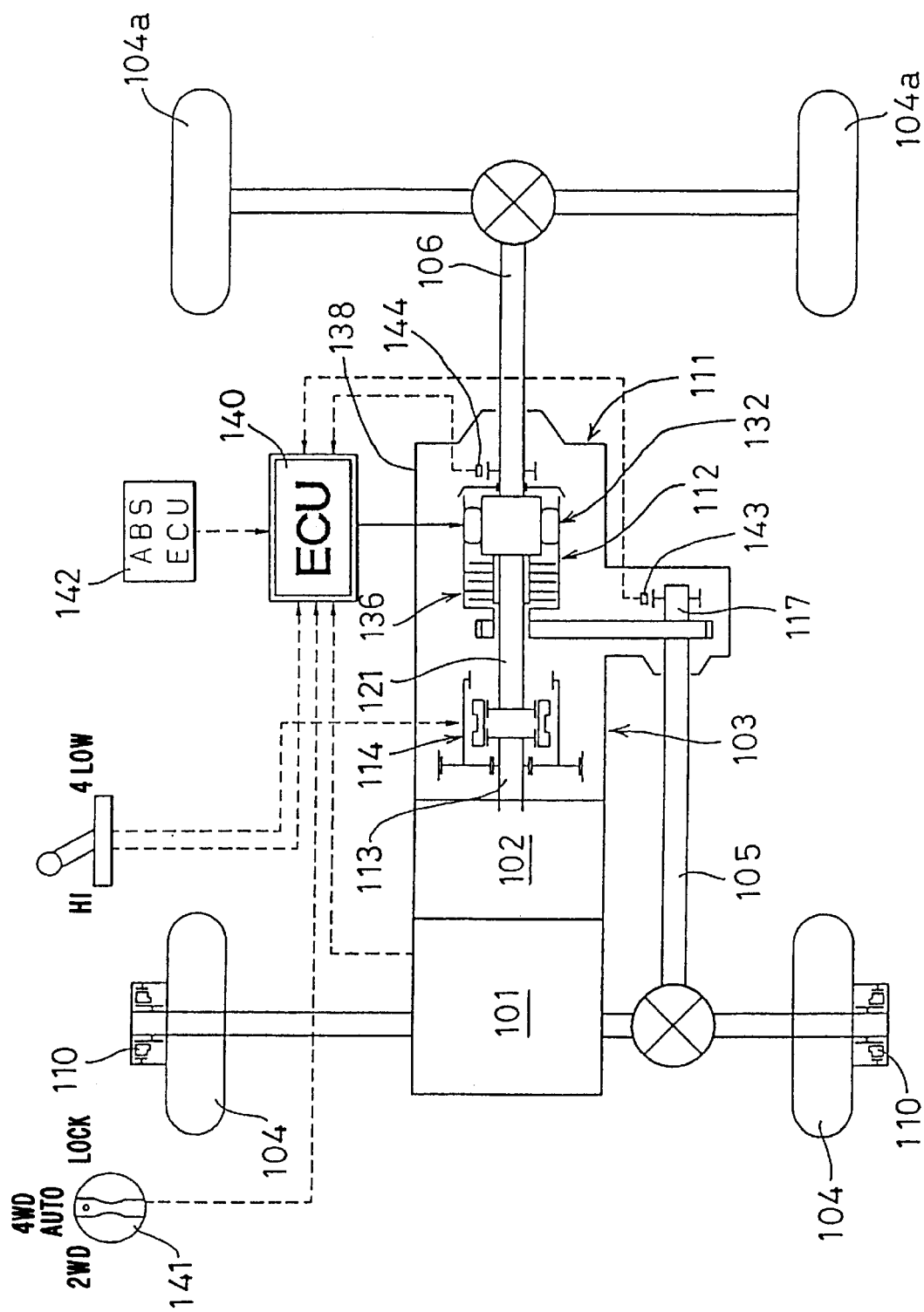

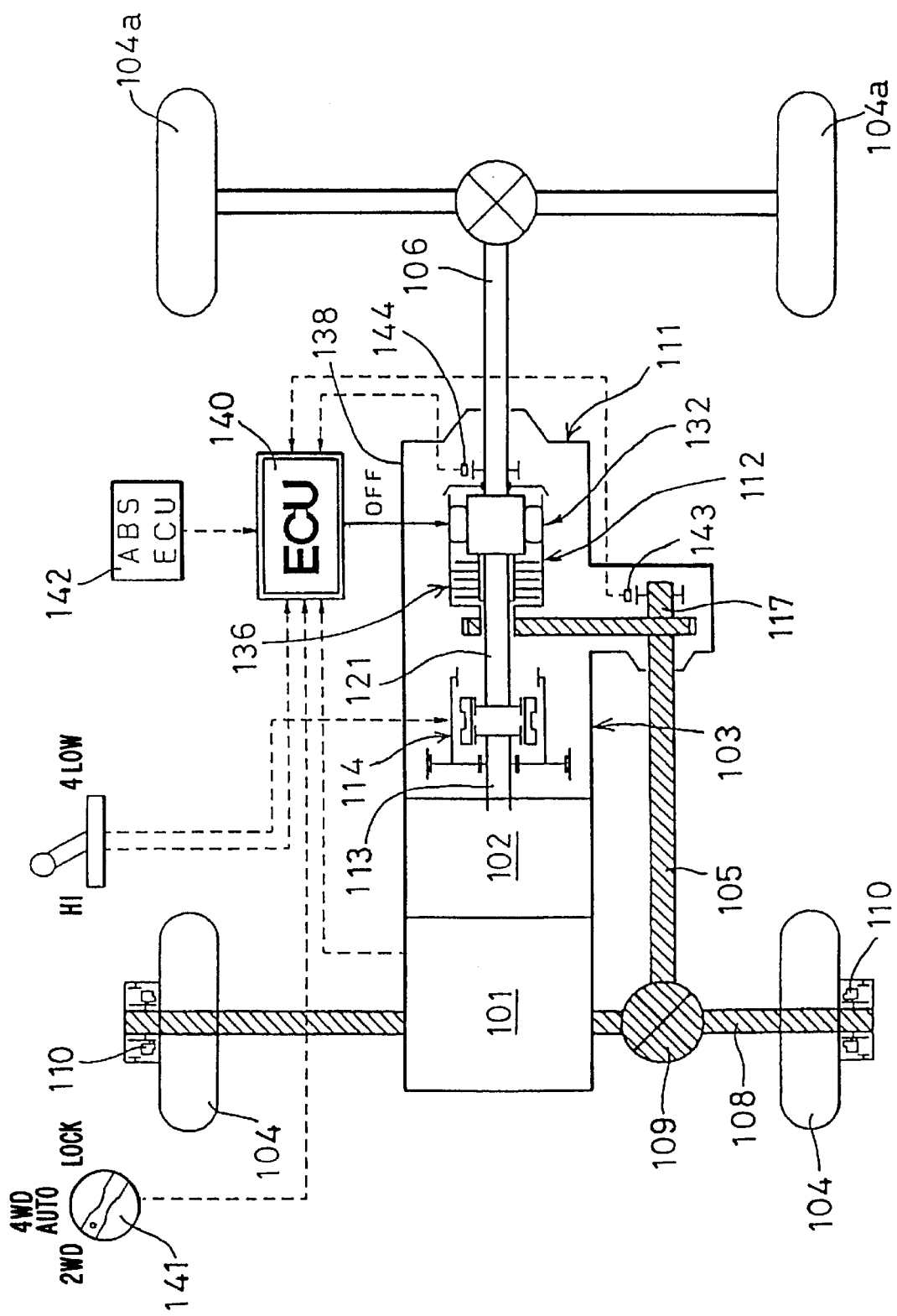

Vf: FRONT WHEEL SPEED
Vr: REAR WHEEL SPEED
Do: SET VALUE 1
 (DIFFERENCE
 BETWEEN FRONT
 AND REAR SPEEDS)

ROTATION TRANSMISSION DEVICE

This is divisional application of Ser. No. 08/873,299, filed Jun. 11, 1997, now U.S. Pat. No. 5,924,510.

BACKGROUND OF THE INVENTION

This invention relates to a rotation transmission device for transmitting driving force in a four-wheel drive vehicle, and more specifically a device mounted in the drive train of a four-wheel drive vehicle for selectively transmitting the driving force.

When a four-wheel drive vehicle (hereinafter 4WD) turns a tight corner with the four wheels coupled together on a paved road, the vehicle may experience what is known as "tight corner braking effect". To solve this problem, the applicant of this invention proposed a rotation transmission device having sprags or rollers as engaging elements in Japanese patent publications 6-17853 and 6-33957.

These devices are two-way driving units having a retainer moveable to one of two positions according to the direction of rotation. In either of the two positions, the engaging elements engage the inner and outer rings. Either of them may be mounted on the front wheel propeller shaft of a 4WD as shown in FIG. 25. If one of the rear wheels slip when the vehicle accelerates, the rotating speed of the input shaft will increase, so that the engaging elements will engage. The drive mode thus changes to four-wheel drive position. While the vehicle beings turning a corner, the front wheels (output shaft) begin rotating faster than the rear wheels. This disengages the engaging elements of the rotation transmission device, allowing freewheeling of the input shaft and the output shaft. Thus, no tight corner braking effect will occur.

During engine braking, the engine force decelerates the input shaft of the rotation transmission device, so that the input shaft and the output shaft are disconnected from each other. This means that the engine braking force is not transmitted to the front wheels. That is, the engine brake is applied only to the rear wheels. Thus, if strong engine brake is applied while the vehicle is traveling on a low-friction-coefficient road such as a sno-covered road, the rear wheels may lock up and lose grip of the road surface, thus destabilizing the vehicle. In an extreme case, the vehicle may spin.

Also, suppose the 4WD equipped with the device proposed in either of the above publications is further provided with an ABS (antilock braking system). Generally speaking, stronger braking force is distributed to the front wheels than to the rear wheels, so that the front wheels tend to lock up before the rear wheels.

When the front wheels begin to lock, the output shaft (connected to the front wheels) are decelerated quickly, so that the engaging elements engage. The input shaft is thus decelerated together with the output shaft, so that the rear wheels are locked simultaneously with the front wheels. Since all the wheels are locked, the ABS cannot detect that the wheels are locked because it cannot detect speed differences between the front wheels and the rear wheels.

An object of this invention is to provide a rotation transmission device which transmits driving force for rotation in either direction, which can prevent tight corner braking torque to the front wheels as well as to the rear wheels, and which can idle in either direction while the ABS is on.

Another object is to provide a method for controlling such a rotation transmission device.

SUMMARY OF THE INVENTION

According to the invention there is provided a rotation transmission device which includes an outer ring and an inner member mounted in the outer ring. The outer ring and the inner member have opposed inner and outer surfaces, respectively, with one of the opposed surfaces being a cylindrical face and the other being formed with a plurality of cam faces that from wedge-shaped spaces in cooperation with the cylindrical face. A retainer having several pockets is mounted between the opposed surfaces of the outer ring and the inner member. A roller is received in each pocket and is adapted to come into wedging engagement between the outer ring and the inner member when the outer ring and the inner member rotate relative to each other. The retainer is coupled with one of the outer ring and the inner member and the two are rotatable together with a gap left therebetween in the direction of rotation, whereby the retainer and the one of the outer ring and the inner member are rotatable relative to each other within the range of the gap. A resilient member is mounted between the retainer and one of the outer ring and the inner member for keeping the rollers in a neutral position, in which the rollers are disengaged. An armature is axially moveably mounted to one end of the retainer so as to be nonrotatable relative to the retainer. A friction member is mounted between the outer ring and the inner member and fixed to one of the inner member and the outer ring. An electromagnet is mounted between and the outer ring and the inner member for attracting the armature.

Also, according to the invention there is provided a rotation transmission device which includes an outer ring and an inner member mounted in the outer ring. The outer ring and the inner member have opposed inner and outer surfaces, respectively, with one of the opposed surfaces being a cylindrical face and the other being formed with a plurality of cam faces that form wedge-shaped spaces in cooperation with the cylindrical face. A retainer having several pockets is mounted between the opposed surfaces of the outer ring and the inner member. A roller is received in each pocket and is adapted to come into wedging engagement between the outer ring and the inner member when the outer ring and the inner member rotate relative to each other. The retainer is coupled with one of the outer ring and the inner member and the two are rotatable together with a gap left therebetween in the direction of rotation, whereby the retainer and the one of the outer ring and the inner ring are rotatable relative to each other within the range of the gap. A resilient member is mounted between the retainer and one of the outer ring and the inner member for keeping the rollers in a neutral position, in which the rollers are disengaged. An armature is also included as part of the invention. A friction member is mounted between the outer ring and the inner member and is fixed to the outer ring. An electromagnet is mounted between the outer ring and the inner member for attracting the armature. The armature is nonrotatably coupled to the friction member. A clutch plate is mounted between the armature and the friction member so as to be slidable but nonrotatable to the retainer.

Also, according to the invention there is provided a rotation transmission device which includes an outer ring and an inner member mounted in the outer ring. The outer ring and the inner ring have opposed inner and outer surfaces, respectively, with one of the opposed surfaces being a cylindrical face and the other being formed with a plurality of cam faces that form wedge-shaped spaces in cooperation with the cylindrical face. A retainer having several pockets is mounted between the opposed surfaces of the outer ring and the inner member. A roller is received in each pocket and is adapted to come into wedging engagement between the outer ring and the inner member when the outer ring and the inner member when the outer ring and the inner member rotate relative to each other. The retainer is coupled with one of the outer ring and the inner member and the two are rotatable together with a gap left therebetween in the direction of rotation, whereby the retainer and the one of said outer ring and the inner ring between rotatable relative to each other within the range of the gap. A resilient member is mounted between said retainer and oine of the outer ring and the inner ring for keeping the rollers in a neutral position, in which the rollers are disengaged. An electromagnet and a friction member are mounted between the outer ring and the inner member. The electromagnet is for attracting the armature, and the friction member is fixed to the inner member. The armature is nonrotatably coupled to the friction member. A clutch plate is mounted between the armature and the friction member and is nonrotatably but slidably coupled to the retainer.

BRIEF DESCRIPTION OF THE DRAWINGS

Other features and objects of the present invention will become apparent from the following description made with reference to the accompanying drawings, in which:

FIG. 16A is a front view of a wave washer;

FIG. 16B us a side view of the wave washer of FIG. 16A;

FIGS. 17A and 17B are front views of a sixth embodiment, in which an armature or a rotor has grooves;

FIG. 26 is a flowchart showing a first method for controlling the rotation transmission device according to the present invention;

FIG. 28 is a flowchart showing a second method for controlling the rotation transmission device according to the present invention;

FIG. 30 is a plan view showing the layout of a 4WD vehicle on which is mounted a rotation transmission device of the fourteenth embodiment of this invention;

FIG. 35 is a plan view while the 4WD vehicle is traveling in the 2WD mode;

DETAILED DESCRIPTION OF THE PREFERRED EMBODIMENT

Figure 1:
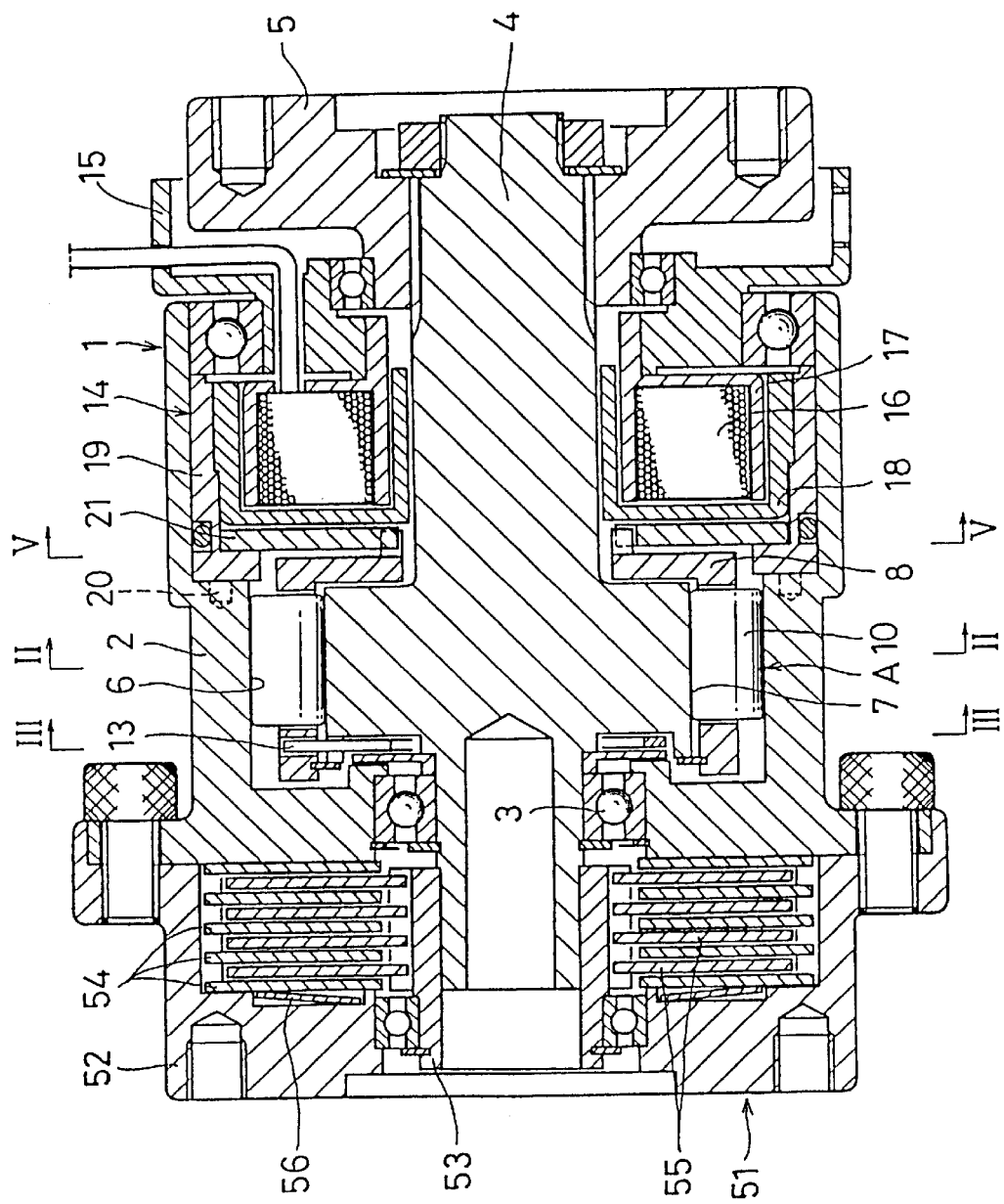
FIG. 1 is a vertical sectional view of a first embodiment of the present invention.

Embodiments of this invention will now be described with reference to the drawings.

First Embodiment

Referring first to FIGS. 1–6, a rotation transmission device 1 of a first embodiment includes a driven member or outer ring 2, an input shaft 4 inserted in the outer ring 2 and rotatably supported by a bearing 3, a two-way clutch A mounted between the outer ring 2 and the input shaft 4, and an input ring 5 coupled to one end of the input shaft 4 by a spline.

The two-way clutch A includes a cylindrical surface 6 formed on the inner periphery of the outer ring 2, and a plurality of flat cam surfaces 7 formed on the outer periphery of a large-diameter portion of the input shaft 4, and spaced a predetermined distance from one another. Each cam surface 7 forms a wedge-like space narrow at both ends in cooperation with the cylindrical surface 6 of the outer ring 2.

The clutch A further includes an annular retainer 8 fitted on the large-diameter portion of the input shaft 4 and formed with as many circumferentially arranged pockets 9 (FIG. 2) as cam surfaces 7. Clutch A also includes engaging elements or rollers 10 received in the respective pockets 9, opposite to the respective cam surfaces 7 on the input shaft 4. When the rollers 10 are circumferentially moved a predetermined distance by the retainer 8, they will engage the cam surfaces 7 and the cylindrical surface 6, interlocking the outer ring 2 and the input shaft 4.

Figure 3:
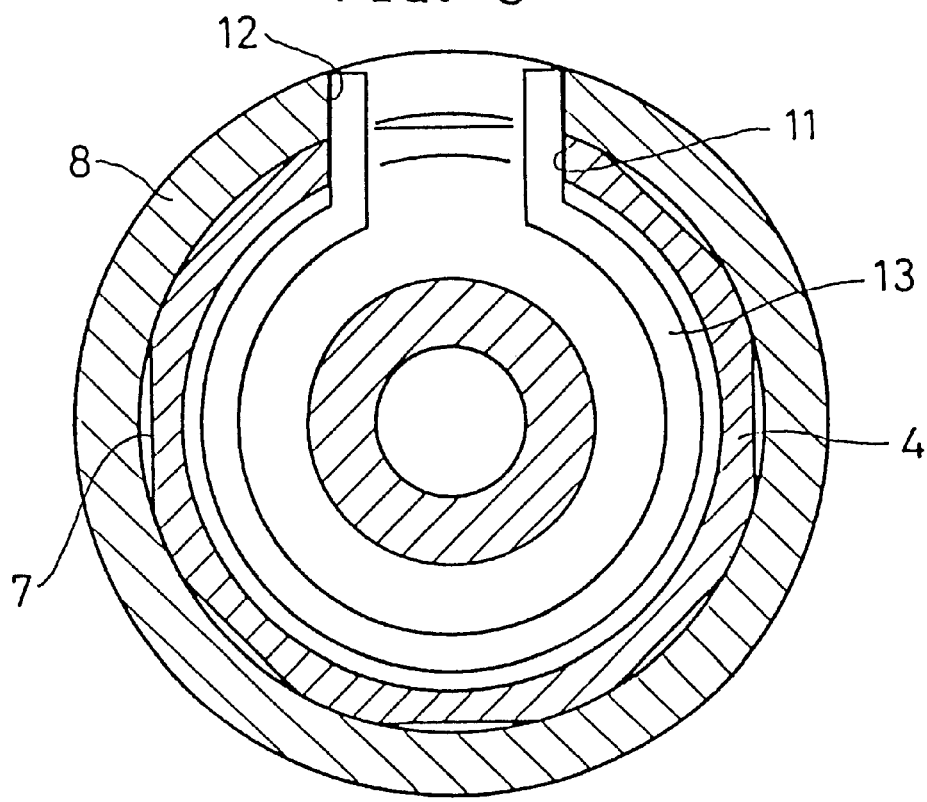
FIG. 3 is a sectional view taken along line III—III of FIG. 1.

As shown in FIG. 3, the retainer 8 and the input shaft 4 are formed with cutouts 11 and 12, respectively. A resilient member or switch spring 13 is mounted in a contracted state with its ends fitted in the cutouts 11, 12.

Figure 2:
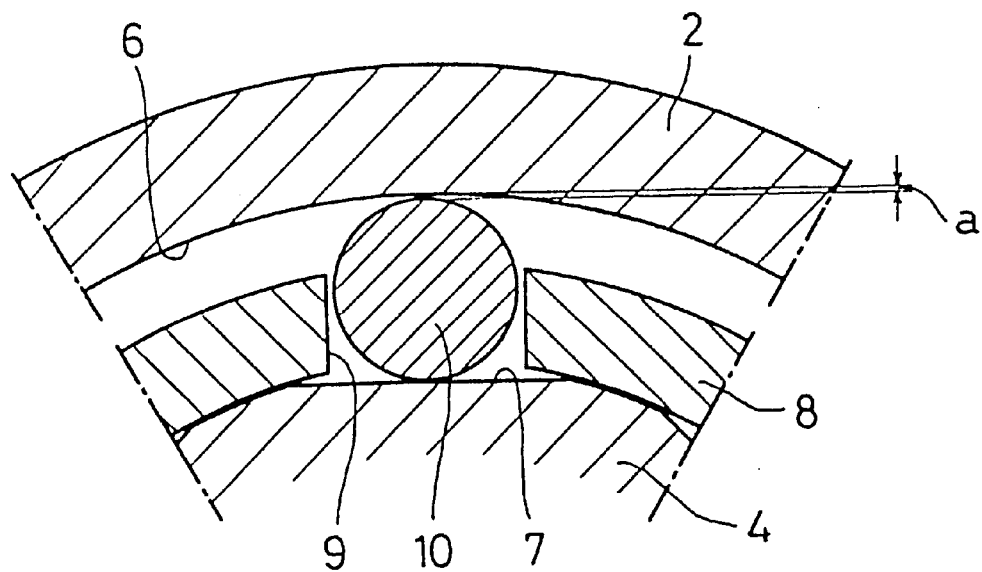
FIG. 2 is an enlarged sectional view taken along line II—II of FIG. 1.

When the cutouts 11 and 12 are in alignment with each other, the cam surfaces 7 on the input shaft 4, the pockets 9 of the retainer 8, and the rollers 10 are positioned relative to each other as shown in FIG. 2. In this state, there exists a gap a between each roller 10 and the outer ring 2. While the switch spring 13 is set, the input shaft 4 and the outer ring 2 are disengaged from each other in a "neutral standby position".

As shown in FIG. 1, an electromagnetic clutch 14 is mounted between the input shaft 4 and the outer ring 2. It includes a fixed member 15 partially protruding from one end of the outer ring 2, a field core 17 nonrotatably press-fitted in the fixed member 15, an electromagnet 16 housed in the field core 17, a rotor 18 rotatably mounted around the field core 17 and nonrotatably press-fitted in a rotor guide 19. The rotor guide 19 is nonrotatably coupled to the outer ring 2 by pins 20.

The field core 17 is non-rotatably coupled to the fixed member 15 and is thus a stationary member. The rotor guide 19 and the rotor 18 are nonrotatable relative to the outer ring 2. The rotor 18 serves as a friction member fixed to the outer ring 2.

An armature 21 is mounted between the opposed ends of the rotor 18 and the retainer 8. As shown in FIG. 5, the armature 21 has protrusions 22 formed in its inner periphery which engage in cutouts 23 formed in the retainer 8. The armature 21 is thus nonrotatable, though axially movable, relative to the retainer 8. The thickness of the armature 21 is so set that a gap b (FIG. 4) is defined between the opposed surfaces of the armature 21 and the rotor 18. Thus the armature 21 and the rotor 18 can rotate relative to each other.

To summarize the above-described structure, the rotor 18 is fixedly coupled to the outer ring 2 via the rotor guide 19, while the armature 21 is fixedly coupled to the input shaft 4 through the retainer 8 and the switch spring 13.

A multiple-disc friction clutch 51 is coupled to the outer ring 2 of the rotation transmission device 1. The multiple-disc friction clutch 51 includes a housing 52 bolted to one end of the outer ring 2, an inner ring 53 fixedly mounted on the input shaft 4, a plurality of outer plates 54 and inner plates 55 alternately mounted between the housing 52 and the inner ring 53 so as to be axially movable but nonrotatable relative to the housing 52 and the inner ring 53, respectively, and a resilient member 56 mounted in a compressed state to axially bias the plates 54 and 55 against each other.

While a current is not flowing through the electromagnet 16, the rollers between the input shaft 4 and the outer ring 2 are not locked, so that the input shaft 4 and the outer ring 2 are rotatable relative to each other. But even in this state, torque is transmitted between the input shaft 4 and the outer ring 2 through the multiple-disc friction clutch 51.

Thus, even when torque cannot be directly transmitted from the input shaft to the outer ring (and thus to sub-traction wheels) through the two-way clutch because the wheel speeds are changing at a rate which is so moderate and the vehicle acceleration is so small (such as during engine braking) that the control unit cannot determine that any wheel is slipping and thus the rollers of the two-way clutch are not locked, torque is still indirectly transmitted from the input shaft to the outer ring (and to the sub-traction wheels) through the multiple-disc clutch 51, thus stabilizing the vehicle behavior during engine braking.

Figure 25:
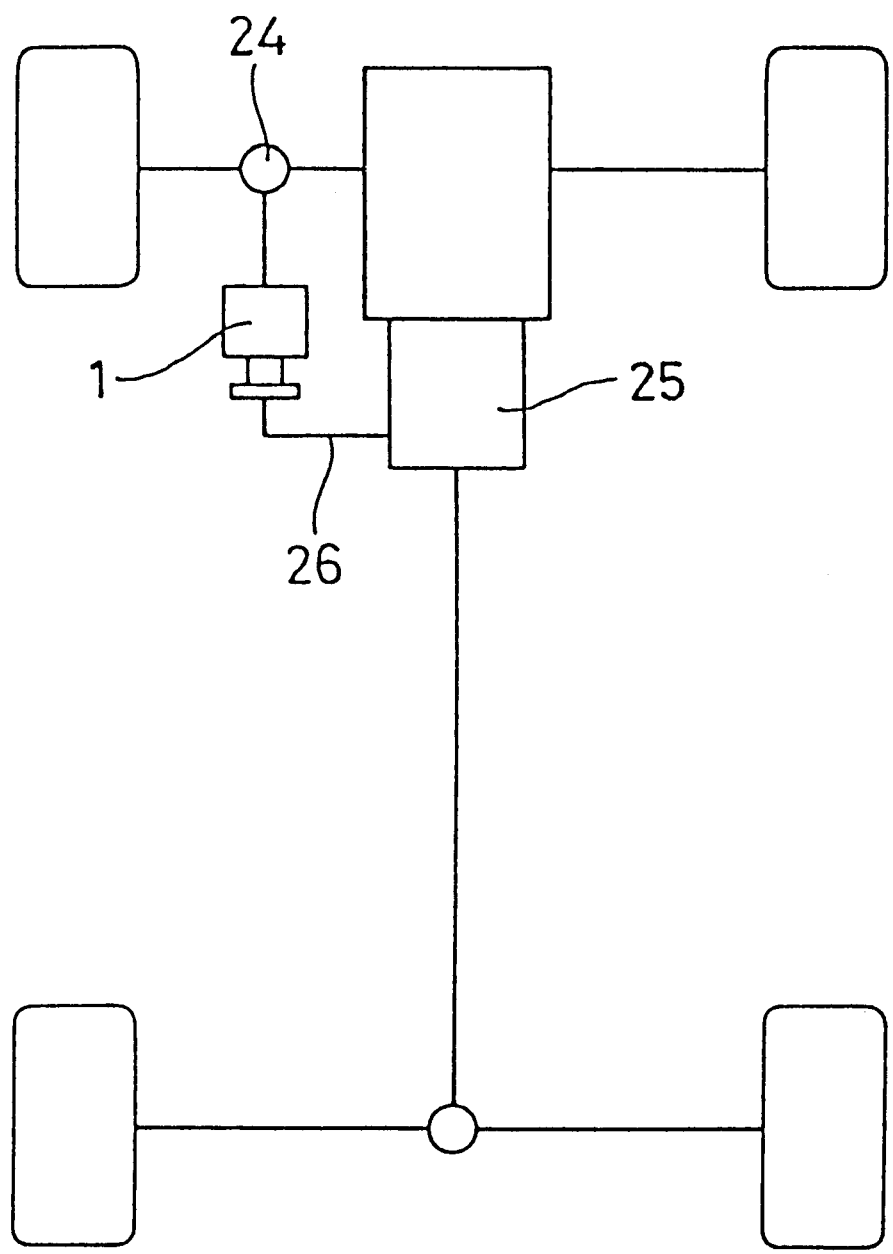
FIG. 25 is a plan view of the rotation transmission device as mounted on a vehicle.

The rotation transmission device 1 of the first embodiment is mounted on an FR-based four-wheel drive vehicle as shown in FIG. 25. Specifically, it is mounted on a propeller shaft 26 connecting the transmission and transfer 25 to the front differential 24 with the input ring 5 of the input shaft 4 connected to the transfer and the outer ring 2 to the front differential. The four-wheel drive shown is equipped with an ABS.

In a normal driving condition (while the 4WD vehicle is traveling at a constant speed), the electromagnet 16 of the electromagnetic clutch 14 is not energized, so that the rotor 18 and the armature 21 are free from each other. Thus, the switch spring 13 keeps the input shaft 4 and the retainer 8 to a position where the cutouts 11 and 12 align with each other, that is, the position shown in FIG. 2. In this state, the input shaft 4 and the outer ring 2 are rotatable relative to each other because they are not interlocked by the rollers 10. The 4WD is thus driven only by the main traction wheels. But in a strict sense, a small portion of the driving force is distributed to the sub-traction wheels in this state, because torque is transmitted from the input shaft 4, to the outer ring 2 through the multiple-disc friction clutch 51.

If the vehicle is operated on a slippery road, a current flows through the electromagnet 16 of the electromagnetic clutch 14. When a current flows through the electromagnet 16, a magnetic circuit is formed through the field core 17, rotor 18 and armature 21. The rotor 18 thus attracts the armature 21, keeping the armature nonrotatable relative to the rotor.

Thus, the outer ring 2, rotor guide 19, rotor 18, armature 21 and retainer 8 are interlocked by the frictional resistance between the armature and the rotor.

Figure 6:
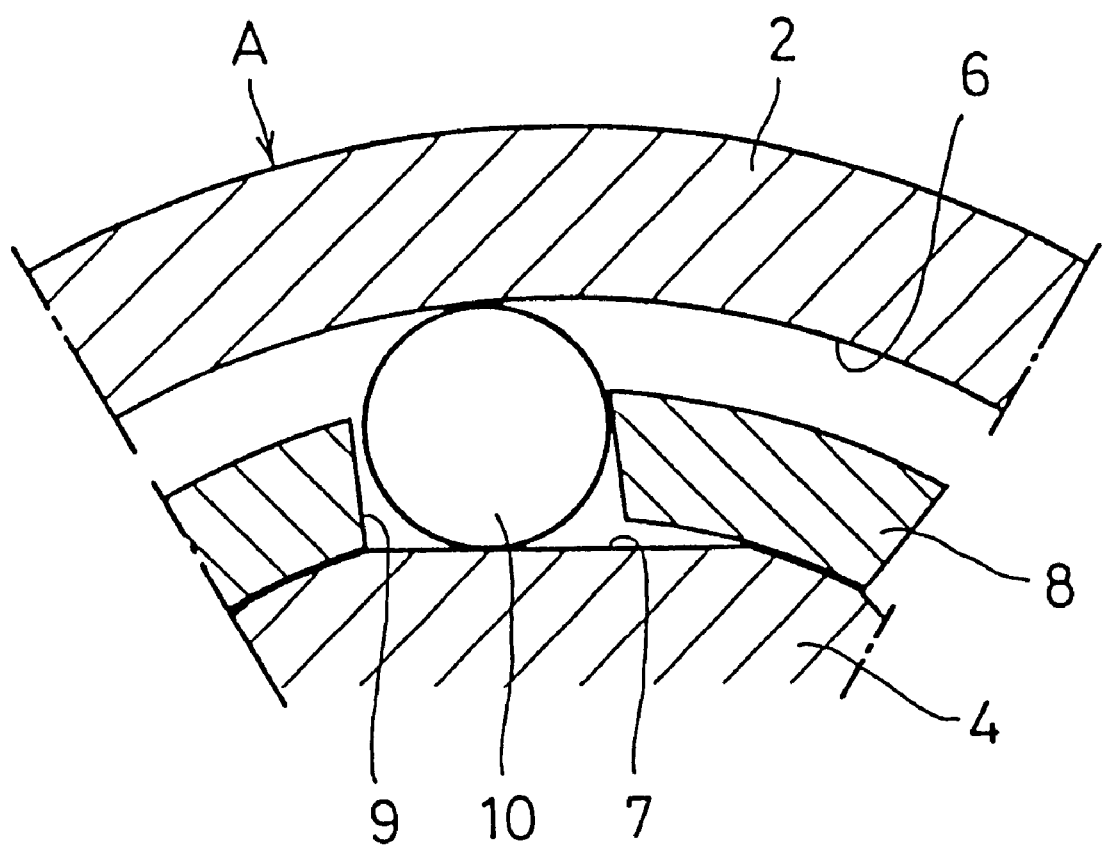
FIG. 6 is a section taken along line II—II of FIG. 1 showing a locked position.
Figure 7:
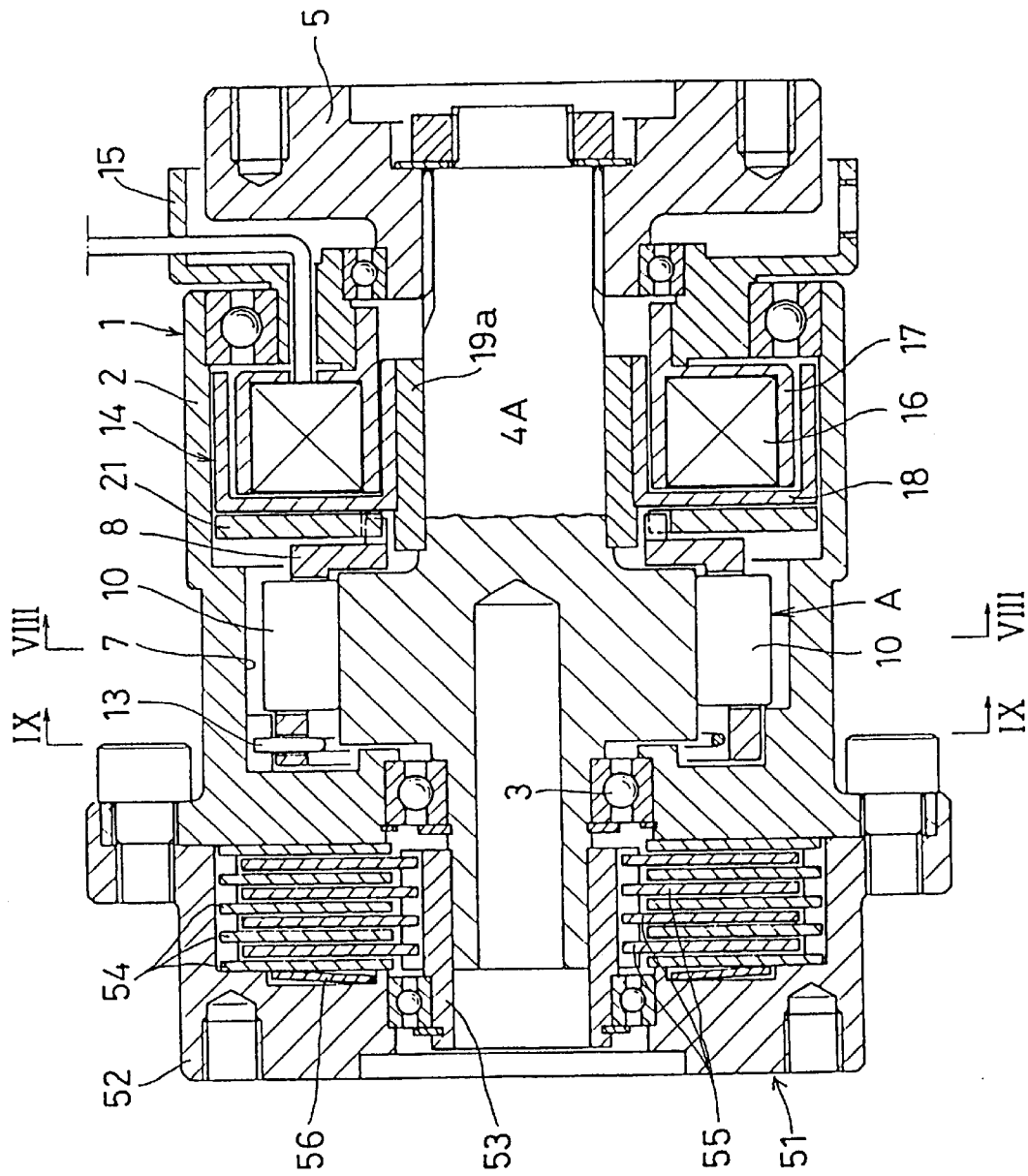
FIG. 7 is a partial vertical section of a second embodiment.
Figure 8:
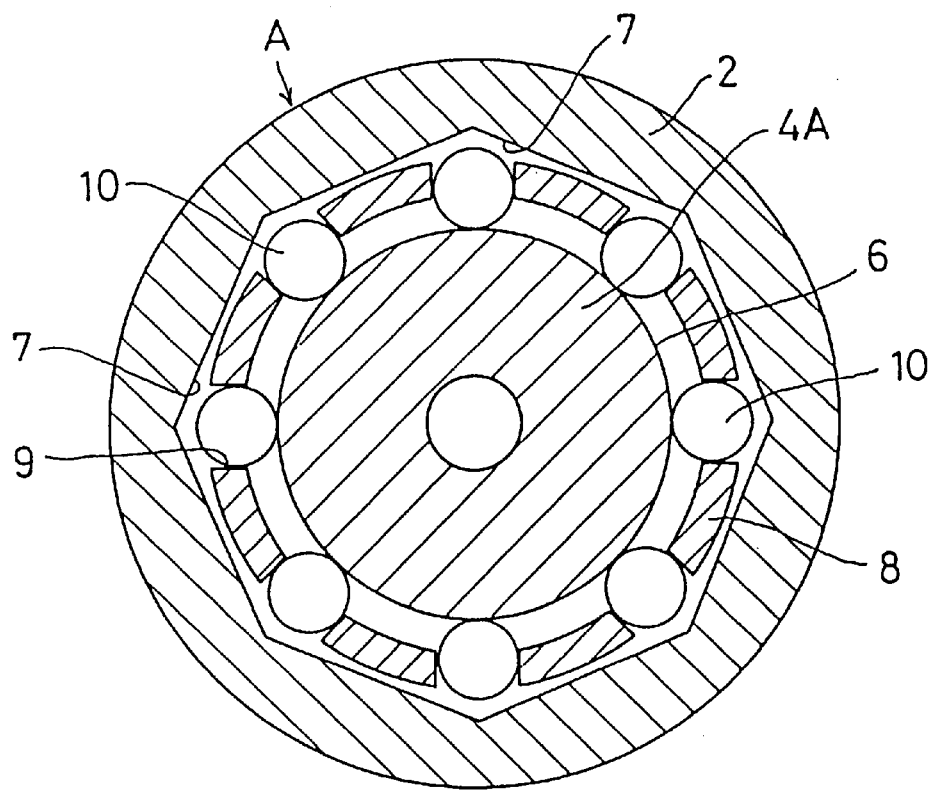
FIG. 8 is a vertical section taken along line VIII—VIII of FIG. 7.

If, in this state, the input shaft 4 and the outer ring 2 are rotated relative to each other, the input shaft 4 will rotate relative to the retainer 8 because the retainer is nonrotatable relative to the outer ring 2. The rollers 10 will engage both the cam surfaces 7 and the cylindrical surface 6 as shown in FIG. 6. In this state, the input shaft 4 and the outer ring 2 are directly coupled, so that torque can be transmitted therebetween. The vehicle is thus driven in a full four-wheel drive mode.

If the ABS is on in this-mode, the electromagnet 16 of the electromagnetic clutch 14 is turned off.

The electromagnet 16,is connected to a control unit in the vehicle by leads extending through the fixed member 15 (FIG. 1)—The control unit calculates the revolving speeds of the front and rear vehicle wheels, i.e. the input and output revolving speeds of the rotation transmission device 1 based on the signals from rotation sensors, and turns on and off the electromagnetic clutch (or coil current) depending upon the difference therebetween.

The above operation will be explained with reference to the actual travel condition of the vehicle, while the vehicle is traveling forward or backward in a normal state, the front and rear vehicle wheels are rotating at the same speed, so that the electromagnetic clutch 14 is turned off. Since the rollers 10 are held in neutral position in this state, a small portion of the driving force determined by the frictional resistance afforded by the multiple-disc friction clutch 51 is distributed to the front vehicle wheels.

If one of the rear wheels slips while the vehicle is accelerating, the speed of this wheel (and thus the input speed of the rotation transmission device) exceeds the front wheel speed (output speed) (front wheel speed<rear wheel speed). If the speed difference therebetween exceeds a predetermined value, the electromagnetic clutch 14 is turned on. This moves the rollers 10 into engagement with the input shaft 4 and the outer ring 2, the interlocking them. Driving force is thus transmitted to the front wheels. The vehicle drive mode now changes to four-wheel drive position.

While the vehicle is turning a corner, the front wheels (output side) are rotating faster than the rear wheels (input side). The electromagnetic clutch 14 is kept off in this state, keeping the input shaft 4 and the outer ring 2 free from each other. The frictional resistance produced by the multiple-disc friction clutch 51 is set small enough not to cause the vehicle to behave as though the brakes were applied while turning a corner (on the order of several kgfm) so that the vehicle can smoothly turn a tight corner.

If the engine brake is applied abruptly while the vehicle is traveling on a low-friction-coefficient road surface such as a snow-covered road, engine braking force is distributed to the rear wheels, so that the rear 10 wheels may begin to lock up. But in this state, although the electromagnetic clutch 14 is off because the front wheels are rotating faster than the rear wheels, engine braking force is partially distributed to the front wheels through the multiple-disk friction clutch 51. This will relieve the lockup tendency of the rear wheels, thus stabilizing the vehicle behavior.

In the case of an ABS-equipped car, while the ABS is on, the outer ring 2 and the input shaft 4 are kept disengaged by keeping the electromagnetic clutch 14 off so that the ABS can function in exactly the same manner as an ABS mounted on a 2WD car.

The frictional force produced by the multiple-disc friction clutch 51 is set at about 3–6 kgm. Such small frictional force will not cause a braking phenomenon while the vehicle is turning a tight corner nor will it bind the front and rear wheels to such an extent as to exert some undesirable influence on the function of the ABS. On the other hand, the frictional force on this order is enough to relieve the lockup tendency of the rear wheels due to engine braking.

Second Embodiment

FIG. 7–11 show a second embodiment of the rotation transmission device, in which the outer ring 2 is the power input and the shaft 4A is the power output. In this and the subsequent embodiments, several elements are similar to elements in the first embodiment. These elements are denoted by the same reference numerals, and their description may therefore be omitted.

In the second embodiment, cam faces 7 are formed on the inner peripheral surface of the input member or outer ring 2, while a cylindrical face 6 is formed opposite to the cam faces 7 on the outer periphery of a large-diameter portion of an output shaft 4A.

Figure 9:
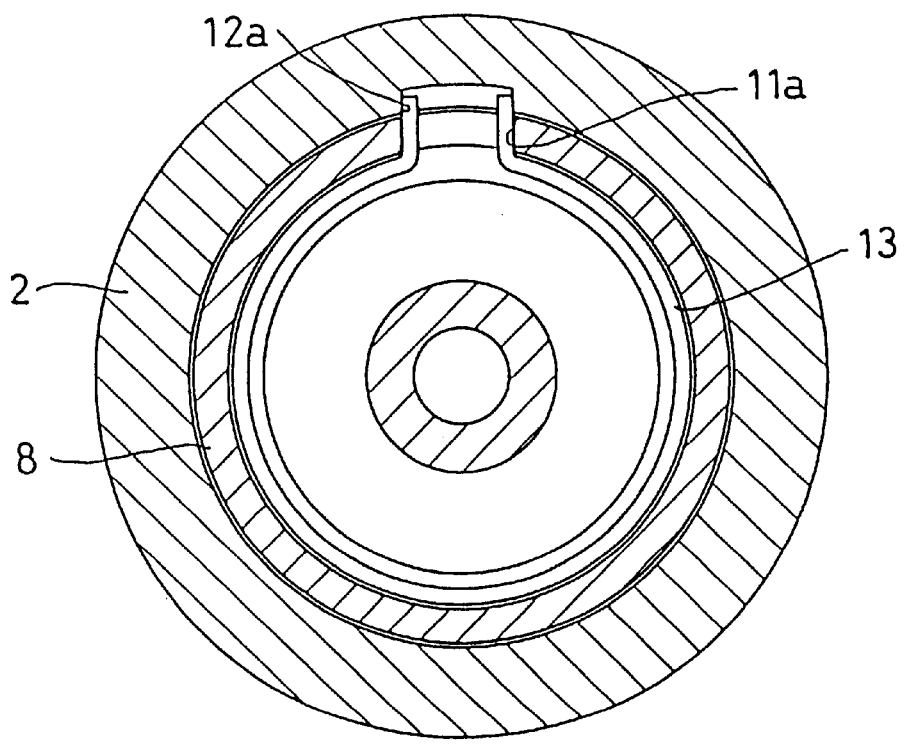
FIG. 9 is a vertical section taken along line IX—IX of FIG. 7.
Figure 10:
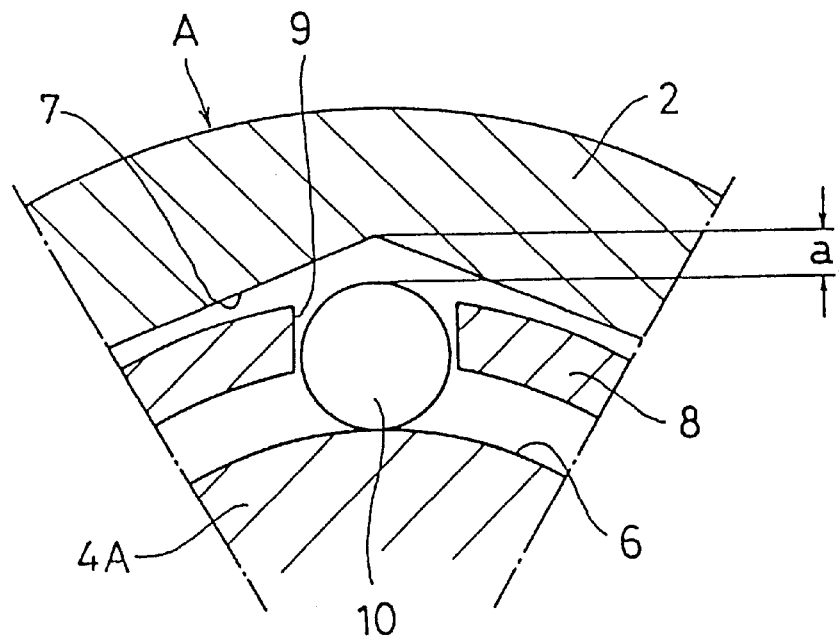
FIG. 10 is a section taken along line VIII—VIII of FIG. 7 showing a free state.

A retainer 8 is mounted between the outer ring 2 and the output shaft 4A. Cutouts 11a and 12a are formed in the retainer 8 and the outer ring 2, respectively, as shown in FIG. 9. A switch spring 13 is set in a contracted state with its ends fit in the cutouts 11a and 12a. When the cutouts 11a and 12a are in alignment, the cam faces 7 of the outer ring 2, the pockets 9 formed in the retainer 8, and the rollers 10 are positioned relative to each other as shown in FIG. 10. In this state, gaps a are present between the rollers 10 and the cam faces 7. While the switch spring 13 is set, the output shaft 4A and the outer ring 2 are disengaged in such a "neutral standby position".

The electromagnetic clutch 14 has its field core 17 nonrotatably press-fitted in the fixed member 15 and its rotor 18 nonrotatably press-fitted on the rotor guide 19a, which is made of a non-magnetizable material. The rotor guide 19a is in turn nonrotatably press-fitted or otherwise fitted on the output shaft 4A. Thus, the output shaft 4A, rotor guide 19a and rotor 18 are always kept from rotating relative to each other.

Figure 4:
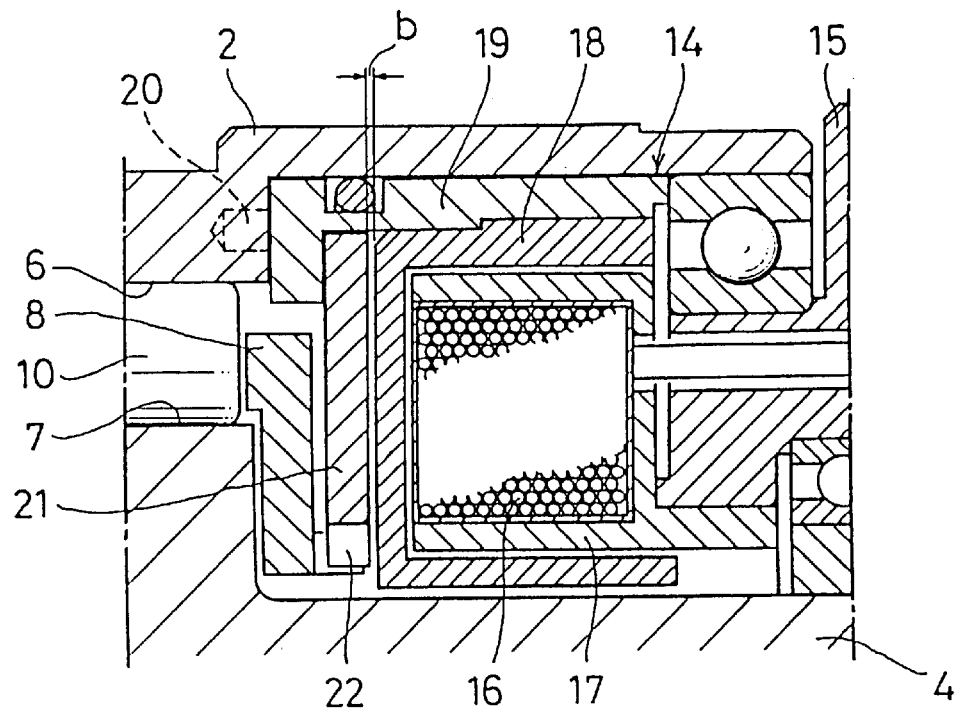
FIG. 4 is a partial enlarged sectional view of an electromagnet of FIG. 1.
Figure 5:
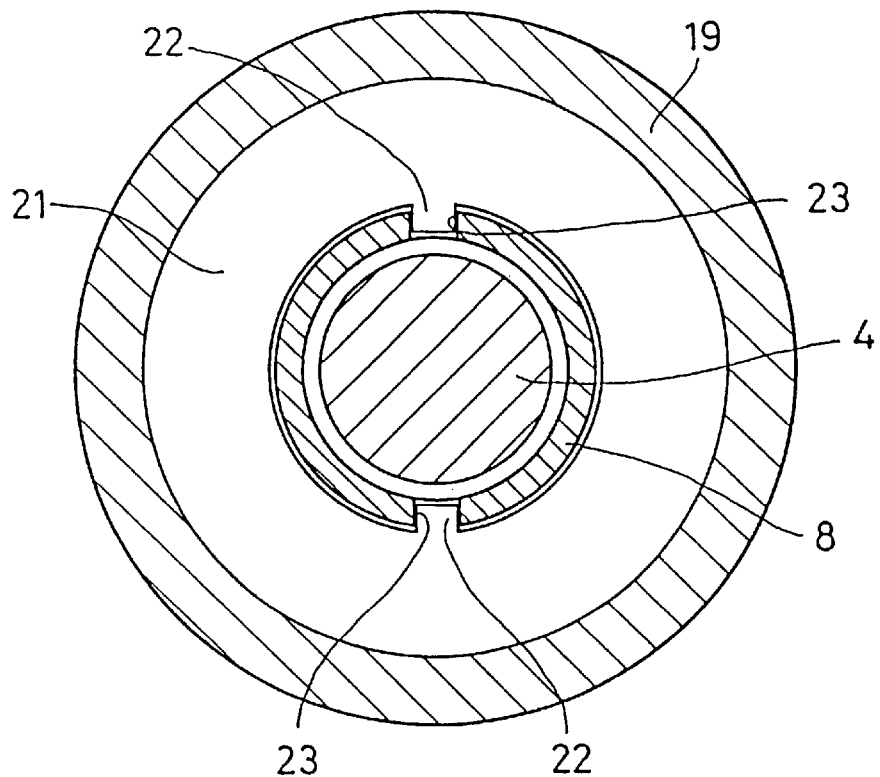
FIG. 5 is a section taken along line V—V of FIG. 1.

Like their counterparts shown in FIG. 4, the armature 21 and the retainer 8 of this embodiment are nonrotatable relative to each other but axially movable, relative to each other, by a distance permitted by the gap 12. The armature 21 and the rotor 18 are rotatable relative to each other. Thus, the rotor 18 is nonrotatable relative to the output shaft 4A, while the armature 21 is nonrotatably coupled to the outer ring 2 through the retainer 8 and the switch spring 13.

In the second embodiment, when the vehicle is operated on a slippery road in four-wheel drive mode, the elecromagnet 16 is turned on, so that a magnetic field is formed through the field core 17, rotor 18 and armature 21. The rotor 18 thus attracts the armature 21. In this state, due to the frictional resistance between the rotor 18 and the armature 21, the output shaft 4A, rotor guide 19, rotor 18, armature 21 and retainer 8 are nonrotatably coupled together.

Figure 11:
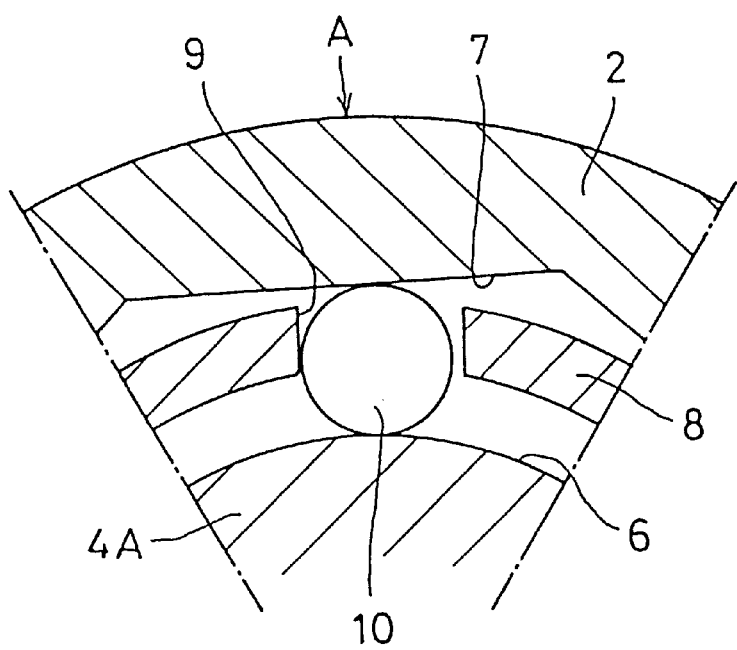
FIG. 11 is a view similar to FIG. 10 but showing a locked position.

When the outer ring 2 and the output shaft 4A rotate relative to each other in this state, the retainer 8, nonrotatably coupled to the output shaft 4A, will turn relative to the outer ring 2 to the position shown in FIG. 11. In this state, the outer ring 2 and the output shaft 4A are interlocked. That is, the drive mode changes to four-wheel drive position.

If the ABS turns on during the four-wheel drive mode, the electromagnet 16 is turned off. This disengages the rotor 18 from the armature 21, disengaging the rollers between outer ring 2 and the output shaft 4A. The ABS thus functions in exactly the same way as an ABS on a 2WD.

Third Embodiment

Figure 12:
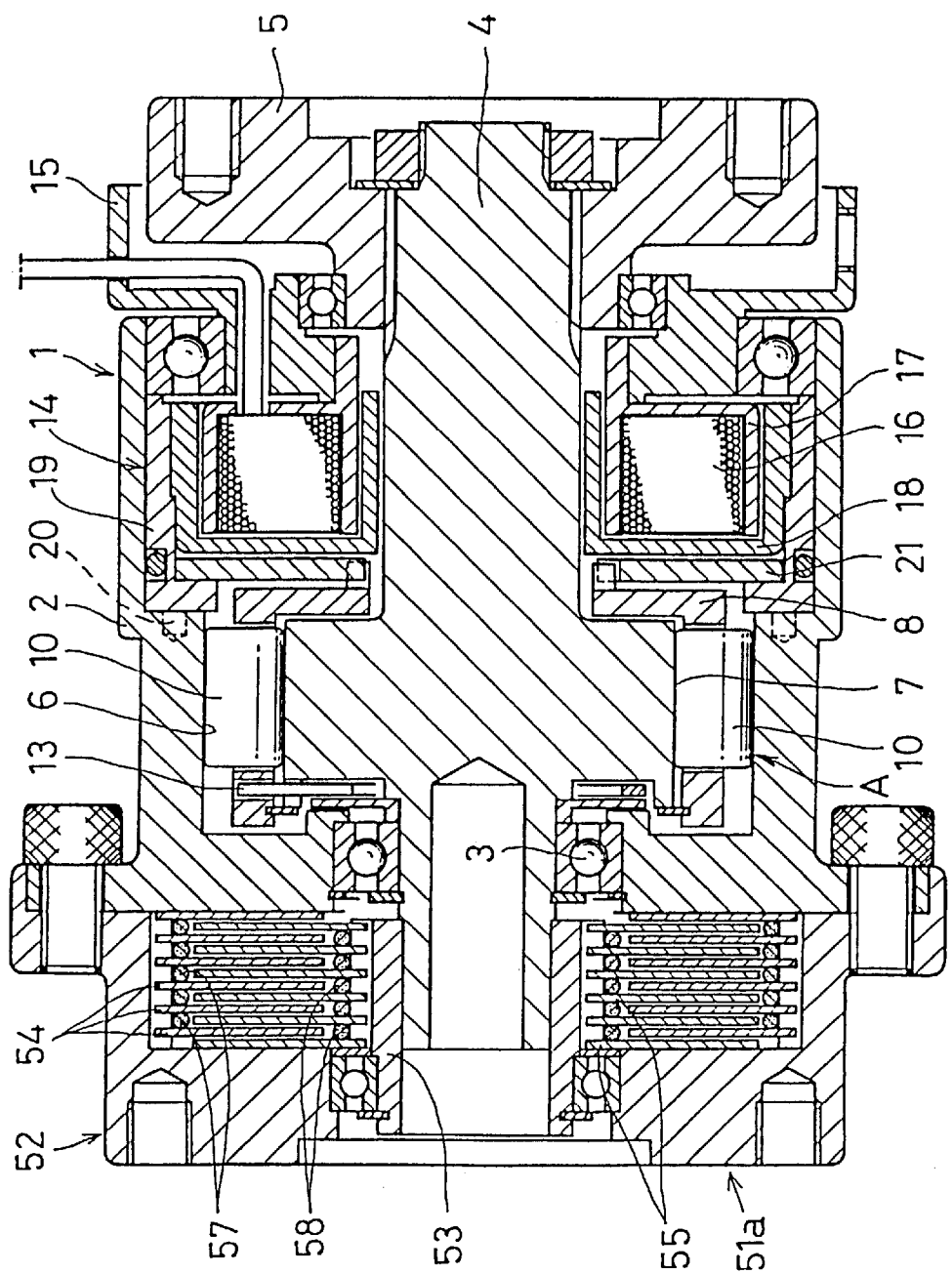
FIG. 12 is a section of a third embodiment.

In a third embodiment shown in FIG. 12, a viscous clutch 51a is used instead of the multiple-disc clutch of the first embodiment.

The viscous clutch 51a includes a plurality of outer plates 54 nonrotatably fitted in the housing 52, spaced from each other by spacer rings 57, and a plurality of inner plates 55 non-rotatably fitted on an inner ring 53 and arranged alternating with the outer plates 54 while being spaced from each other by spacer rings 58. The spaces between the plates 54, 55 are filled with high-viscosity oil, so that suitable torque is distributed to the front wheels through the clutch 51a during engine braking, in the same way as in the first embodiment.

Fourth Embodiment

Figure 13:
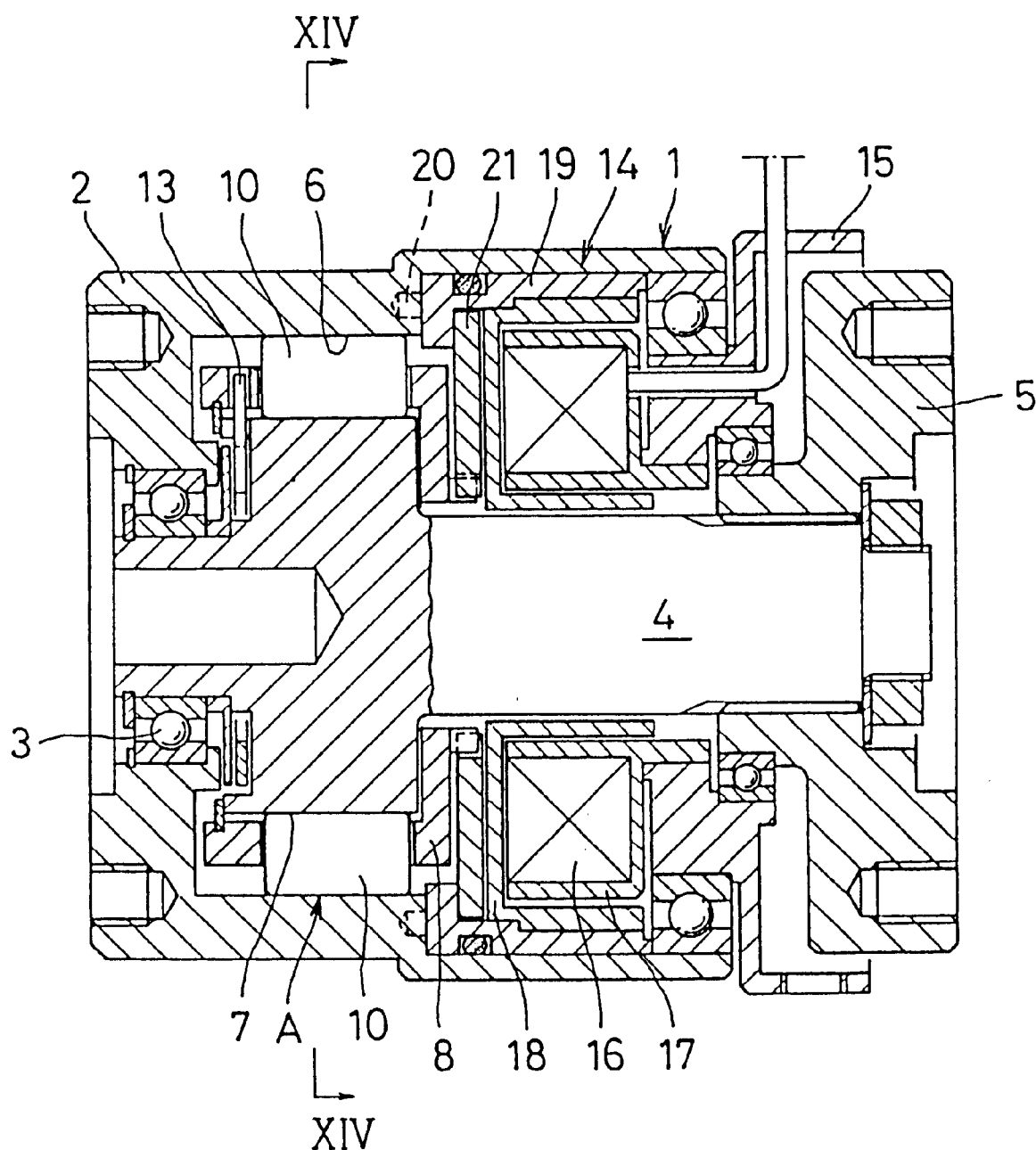
FIG. 13 is a section of a fourth embodiment.
Figure 14:
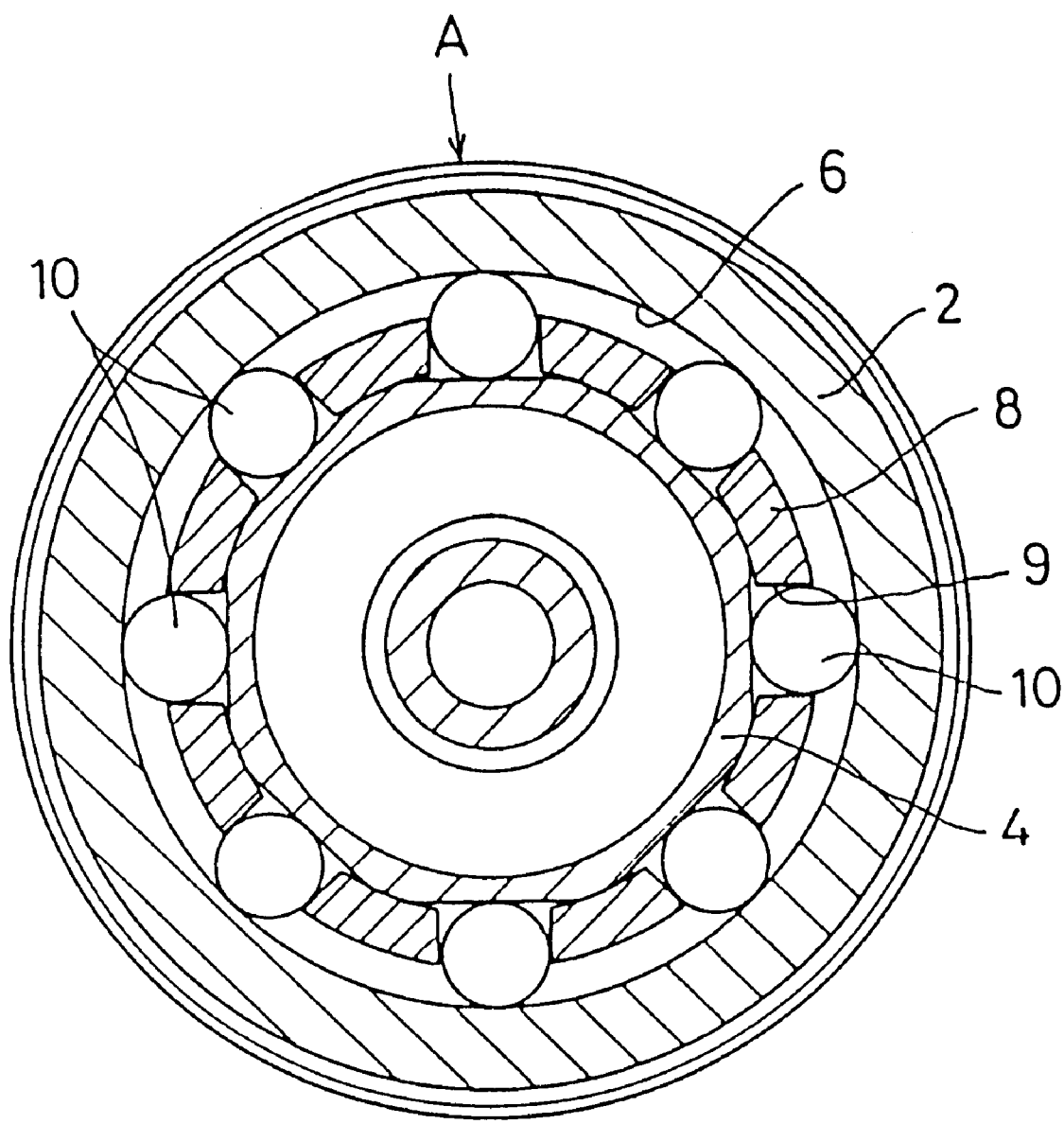
FIG. 14 is a section taken along XIV—XIV of FIG. 13.

FIGS. 13 and 14 show a fourth embodiment, which has neither the multiple-disc clutch 51 nor the viscous clutch 51a as used in the first to third embodiments. In this embodiment, the control unit monitors the vehicle deceleration relative to a predetermined value based on the rear wheel speed. If the rear wheels begin to lock up due to strong engine braking and thus decreasing the rear wheel speed sharply, the vehicle deceleration will exceed the predetermined value. Upon detecting this fact, the control unit turns on the electromagnetic clutch. The rollers are thus locked, so that the engine braking torque is distributed to all four wheels.

In any of the first to fourth embodiments, if one of the rear wheels slip on a slippery road and its speed exceeds the front wheel speed by a predetermined value, the electromagnet is turned on to lock the two-way clutch A. In other situations (while the ABS is on, or while the vehicle is turning a corner, traveling at a constant speed, or being decelerated), the electromagnet is kept off, so that the two-way clutch A is held in its neutral position. Specifically, the rollers 10 are held in the neutral position shown in FIG. 2 by the force of the switch spring 13 shown in FIG. 3.

Thus, if the force of the switch spring 13 is too small, it may be impossible to hold the rollers 10 in neutral position when the input shaft 4 rotates from a large acceleration. The rollers will leave the neutral position due to the combined inertia of the retainer, rollers and armature mounted coaxially and 10 nonrotatably relative to the retainer.

Also, if the force of the switch spring is too small, the retainer 8 may move together with the rollers 10 to the position where the rollers 10 are locked. This occurs because when the frictional resistance (mainly surface tension) between the armature 21 and the rotor 18 or the rotor guide 19 exceeds the force of the switch spring 13.

In order to prevent this problem, it is necessary to increase the force of the switch spring 13, or to reduce the frictional resistance between the armature 21 and the rotor 18. But in order to increase this force, the capacity (size) of the electromagnet 16 has to be increased.

Fifth Embodiment

Figure 15A:
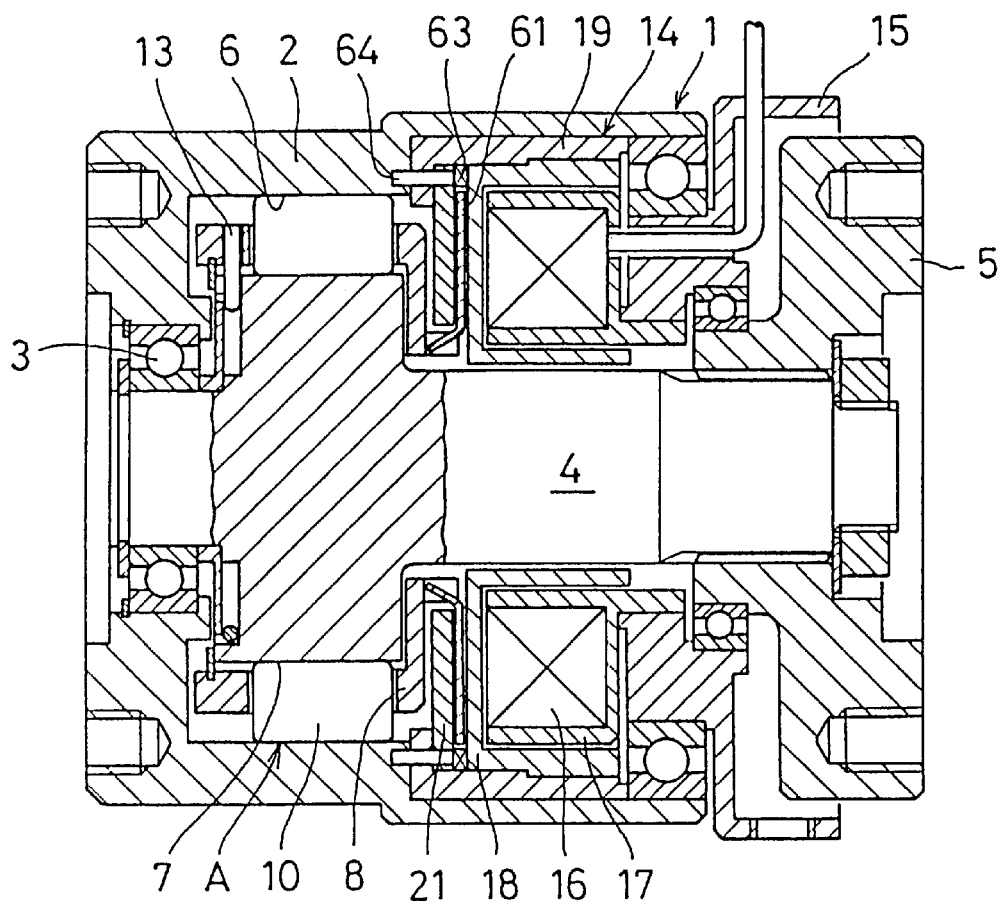
FIG. 15A is a section of a fifth embodiment.

In the fifth embodiment, shown in FIG. 15, the armature 21 is axially slidably but nonrotatably mounted relative to the outer ring 2. A clutch plate 61 is axially slidably but nonrotatably mounted relative to the retainer 8. With this arrangement, it is possible to reduce the inertia on the side of the retainer 8 and to increase the frictional torque when the armature 21 is attracted to the electromagnet 16. Thus, it is possible to keep the retainer reliably in its neutral position while the electromagnet 16 is off without increasing the size of the electromagnet 16 or the force of the switch spring 13.

In order to minimize the frictional resistance during relative rotation, oil grooves 62 for cutting oil film are formed in one of the sliding surfaces of the armature 21 and the rotor 18.

A resilient member such as a wave washer 63 is disposed between the armature 21, which is nonrotatably but axially slidably coupled to the retainer 8, and the rotor 18, which is nonrotatably coupled to the outer ring 2, to keep the two apart and to reduce the frictional resistance therebetween while the electromagnet 16 is off.

The clutch plate 61 used in the fifth embodiment shown in FIGS. 15–17 is a thin plate member and is nonrotatably but axially slidably mounted on the retainer 8. The armature 21, as well as the rotor guide 19, is nonrotatably coupled to the outer ring 2 by stopper pins 64 but remains axially slidable relative to the outer ring.

The clutch plate 61 is mounted between the rotor 18 and the armature 21. The wave washer 63 as shown in FIGS. 16A and 16B is disposed between the rotor 18 and the armature 21.

Figure 15B:
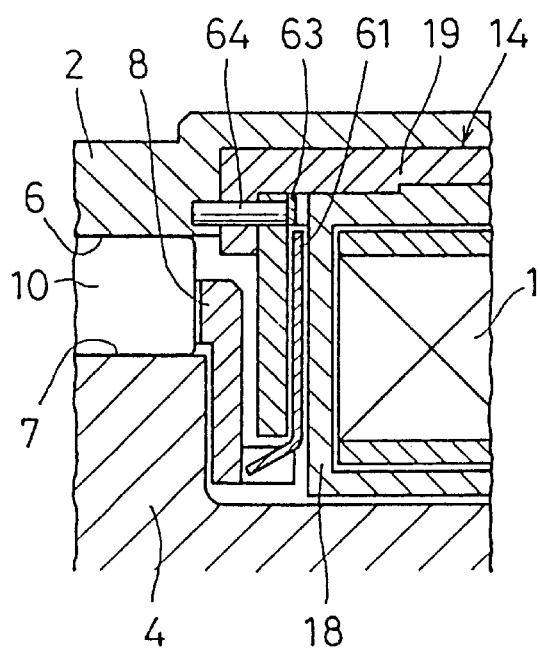
FIG. 15B is an enlarged section of a two-way clutch of FIG. 15A showing a position when an electromagnetic coil is not energized.

As shown in FIG. 15B, while the electromagnet 16 is off, a gap is formed between the armature 21 and the rotor 18 by the force of the wave washer 63. The clutch plate 61 is rotatable relative to both members. Instead of the armature 21, which was used in the first to fourth embodiment, the lighter clutch plate 61 is coupled to the retainer 8, so that its inertia is smaller. This is advantageous when the acceleration of the input shaft 4 is large.

Figure 15C:
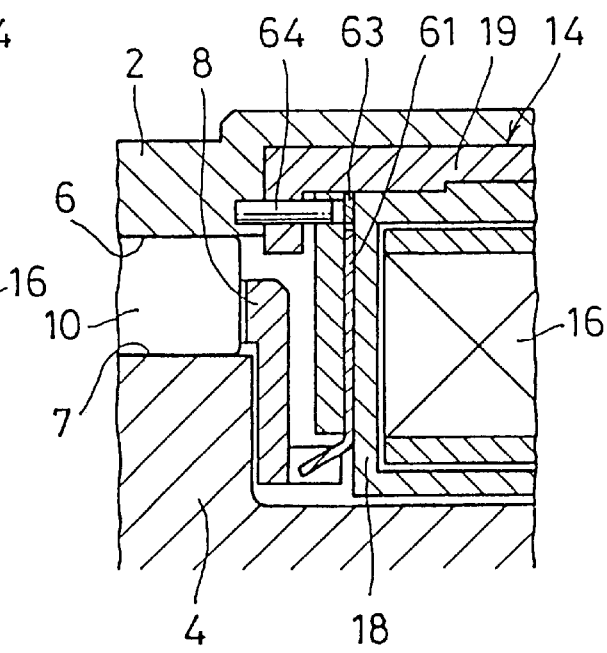
FIG. 15C is a view similar to FIG. 15B when the electromagnetic coil is energized.

As shown in FIG. 15C, when the electromagnet 16 is energized, it attracts the armature 21, thus pressing it against the rotor 18 with the clutch plate 61 therebetween. In the arrangements of the first to fourth embodiments, the armature torque T with respect to the attraction force W of the electromagnet 16 is given by the following formula:

$T=\mu Wr$ (where r is the average radius of the frictional sliding surface and $\mu$ is the friction coefficient).

In the arrangement of the fifth embodiment, there are two pairs of frictional sliding surfaces, so that the armature torque T' produced will be twice the armature torque in the arrangements of the first to fourth embodiments, provided the attraction force is the same, namely:

$T'=2\mu Wr=2T$

It is thus possible to increase the frictional force without increasing the size of the electromagnet.

Sixth Embodiment

In the sixth embodiment shown in FIG. 17, spiral grooves 62 (FIG. 17A) or radial grooves (FIG. 17B) are formed in one of the sliding surfaces of the armature 21 and rotor 18 of the fifth embodiment to reduce surface tension and thus sliding resistance. Reduced slide resistance between the armature 21 and the rotor 18 makes it possible to reduce the force of the switch spring. This increases the freedom of design of the switch spring and the electromagnet.

Such grooves may be formed in the armature of any of the first to fifth embodiments.

Seventh Embodiment

Figure 18A:
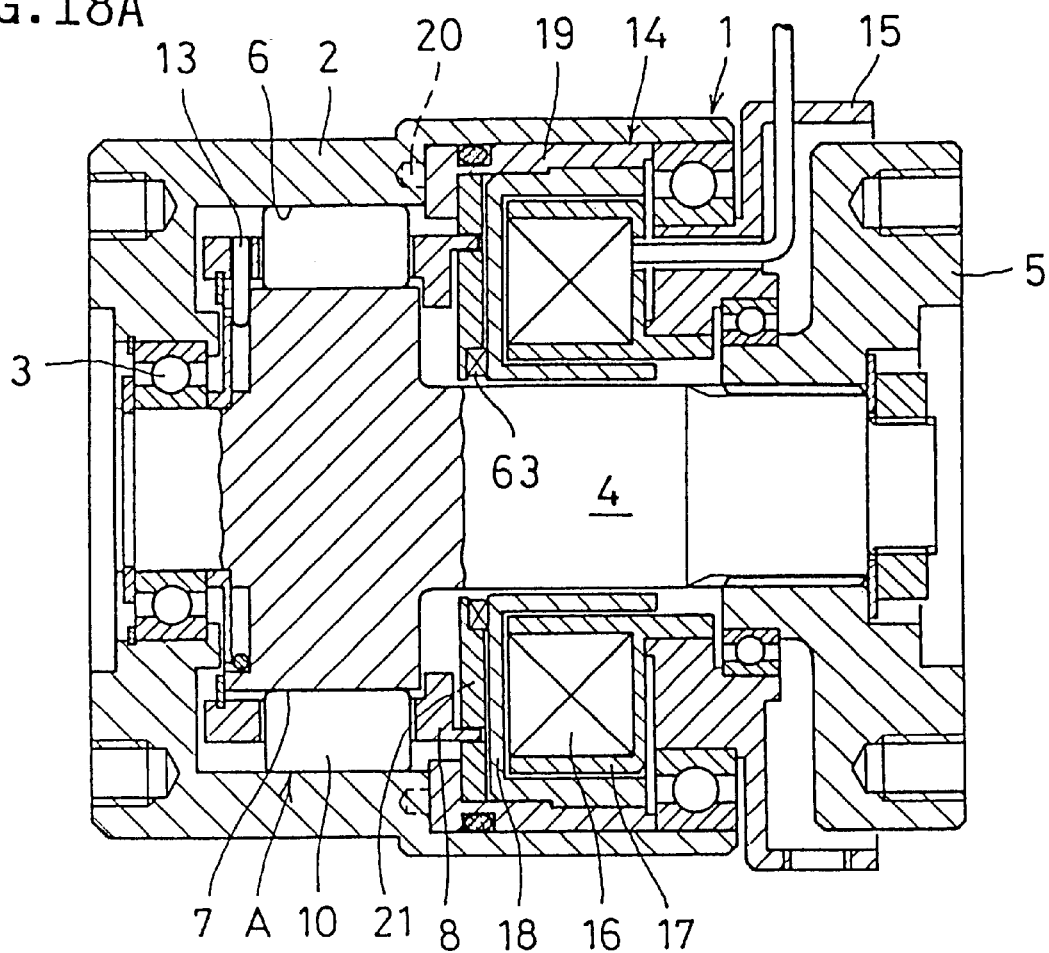
FIG. 18A is a section of a seventh embodiment.
Figure 18B:
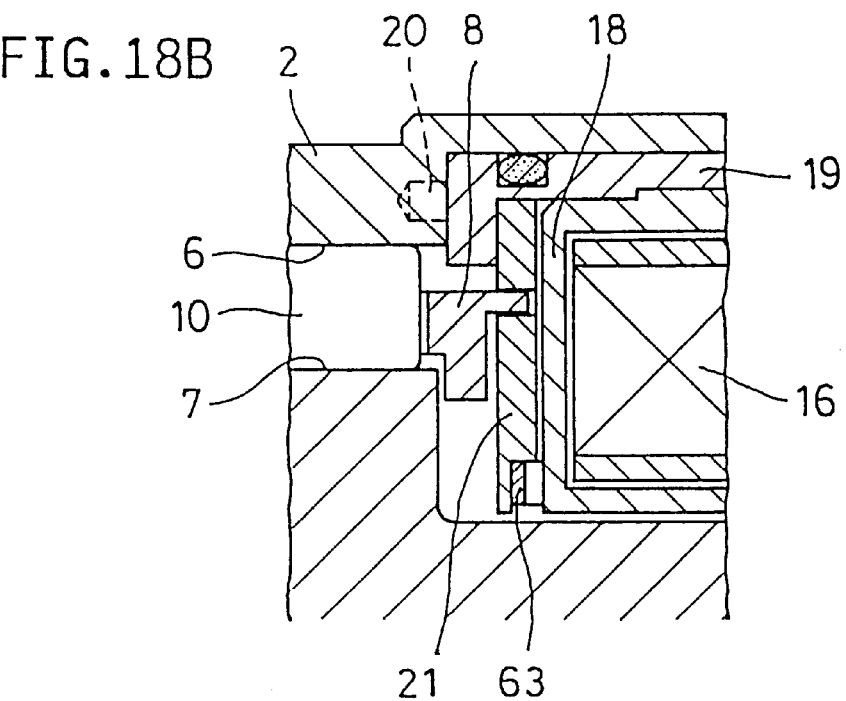
FIG. 18B is an enlarged section of an electromagnetic clutch of the seventh embodiment.

In the seventh embodiment shown in FIG. 18, the armature 21 and the retainer 8 are nonrotatable but axially slidable relative to each other. A wave washer 63 is mounted between the armature 21 and the rotor 18. While the electromagnet 16 is off, the armature 21 is kept spaced from the rotor 18 by the force of the wave washer 63 (which is set at 2–4 kgf in this embodiment). The influence of surface tension is thus avoided (as in the sixth embodiment).

The load of the wave washer 63 is set to be substantially zero when the armature 21 and the rotor 18 are spaced from each other. Thus in this state, the resistance between the armature 21 and the rotor 18 will be so small that it will never overcome the force of the switch spring and thus never move the retainer 8.

When the electromagnet 16 is energized, it produces an attraction force proportional to the current supplied. The force attracts the armature 21 against the force of the wave washer 63. This is possible because the attraction force of the electromagnet 16 is far greater than the force of the wave washer 63.

Eighth Embodiment

Figure 19:
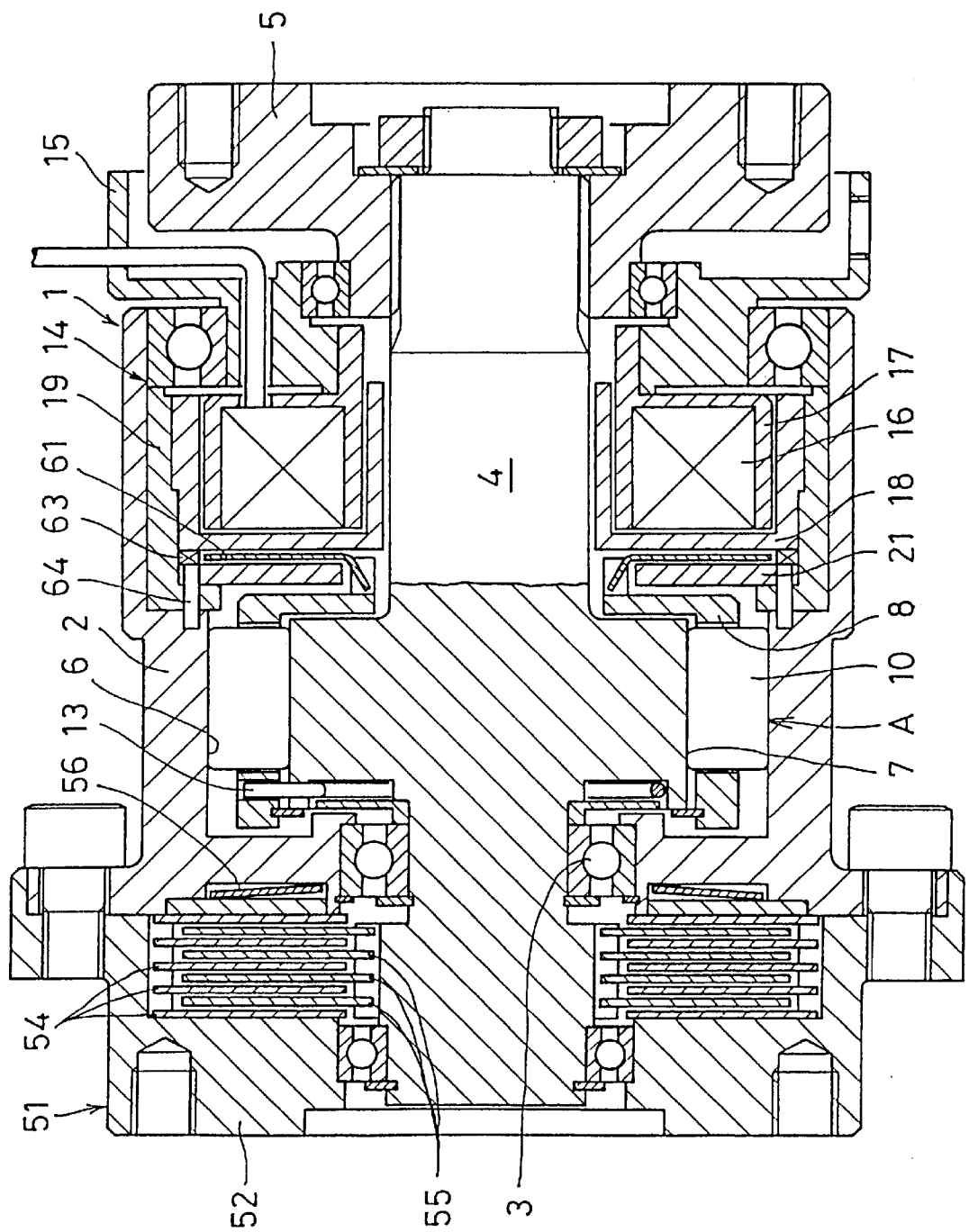
FIG. 19 is a section of an eighth embodiment.

In the eighth embodiment shown in FIG. 19, a multiple-disc clutch 51 is provided between the input shaft 4 and the outer ring 2 of the fifth embodiment.

Ninth Embodiment

Figure 20:
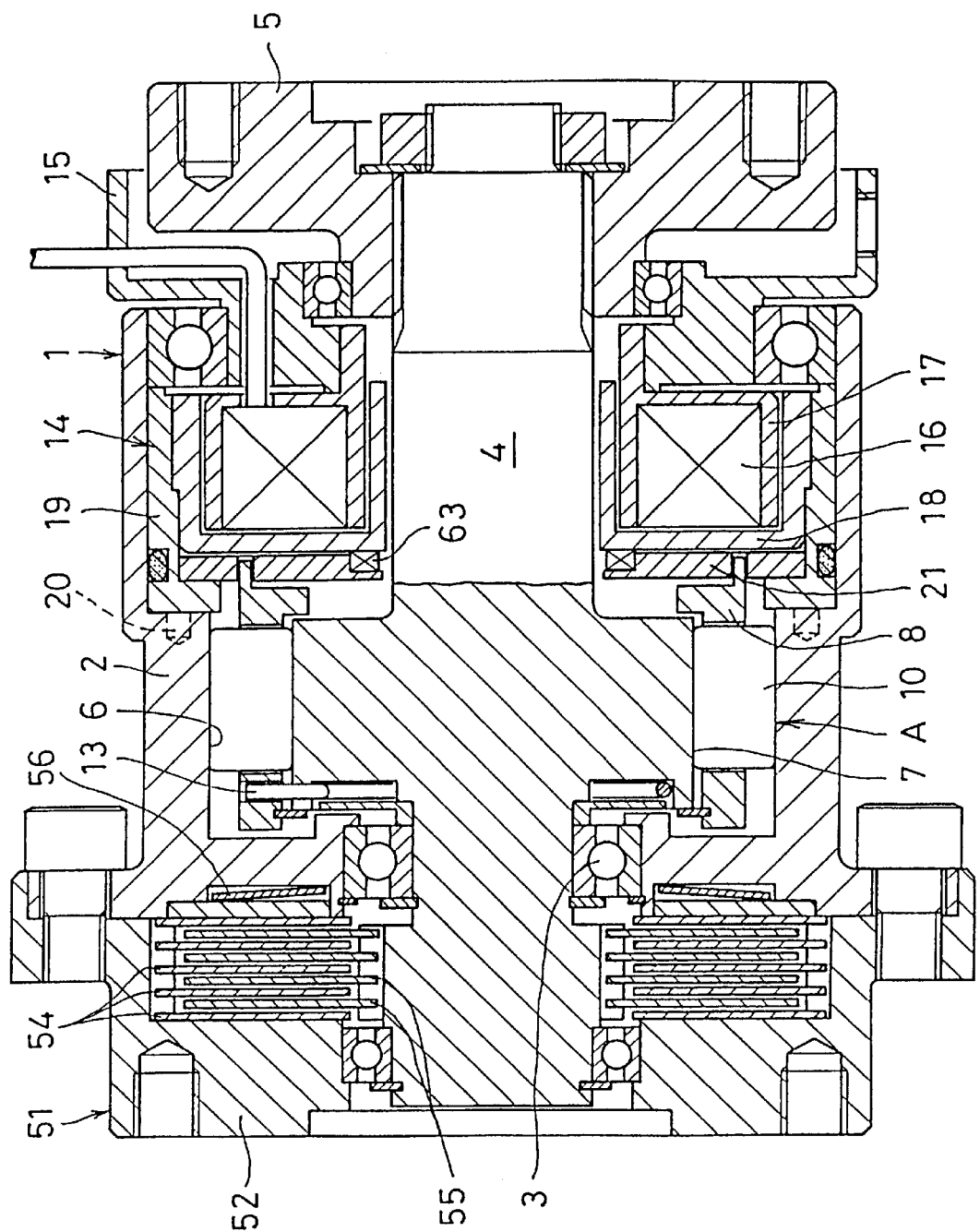
FIG. 20 is a section of a tenth embodiment.

In the ninth embodiment shown in FIG. 20, the same multiple-disc clutch 51 is provided between the input shaft 4 and the outer ring 2 of the seventh embodiment.

Tenth Embodiment

Figure 21:
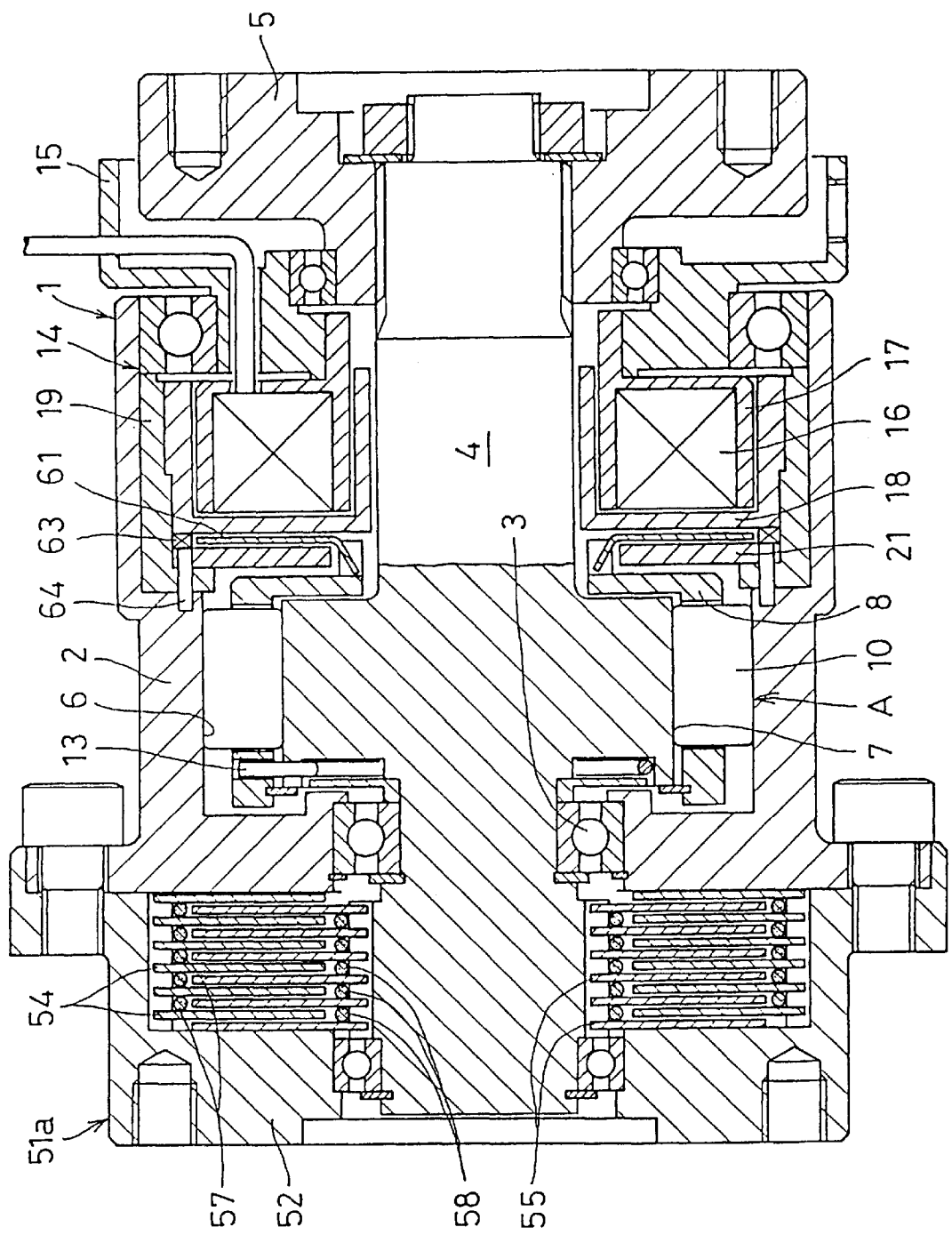
FIG. 21 is a section of a tenth embodiment.

In the tenth embodiment shown in FIG. 21, a viscous clutch 51a is provided between the input shaft 4 and the outer ring 2 of the fifth embodiment.

Eleventh Embodiment

Figure 22:
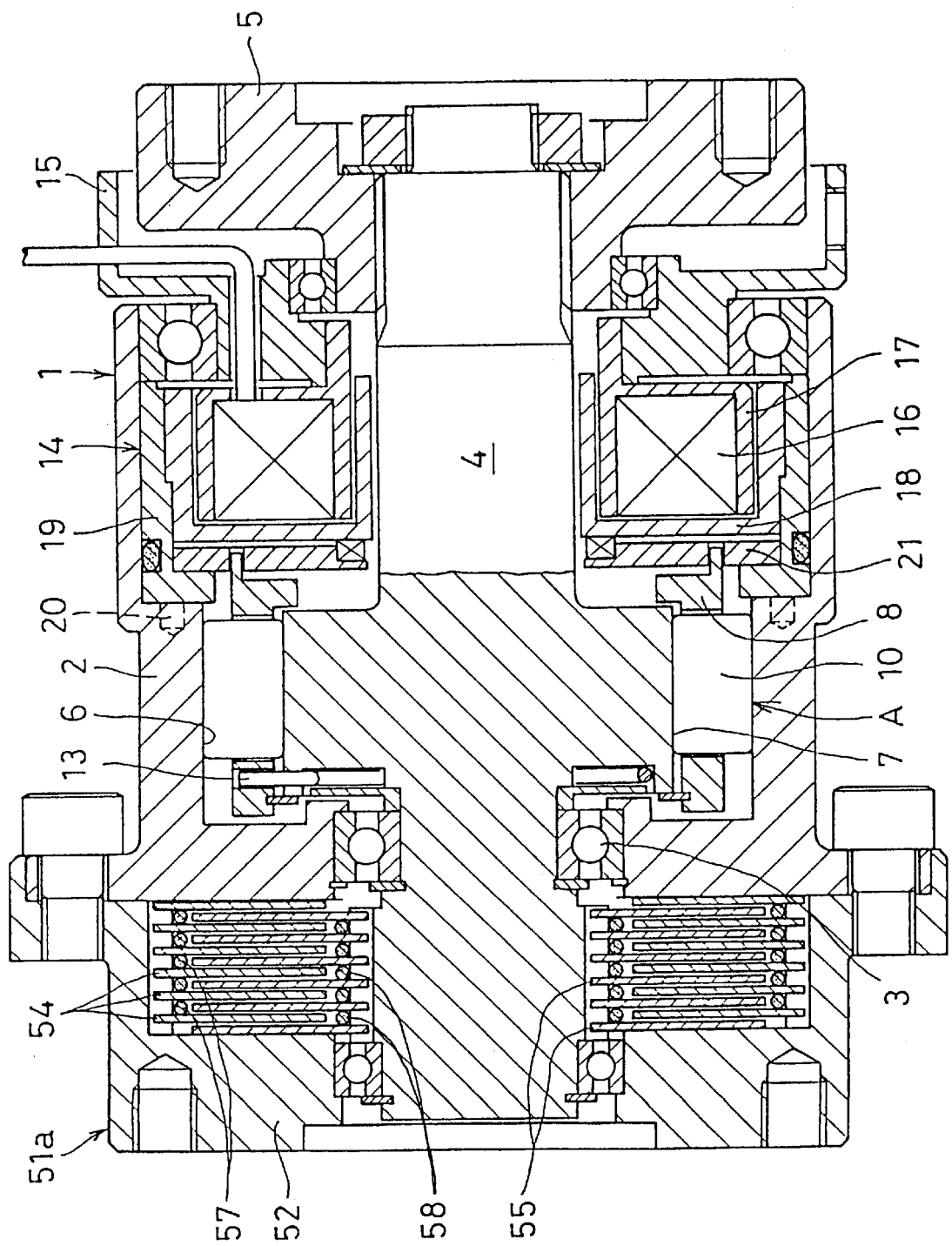
FIG. 22 is a section of an eleventh embodiment.

In the eleventh embodiment shown in FIG. 22, a viscous clutch 51a is provided between the input shaft 4 and the outer ring 2 of the seventh embodiment.

Twelfth Embodiment

Figure 23A:
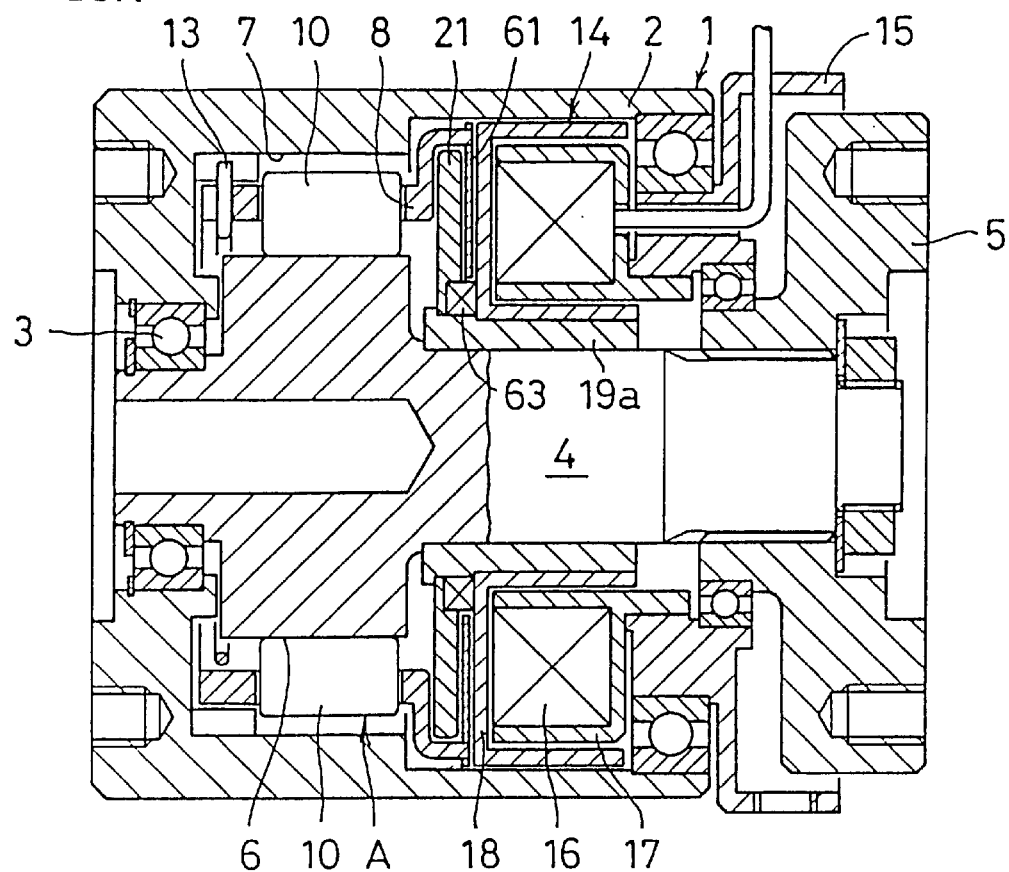
FIG. 23A is a section of a twelfth embodiment.
Figure 23B:
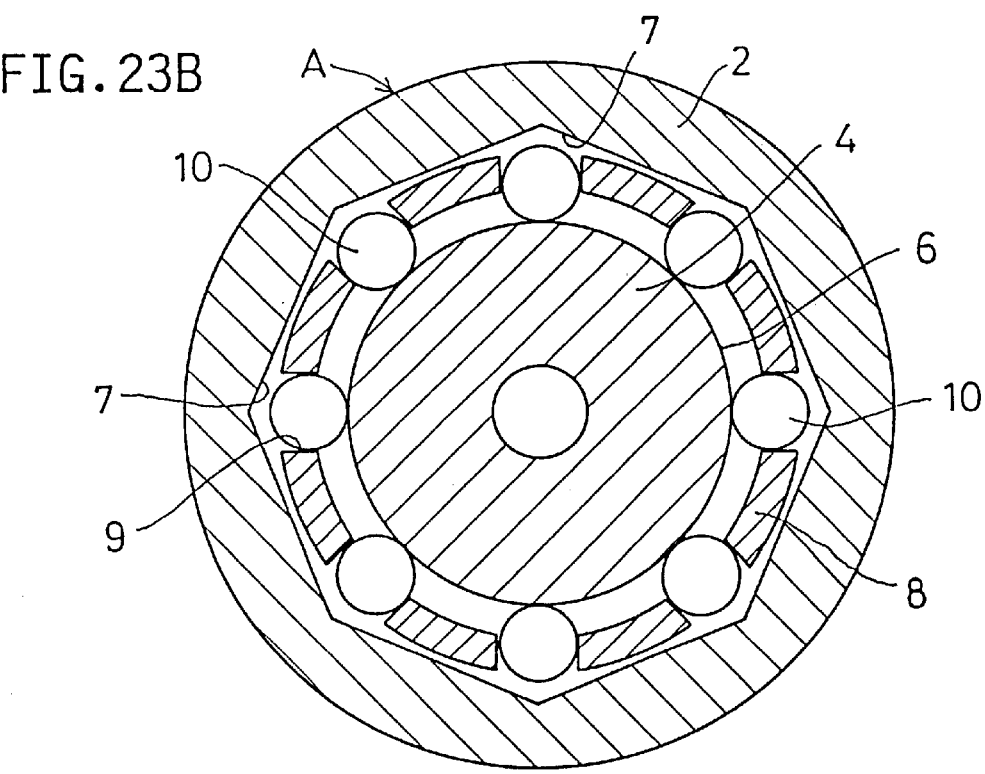
FIG. 23B is a section of a two-way clutch of the twelfth embodiment.
Figure 24A:
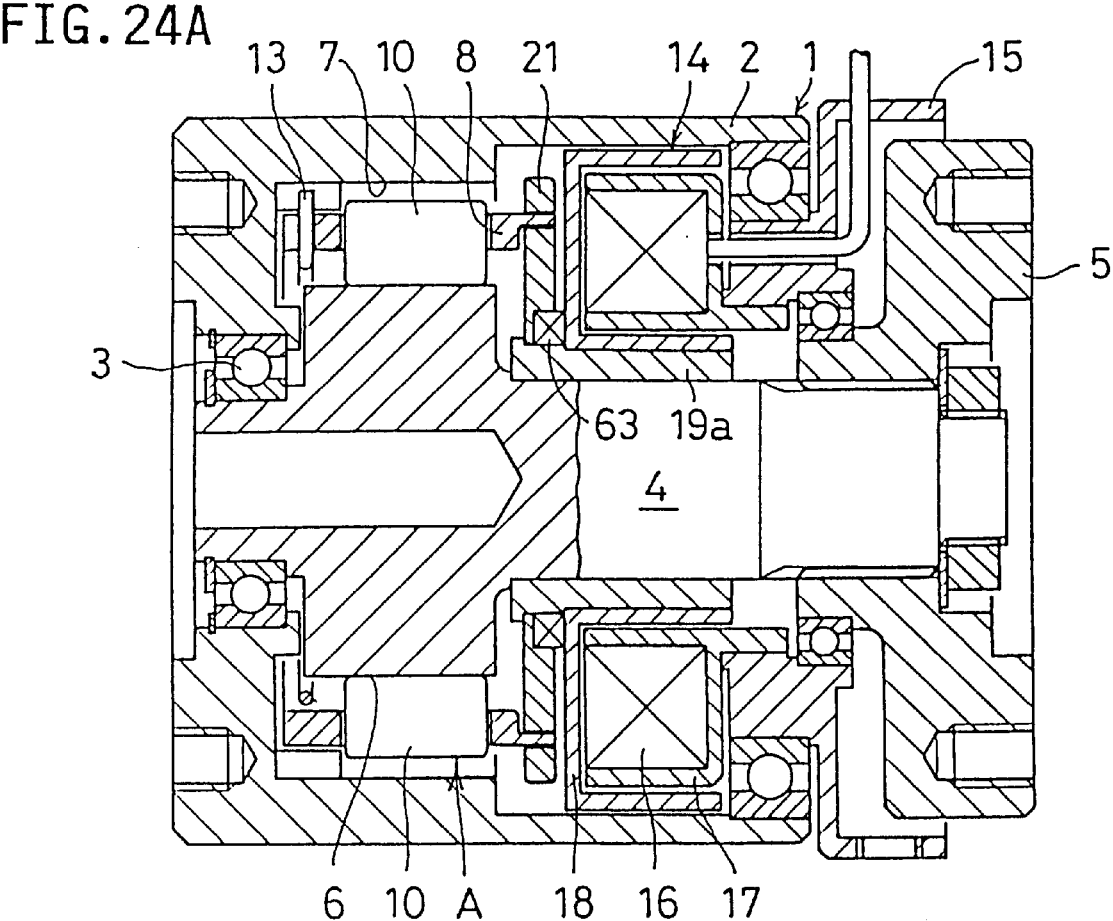
FIG. 24A is a section of a thirteenth embodiment.
Figure 24B:
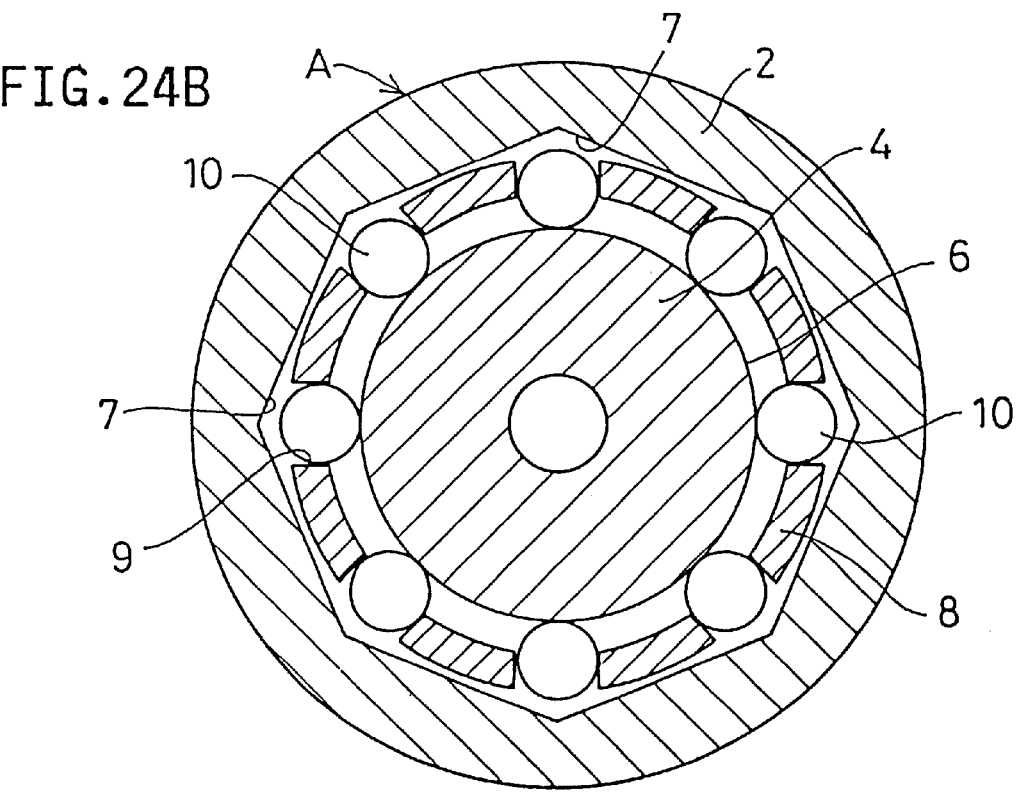
FIG. 24B is a section of a two-way clutch of the thirteenth embodiment.

In the twelfth embodiment shown in FIG. 23, a two-way clutch A is used which includes an outer ring 2 having polygon-forming cam faces 7 on its inner surface, and a cylindrical input shaft 4.

The clutch plate 61 has its radially outer side nonrotatably but axially slidably coupled to the retainer 8 and the armature 21 has its radially inner side nonrotatably but axially slidably coupled to the rotor guide 19a. The rotor 18 is nonrotatably press-fitted on the rotor guide 19a, which is in turn nonrotatably press-fitted on the input shaft 4.

When the electromagnet 16 is off, a gap is formed between the armature 21 and the rotor 18. The clutch plate 61 is thus freely rotatable in this gap relative to both members, and the switch spring 13 keeps the retainer 8 in the position where the rollers 10 are free.

When the electromagnet 16 is energized, the armature 21 is attracted to the rotor 61 with the clutch plate 18 sandwiched therebetween. The armature 21, clutch plate 61 (retainer), rotor 18, rotor guide 19a and input shaft 4 are now nonrotatably coupled together. The torque produced in this state is twice the torque produced in the arrangements of the first to fourth embodiments, for the reasons set forth in the description of the fifth embodiment.

The operation of the 12th embodiment when mounted on a car is the same as in the fifth embodiment.

Thirteenth Embodiment

Like the clutch of the twelfth embodiment, the two-way clutch A used in the thirteenth embodiment, shown in FIG.

24, includes an outer ring 2 having polygon-forming cam faces 7 on its inner surface, and a cylindrical input shaft 4.

The armature 21 and the retainer 8 are nonrotatable but axially movable relative to each other. The rotor 18 is nonrotatably press-fitted on the input shaft 4 through the rotor guide 19a.

When the electromagnet 16 is off, the armature 21 is spaced from the rotor 18 by the force of the wave washer 63, so that it is free of the influence of the surface tension in this state. The retainer 8 is held in the position where the rollers 10 are free, i.e. the position where the input shaft 4 and the outer ring 2 are not interlocked by the rollers.

When the electromagnet 16 is energized, the armature 21 is attracted toward the rotor 18, thus nonrotatably coupling the input shaft 4 and the retainer 25 together by producing frictional force.

The operation of the thirteenth embodiment when mounted on a car is the same as in the fifth embodiment.

In the twelfth and thirteenth embodiments, the multiple-disc clutch 51 shown in FIG. 20 or the viscous clutch 51a shown in FIG. 21 may be mounted between the input shaft 4 and the outer ring 2.

The rotation transmission device of any of the above embodiments may be mounted in the transfer of a 4WD, in which the output from the transmission is directly delivered to the rear wheel propeller shaft through its input shaft, and the engine power can be distributed to the front wheel propeller shaft through a silent chain. In the embodiments, the input ring 5 is connected to the transfer. But, the outer ring 2 may also be connected to the transfer.

As described above, by mounting the rotation transmission device, while the vehicle is being accelerated either forward or backward, all four wheels are coupled together. While the vehicle is turning a corner, "tight corner braking phenomenon" can be avoided. During engine braking, engine braking force is distributed to all four wheels. But while the ABS is on, the front and rear wheels are separated from each other, so that the ABS can perform its expected function.

Also, the inertia of the retainer is small because the retainer nonrotatably carries only the fairly lightweight clutch plate. Also, the clutch plate can produce armature friction torque twice as large as the torque produced in the arrangement of the first embodiment without increasing the capacity of the electromagnet. In the other arrangement, the sliding resistance decreases, so that the torque of the switch spring can be determined within a wider range.

Method of Control

FIG. 26 is a flowchart showing a method of turning on and off the electromagnetic clutch of the above-described rotation transmission device.

In this method, when the electromagnetic clutch control mode sets in (Step 110), the front and rear wheel rotating speed signals from the sensors and the ABS actuation signal are inputted (120) and processed (130) to determine whether the ABS is on or off (140).

If the ABS is judged to be off, the front wheel speed and the rear wheel speed are compared (150), and the difference therebetween is compared with a predetermined value (160). If the rear wheel speed is higher than the front wheel speed and the difference therebetween is greater than the predetermined value, the electromagnetic clutch is turned on (170), otherwise, the electromagnetic clutch is turned off (180).

However, operating the electromagnetic clutch based solely on the rotating speed difference between the front and rear wheels results in the following problem. If one of the rear wheels begins to slip while the vehicle accelerates sharply on a high-$\mu$ or medium-$\mu$ road, the control unit will detect a large rotating speed difference between the front and rear wheels and energize the electromagnetic clutch to lock the two-way clutch, so that the driving force is distributed to the front wheels. As soon as the two-way clutch locks, the front and rear wheels begin to rotate at the same speed, so that the electromagnetic clutch has been turned off, the two-way clutch is kept locked because the outer ring is driven by the input shaft and thus the rollers cannot return to the neutral position.

Figure 27A:
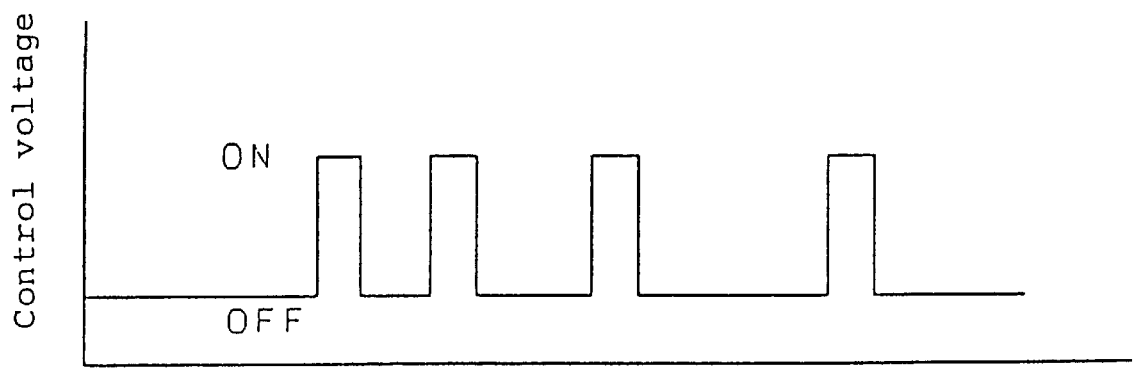
FIG. 27A and 27B are views showing the hunting phenomenon.
Figure 27B:
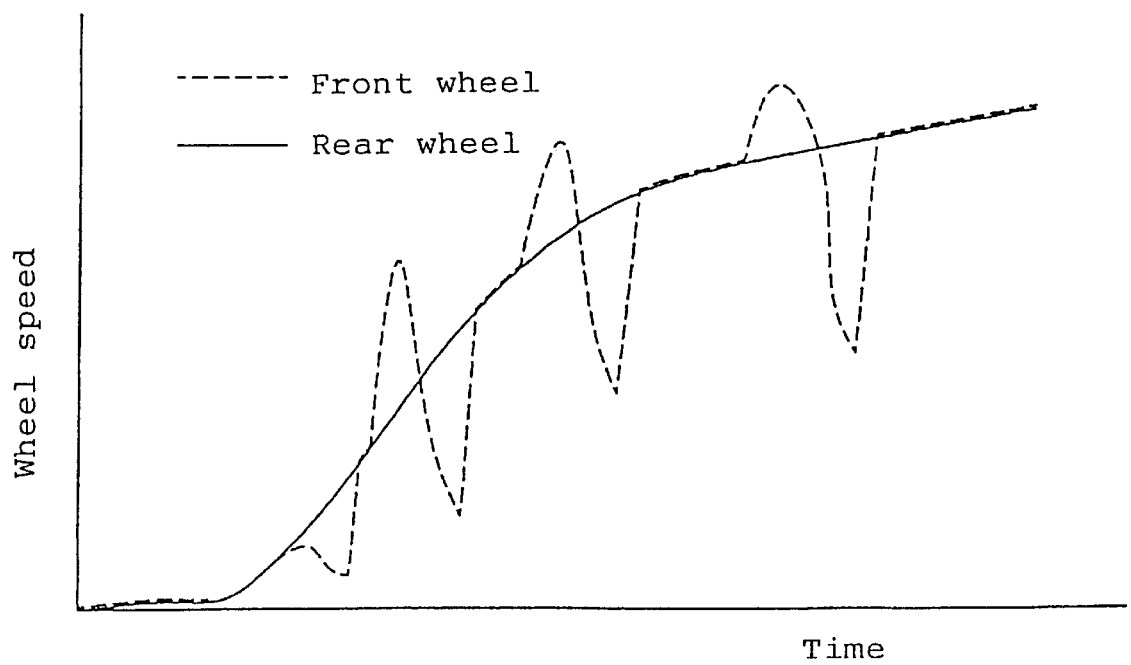

On the other hand, if one of the rear wheels begins to slip while the vehicle accelerates sharply on a low-$\mu$ road, the two-way clutch will lock in the same manner as described above. When the two-way clutch locks and the electromagnetic clutch turns off, one of the front wheels may also begin to slip, under the driving force transmitted through the two-way clutch, at a speed greater than the rear wheel speed because of the low-$\mu$ of the road (FIG. 27A, 27B). If this happens, the rollers are returned to the neutral position by the switch spring because the outer ring is rotating faster than the input shaft and thus no torque is transmitted through the rollers. When the two-way clutch disengages, the slipping front wheel is decelerated and eventually stops slipping while the rear wheel keeps slipping. When the speed difference between the front and rear wheels widens to a predetermined level, the electromagnetic clutch is turned on again, thus locking the two-way clutch again. The driving mode thus changes again to the four-wheel drive position. This cycle (called hunting) is repeated at short intervals as long as the vehicle is accelerated.

Hunting not only makes smooth vehicle acceleration difficult, but can be a cause of vehicle vibration.

FIG. 28 is a flowchart showing the second embodiment of the control method.

In this embodiment, besides comparing the front and rear wheel speed difference as in the FIG. 11 embodiment, the rotating speed of the rear wheels, which are directly connected to the engine and transmission, is differentiated (150a), and the derivative given ($\Delta$Vr) is compared with a predetermined value ($\Delta$VO) (190). If $\Delta$Vr is greater than $\Delta$VO, the electromagnetic clutch is turned on (170).

The predetermined value ($\Delta$VO) is set to the derivative of the rear wheel speed at which hunting is expected to occur.

Figure 29A:
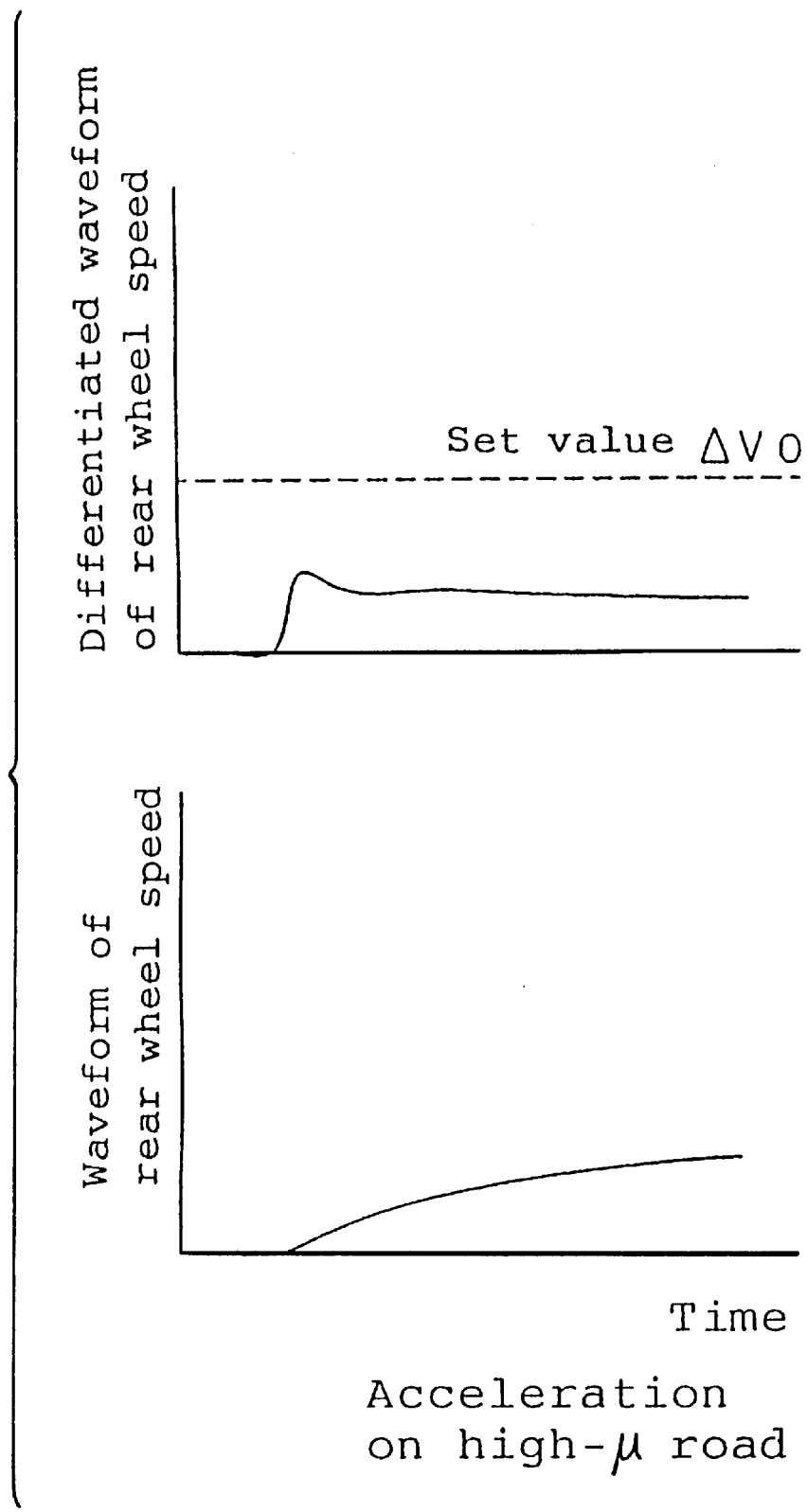
FIG. 29(a)–(c) are graphs showing waveforms of the rear wheel speeds and their differentiated versions.
Figure 29B:
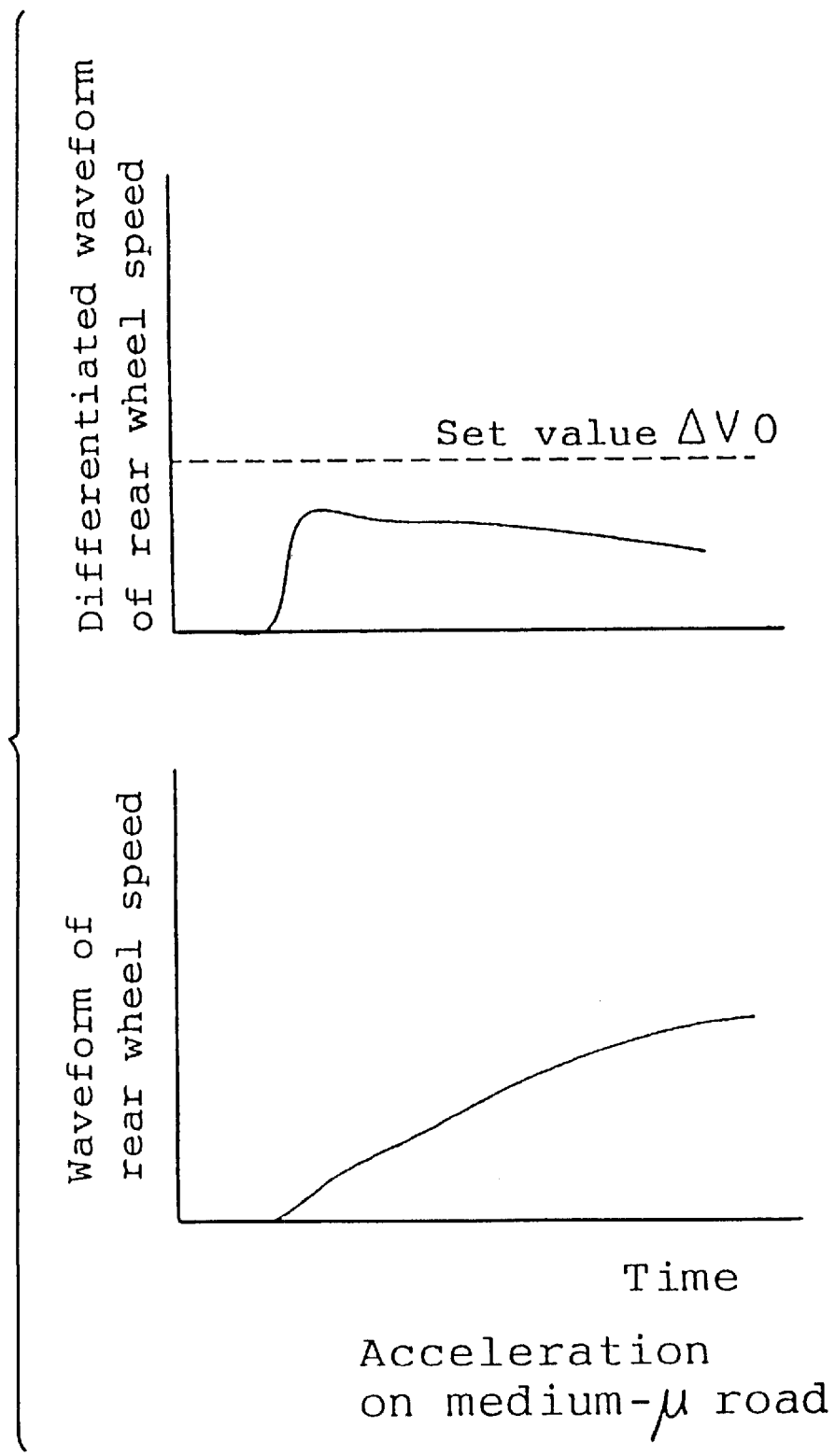
Figure 29C:
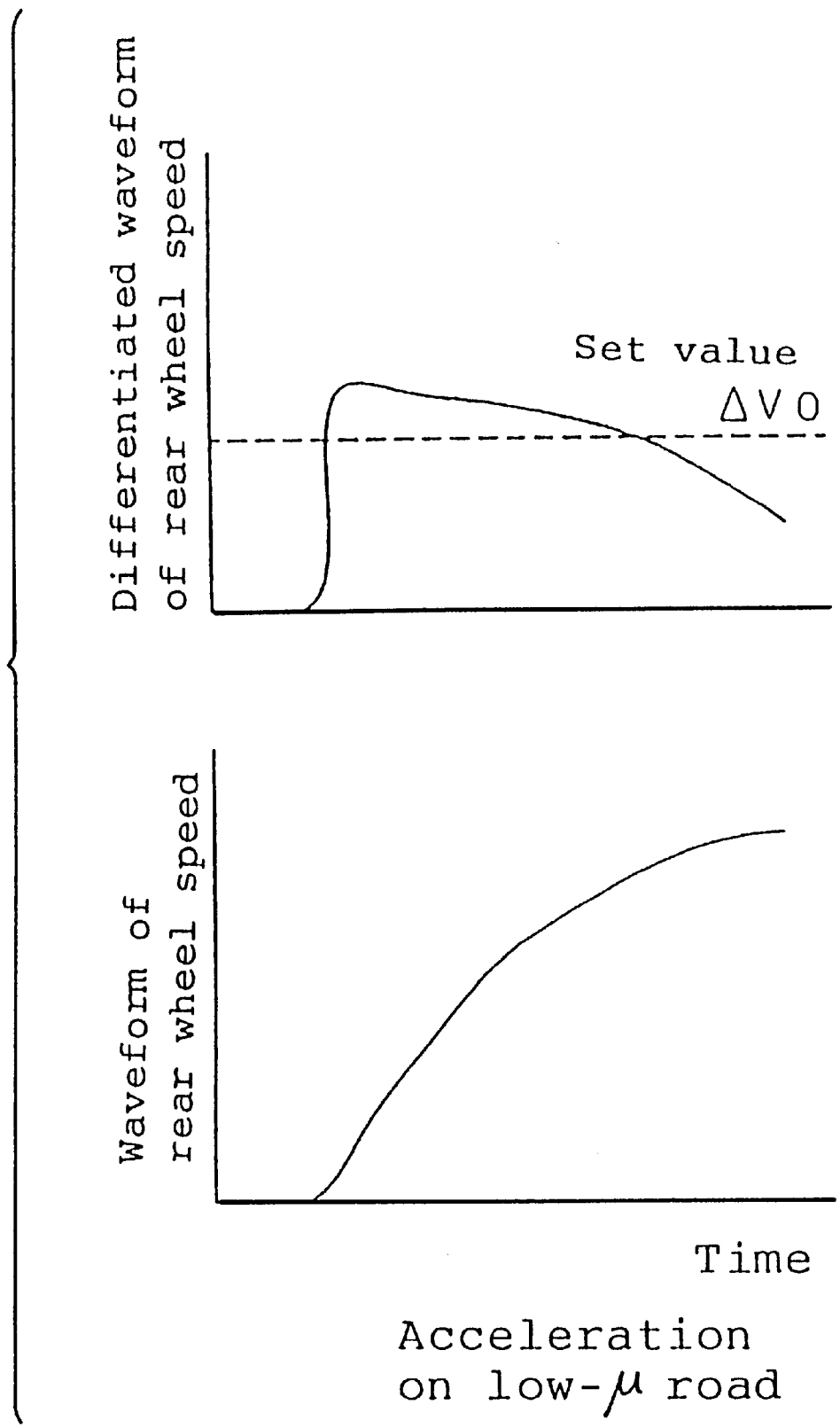

Hunting occurs when the car is started with high acceleration on a low-$\mu$ road. As shown in FIG. 29, the derivative of the rear wheel speed greatly differs from that in other road conditions (medium- to high-$\mu$ road). The predetermined value ($\Delta$VO) is thus set somewhere between these values.

In this embodiment, in determining whether to turn on or off the electromagnetic clutch, the derivative of the rear wheel speed is taken into account in addition to the difference between the front and rear wheel speeds. Thus, it is possible to lock the two-way clutch with high reliability even when the car accelerates sharply on a low-$\mu$ road. Consequently, the vehicle may accelerate smoothly while also preventing hunting.

Figure 56:
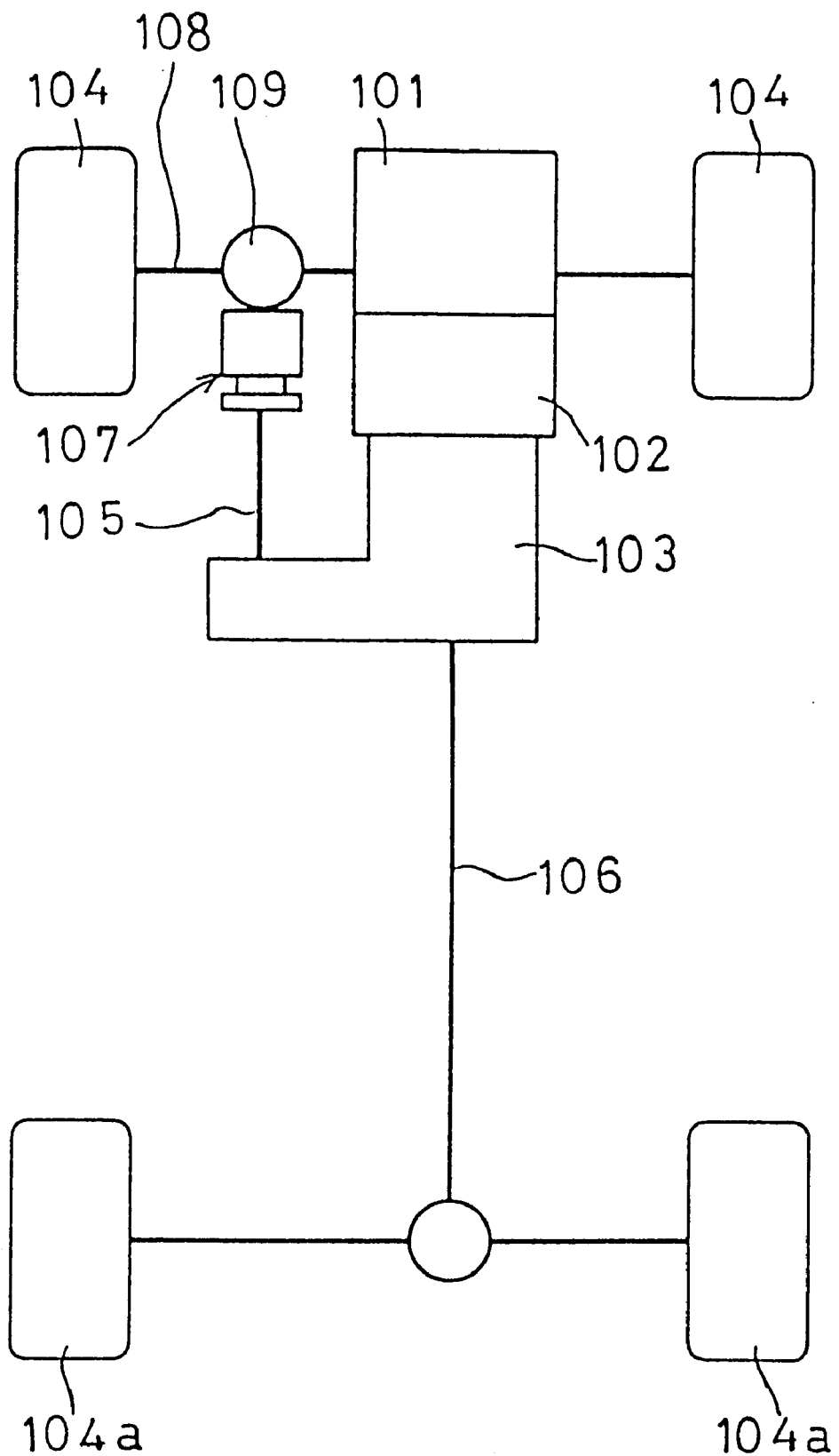
FIG. 56 is a plan view of a rotation transmission device as mounted on a vehicle.

FIG. 56 shows how the rotation transmission device as described above is mounted on a vehicle. As shown, the rotation transmission device 107 is mounted on the front propeller shaft 105 of a 4-wheel drive vehicle based on a 2-wheel drive front engine rear drive vehicle of the type in which the front and rear propeller shafts 105 and 106 branches from a transfer 103 connected to the engine 101 through the transmission 102. The rotation transmission device 107 changes over the drive mode between two-wheel and four-wheel drive positions.

In order to mount the rotation transmission device on the front propeller shaft 105, it is necessary to provide a mounting space for the rotation transmission device by reducing the length of the front propeller shaft. The shorter the front propeller shaft, the greater the joint angle between the rotation transmission device and the front propeller shaft. A large joint angle can cause vehicle vibration while traveling and make imbalance corrections of the propeller shaft 105 difficult.

Also, since the rotation transmission device is mounted on the front propeller shaft in the conventional arrangement, the front propeller shaft 105 will unnecessarily keep rotating during the two-wheel drive mode even if each front wheel has a disengaging means such as a hub clutch. That is, even if the clutch in the rotation transmission device 107 is disengaged, the front propeller shaft 105 will keep rotating, though the drive shaft 108 and the front differential 109 have stopped. This worsens fuel economy and produces vehicle vibration. In order to stop the front propeller shaft 105 during the two-wheel drive mode, it is necessary to provide an additional disengaging means such a dog clutch in the transfer 103. It is undesirable not only economically but also in other respects to providing such an additional disengaging means in addition to the disengaging means already provided in the rotation transmission device and the disengaging means already mounted on each front wheel.

Another object of this invention is to provide a rotation transmission device mounted in the transfer of a 4WD, and having a two-way clutch electrically engaged and disengaged by an electromagnetic clutch, thereby reducing vehicle vibration and improving fuel economy during two-wheel drive mode.

Next, embodiments in which a rotation transmission device is not mounted on a front propeller shaft but in a transfer of the vehicle.

Fourteenth Embodiment

FIGS. 30–40 show the fourteenth embodiment, of which FIG. 30 shows the layout of the drive train of a 4WD car including a transfer in which the rotation transmission device according to the present invention is mounted. FIG. 32 shows the detailed structure of the rotation transmission device.

As shown in FIG. 30, the rotation transmission device 112 is mounted in the transfer 103 of an FR-based 4WD vehicle having a hub clutch 110 coupled to each front wheel 104. The rotation transmission device provides the vehicle with automatic 4WD mode and locked 4WD mode besides the typical conventional 4WD modes (including 2WD, 4WD-Hi and 4WD-Lo).

Figure 31:
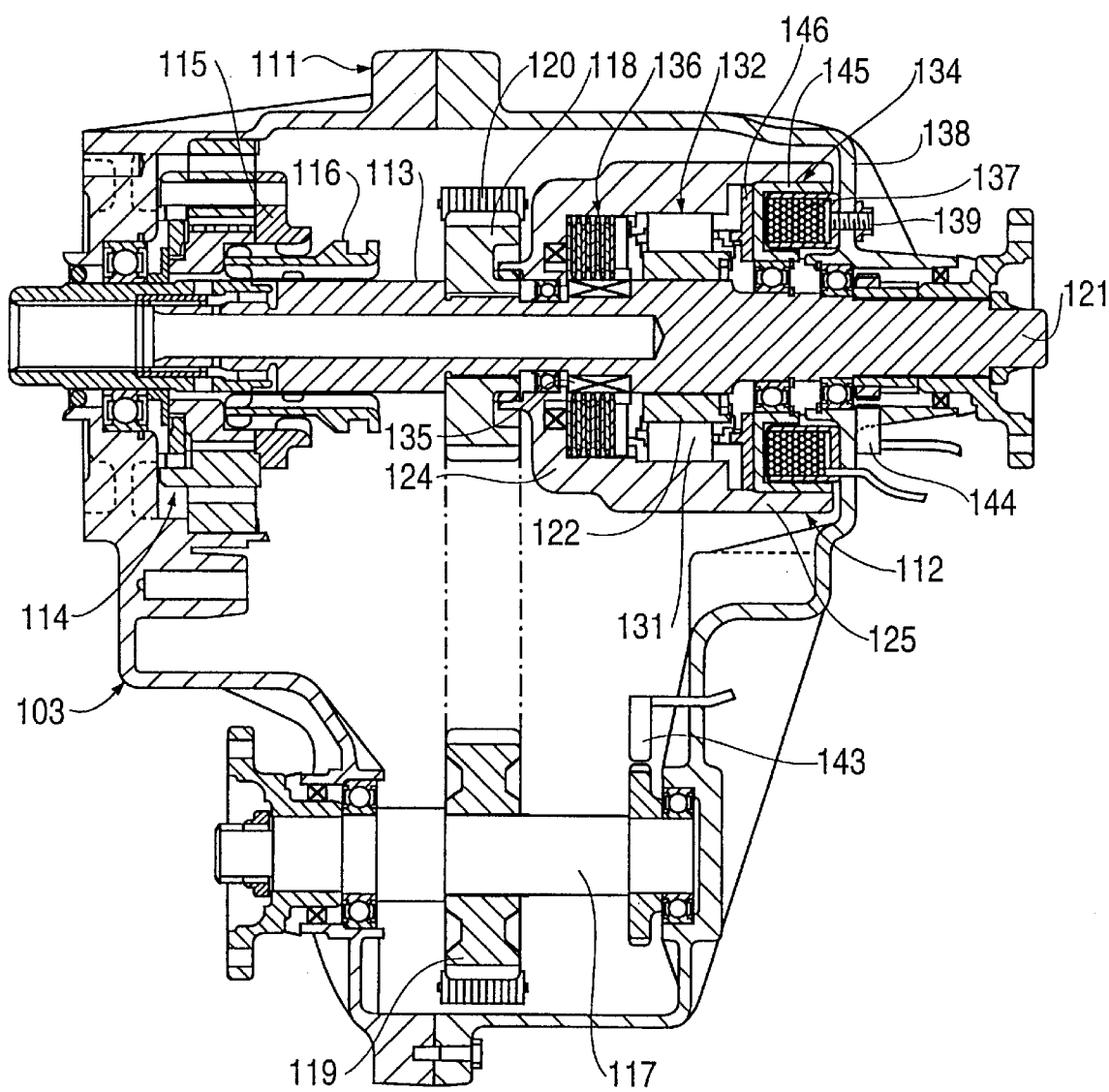
FIG. 31 is a sectional view of a transfer in which is mounted the rotation transmission device of FIG. 20.

As shown in FIGS. 30 and 31, the output of a transmission 102 coupled to the engine 101 is transmitted through the transfer 103 to the rear propeller shaft 106 and also distributed to the front propeller shaft 105.

The transfer 103 has a shaft 113 coupled to the output shaft of the transmission 102 through a high-low select gear 114. The gear 114 itself is conventional and includes a planetary gear set 115 and a slide gear 116 for gear selection. The high gear transmits the torque in a one-to-one relation, while the low gear reduces the rotation and thus increases the torque.

The shaft 113 and a front output shaft 117 connected to the front propeller shaft 105 carry sprokets or chain sprockets 118 and 119, respectively, which are coup e together by a silent chain 120. The engine power is thus distributed to the front wheels 104 through these shafts 113, 117. The drain sprocket 118 is rotatably mounted on the shaft 113 and is coupled to the shaft 113 through the rotation transmission device 112.

The rotation transmission device 112 has an input shaft 121 which is actually a portion of the shaft 113 connected to the rear propeller shaft 106. As shown in FIG. 32, a cam ring 122 as an inner member is nbnrotatably but axially slidably mounted on the input shaft 121 by serrations so as to be coaxial with the shaft 121. A housing 124 is rotatably mounted on the input shaft 121 through a bearing 123 and has a cylindrical portion as an outer ring 125 provided radially outwardly of the cam ring 122. The housing 124, coupled to the chain sprocket 118 by serrations 126, rotates together with the chain sprocket 118.

Figures 32A, 32B:
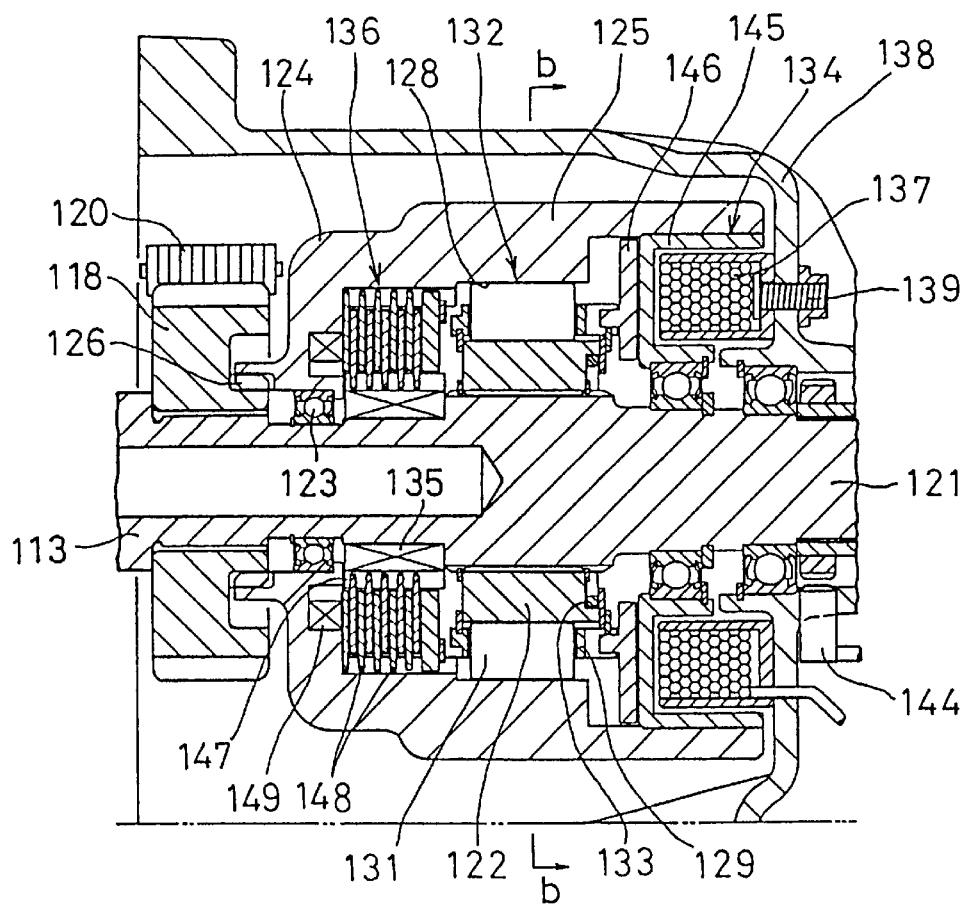
FIG. 32A is a partial enlarged sectional view of the rotation transmission device of FIG. 31.
FIG. 32B is a sectional view taken along line b—b of FIG. 32A.

As shown in FIG. 32B, a plurality of cam faces 127 are formed on the outer periphery of the cam ring 122. The outer ring 125 has a cylindrical inner face 128. Each cam face 127 and the cylindrical face 128 define wedgeshaped spaces therebetween. A retainer 129 mounted between the cam ring 122 and the outer ring 125 has pockets 130 provided opposite to the respective cam faces 127. An engaging element or roller 131 is received in each pocket 130. The outer ring 125, inner member or cam ring 122 and the rollers 131 form a two-way clutch 132.

Figure 34:
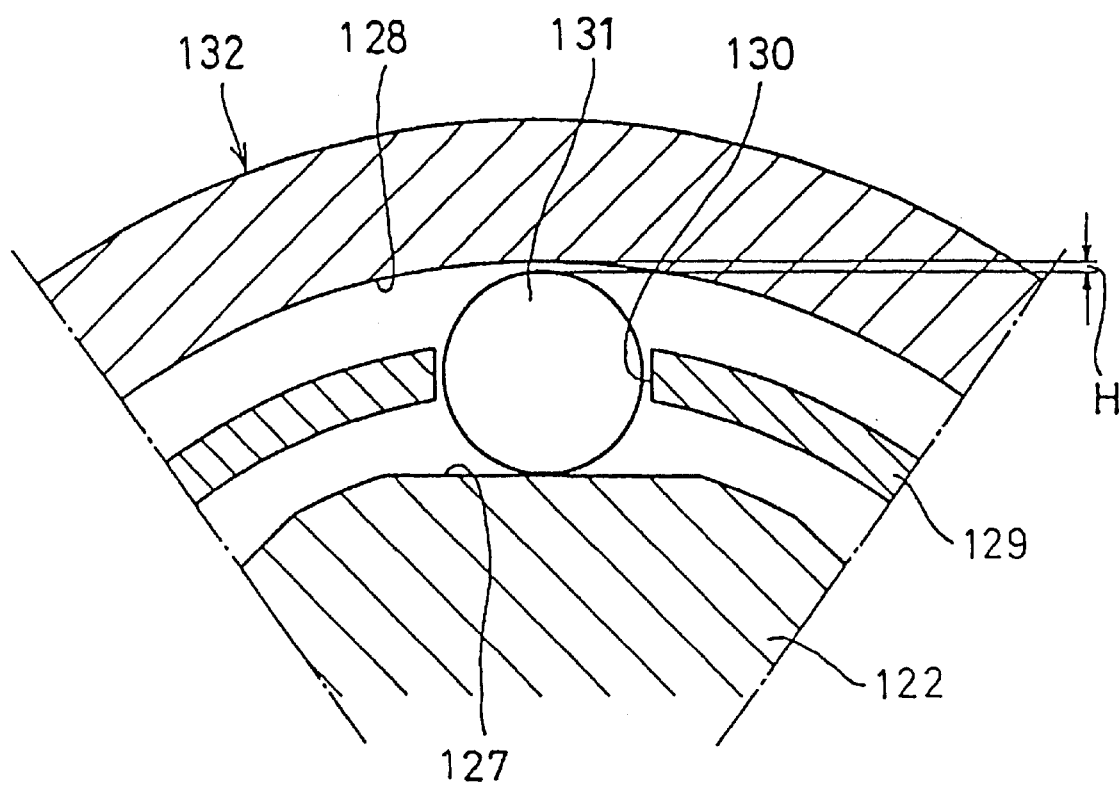
FIG. 34 is a partial enlarged sectional view of a two-way clutch in its neutral position.
Figure 37A:
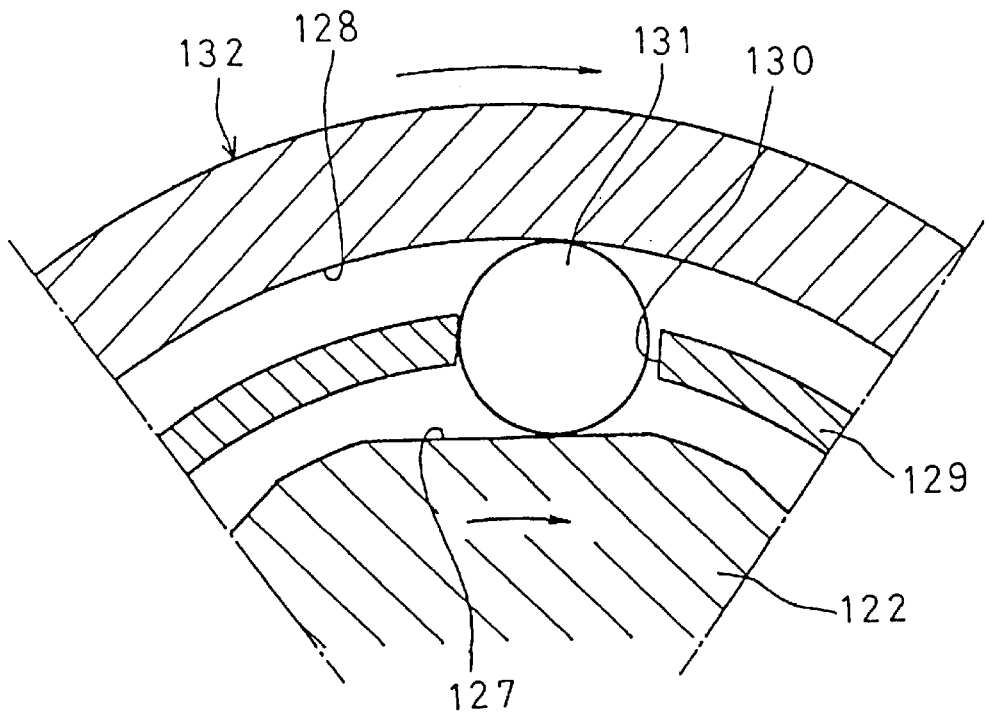
FIG. 37A and 37B are enlarged sectional views of 20 the two-way clutch in its locked position.
Figure 37B:
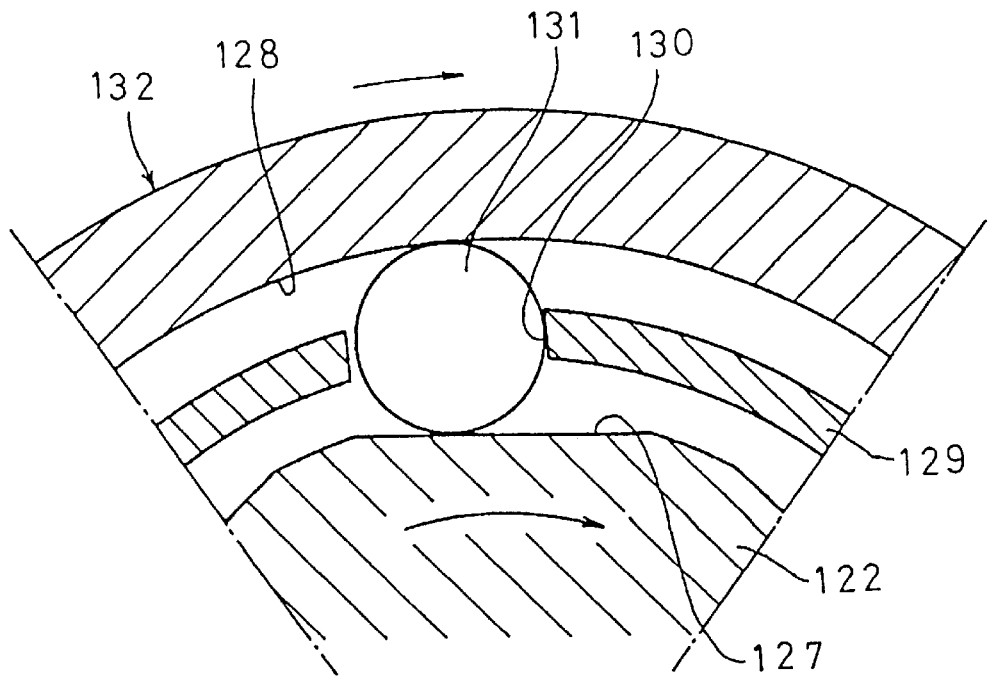

A gap H is present between each roller 131 and the cylindrical face 128 when the rollers 131 are in neutra position, i.e. the position where each roller is at the center of the cam face 127 as shown in FIG. 34. In this state, the rotation of the cam ring 122 is not transmitted to the outer ring 125. When the rollers 131 move to either side of the wedge-shaped spaces as shown in FIGS. 37A and 37B, the rollers 131 get locked between the cam faces 127 and the cylindrical face 128, thus transmitting the rotation of the cam ring 122 to the outer ring 125.

A switch spring 133 has one end thereof in engagement with the retainer 129 and the other end with the cam ring 122, thereby biasing the retainer to a neutral position where the rollers 31 do not engage the cam faces 127 or the cylindrical face 128.

Between the input shaft 121 and the outer ring 125, an electromagnetic clutch 134 for engaging and disengaging the two-way clutch 132 is provided on one side of the clutch 132, and a wet type multiple-disc clutch 136 for transmitting the rotation of the input shaft 121 to the outer ring 125 through a one-way clutch 135 is provided on the other side.

The electromagnetic clutch 134 has an electromagnetic coil 137 nonrotatably fixed to a transfer case 138 by bolts 139. The coil 137 has electrodes passing through the transfer case 138 and connected to an external controller (hereinafter ECU) 140. The ECU 140, shown in FIG. 30, receives signals indicating the rotating speeds of the front and rear wheels 104, 104a and signals from a mode selection switch 141 and an ABS ECU 142, and controls the current level supplied to the electromagnetic coil 137 based on these signals. The rotating speeds of the front wheels 104 and the rear wheels 104a are detected by a front wheel speed sensor 143 and a rear wheel speed sensor 144, respectively (FIG. 30).

As a friction flange, a rotor 145 is fixedly mounted on the outer ring 125 so as to be rotatable relative to the electromagnetic coil 137. Between the rotor 145 and one end of the retainer 129, an armature 146 is nonrotatably but axially slidably mounted on the retainer 129 with a suitable gap defined between the armature 146 and the rotor 145. When the electromagnetic coil 137 is energized, the armature 146 is magnetically attracted to the rotor 145, so that the outer ring 125 and the retainer 129 are relatively nonrotatably coupled together.

The wet type multiple-disc clutch 136 includes a plurality of inner plates 147 nonrotatably but axially slidably mounted relative to the one-way clutch 135, a plurality of outer plates 148 nonrotatably but axially slidably mounted relative to the outer ring 125 and arranged alternately with the inner plates 147, and a spring 149 provided at one end of the clutch 136 and pressing the plates 147, 148 against each other. The one-way clutch 135 disengages when the input shaft 121 rotates, relative to the outer ring 125, in the same direction in which the vehicle wheels rotate when the vehicle is moving forward.

Now referring to FIGS. 33, 36, 38 and 39, the operation of the fourteenth embodiment is described.

Figure 33A:
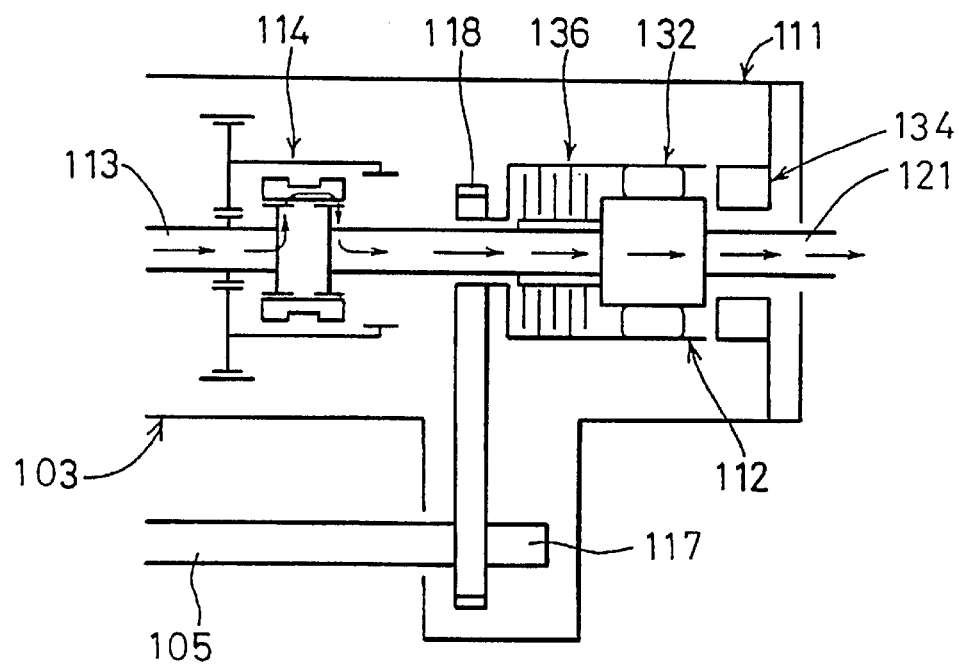
FIG. 33A is a view of the rotation transmission device, showing how the driving force is transmitted while the vehicle is moving forward with the driving mode in 2WD position.

FIG. 33A shows the power transmission path while the vehicle is moving forward in a two-wheel drive mode. Engine power is transmitted through the transmission and the high gear of the high-low select gear train 114 to the input shaft 121 of the rotation transmission device 112. Since the one-way clutch 135 is disengaged in this state for the above-described reason, the wet type multiple-disc clutch 136 is disconnected from the input shaft 121.

When the mode select switch 141 is in the two-wheel drive mode, the electromagnetic coil 137 is deenergized, so that the two-way clutch 132 is held in the neutral position shown in FIG. 34. The input shaft 121 is thus disconnected from the outer ring 125.

In this state, no engine force is delivered to the outer ring 125 and thus the front wheel drive train. Since the hub clutches 110 are also disengaged during the two-wheel drive mode, the front propeller shaft 105, front differential 109 and drive shaft 108 do not rotate (FIG. 35).

Figure 33B:
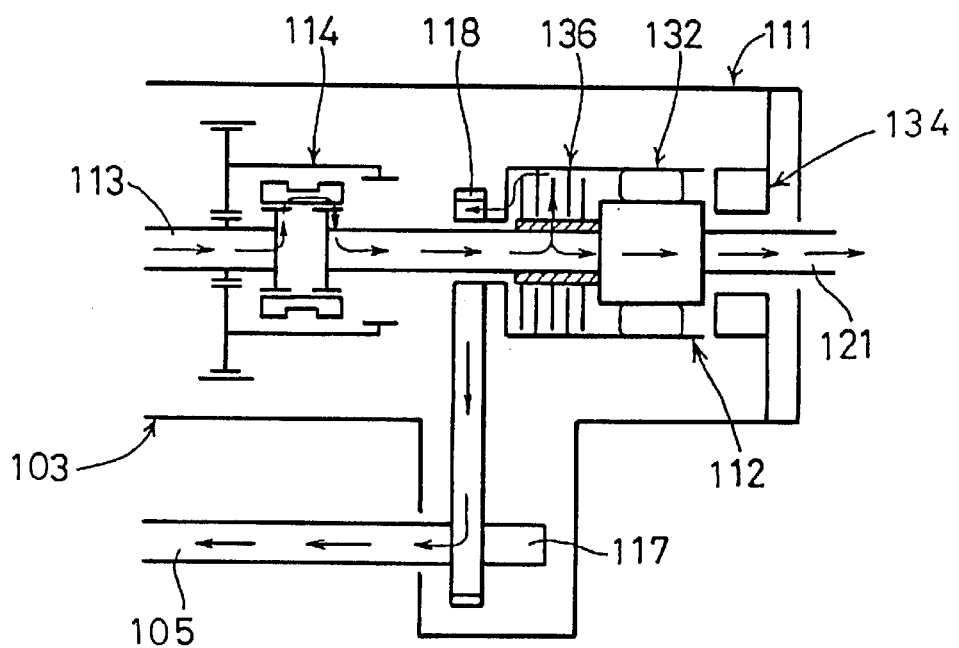
FIG. 33B is a view similar to FIG. 33A while the vehicle is backing with the driving mode in 2WD position.

FIG. 33B shows the power transmission path while the vehicle is backing in two-wheel drive mode. In this state, the input shaft 121 is rotating in the reverse direction, so that the one-way clutch 135 locks. The input shaft 121 and the outer ring 125 are thus coupled together by the torque (Tmp) of the wet type multipledisc clutch 136, so that the front propeller shaft 105 is rotated by the engine. The two-way clutch 32 maintains the position of FIG. 34 while the vehicle is backing as well as moving forward. But the engine torque is not delivered to the front wheels 104 in this state because the hub clutches 110 are disengaged. Although the front propeller shaft and other associated parts are rotated in this state, there will be no major influence on the fuel economy, nor will in vibration problems occur because the car is most ordinarily backed only for a very short time.

Figure 36A:
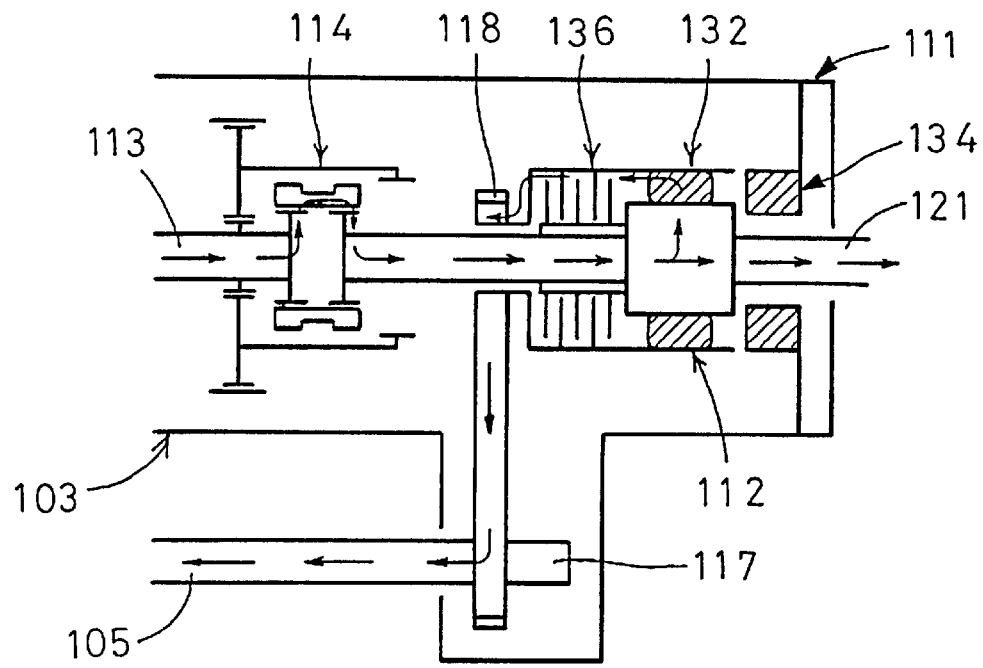
FIG. 36A is a view of the rotation transmission device, showing how the driving force is transmitted while the vehicle is moving forward with the driving mode in 4WD-Hi position.
Figure 36B:
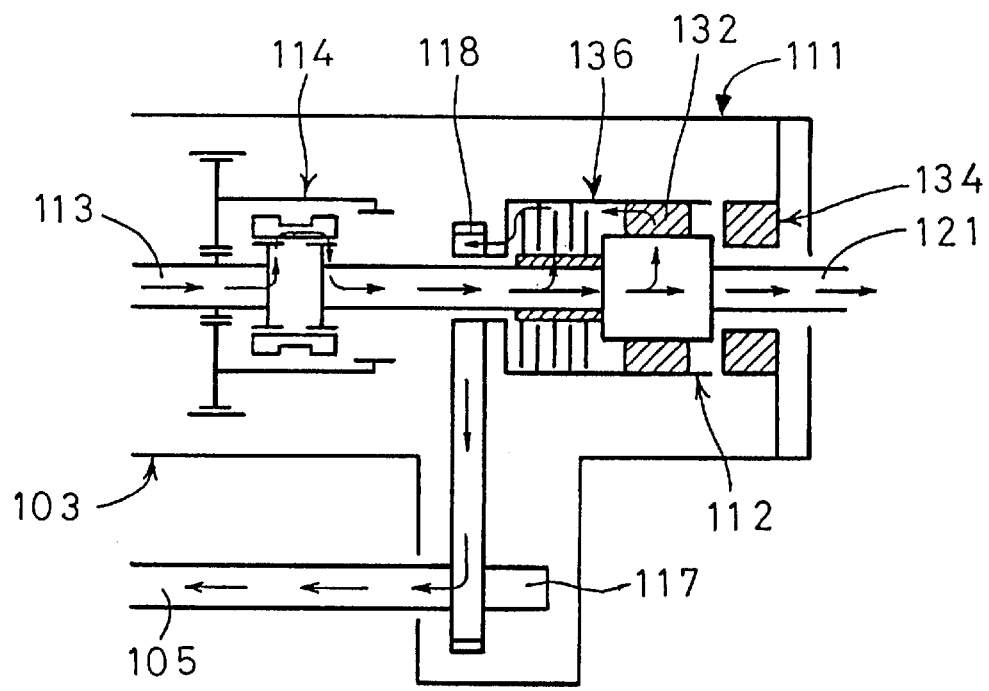
FIG. 36B is a view of the rotation transmission device, showing how the driving force is transmitted while the vehicle is backing with the driving mode in 4WD-Hi position.

While the vehicle is moving forward and backward with the drive mode in 4WD-Hi range locking position, engine power is distributed as shown in FIG. 36A and 36B, respectively. While the mode select switch 141 is in the locking position, the electromagnetic coil 137 is energized continuously, so that the two-way clutch 32 is held in the position shown in FIG. 37A or 37B. In the position of FIG. 37A, the retainer 129 and the outer ring 125 are pressed against each other by the electromagnetic coil 137. Thus, when the input shaft 121 and the outer ring 125 tend to rotate relative to each other, the rollers 131 lock therebetween. The engine power transmitted from the transmission 103 through the high gear of the high-low select gear train 114 is thus distributed to the front wheels by the two-way clutch 132 of the rotation transmission device 112. All four wheels are now mechanically coupled together into 4WD.

Figure 38A:
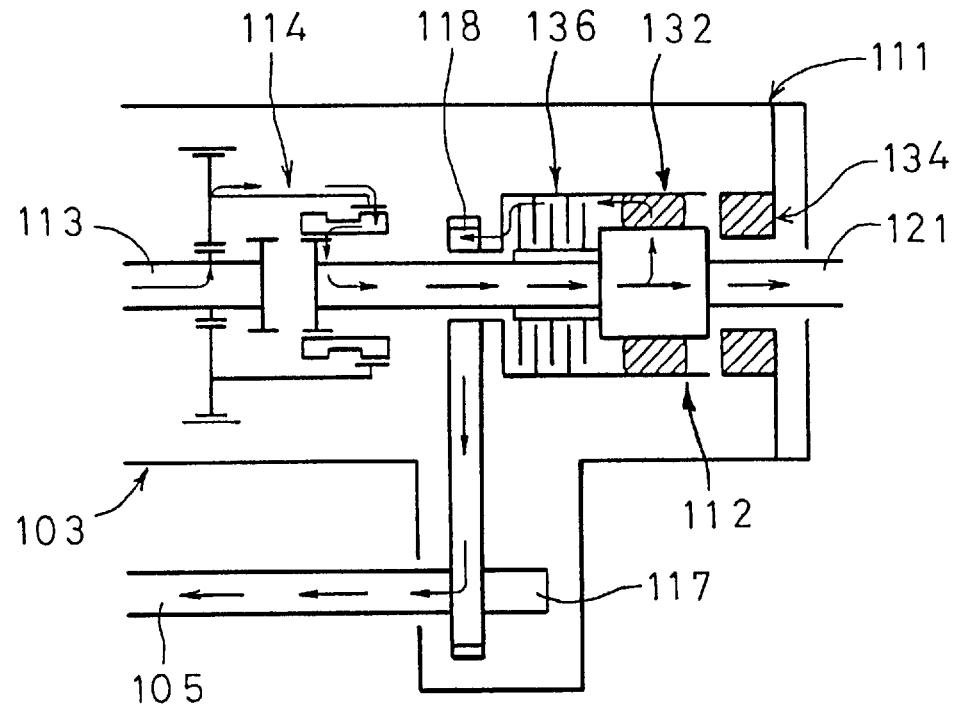
FIG. 38A is a view showing how the driving force is transmitted while the vehicle is moving forward with the driving position in 4WD-Lo position.
Figure 38B:
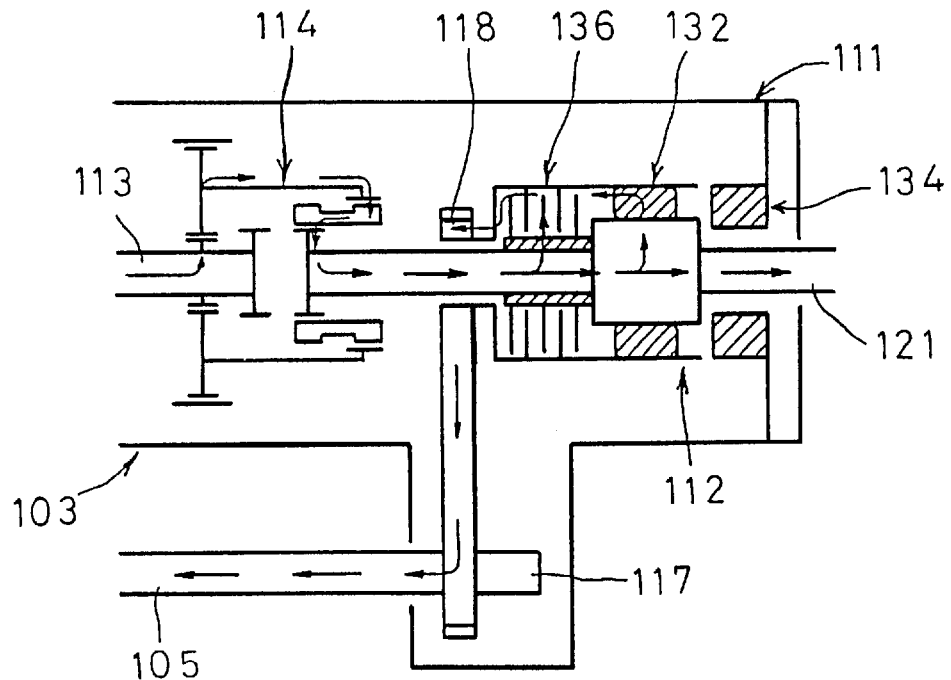
FIG. 38B is a view showing how the driving force is transmitted while the vehicle is backing with the driving position in 4WD-Lo position.

FIGS. 38A and 38B show how the engine power is distributed while the vehicle is moving forward and backward, respectively, with the drive mode in 4WD-Lo range locking position. Except that the engine power is transmitted through the low gear of the high-low select gear train 114, the operation of the rotation transmission device 112 in the 4WD-Lo position is the same as in the 4WD-Hi position.

The control mode is now described. In the control mode, the power is transmitted through the high gear of the high-low select gear train 114 to the input shaft of the rotation transmission device 112.

Figure 39A:
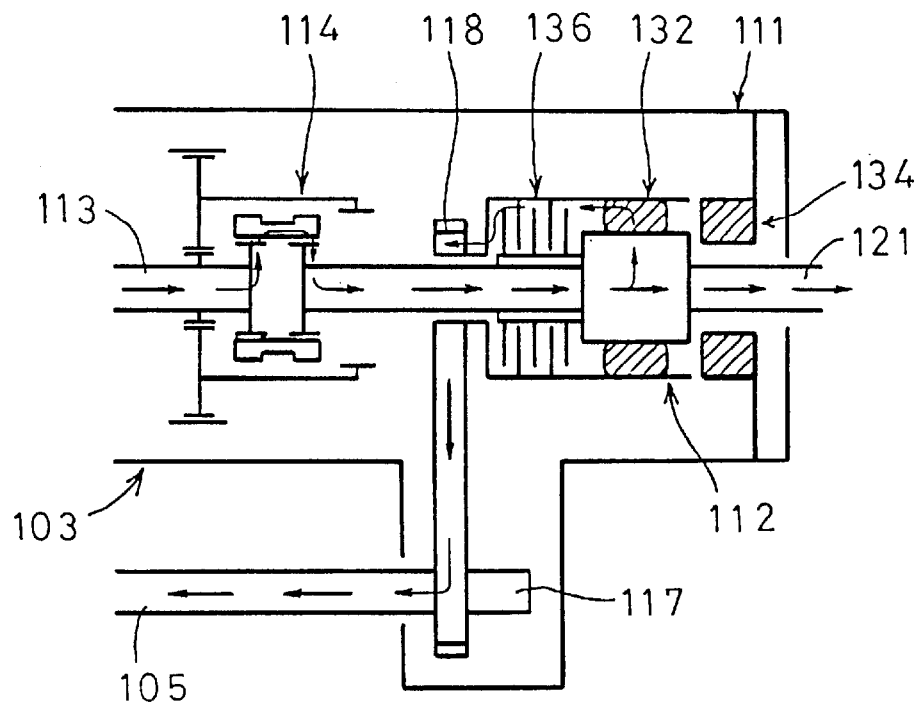
FIG. 39A is a view showing how the driving force is transmitted while the vehicle is being accelerated forward with the driving position in 4WD control position.

FIG. 39A shows how the engine power is distributed while the vehicle is accelerated forward in the control mode. If, in this state, one of the rear wheels slips e.g. while the vehicle accelerates on a slippery road and the rotating speed of this rear wheel 104a (and the input shaft) exceeds that of the front wheels 104 (outer ring) by a predetermined value, the electromagnetic coil 137 is energized. The two-way clutch 132 thus locks, so that the engine power is transmitted through the clutch 132 to the front wheels 104.

Figure 39B:
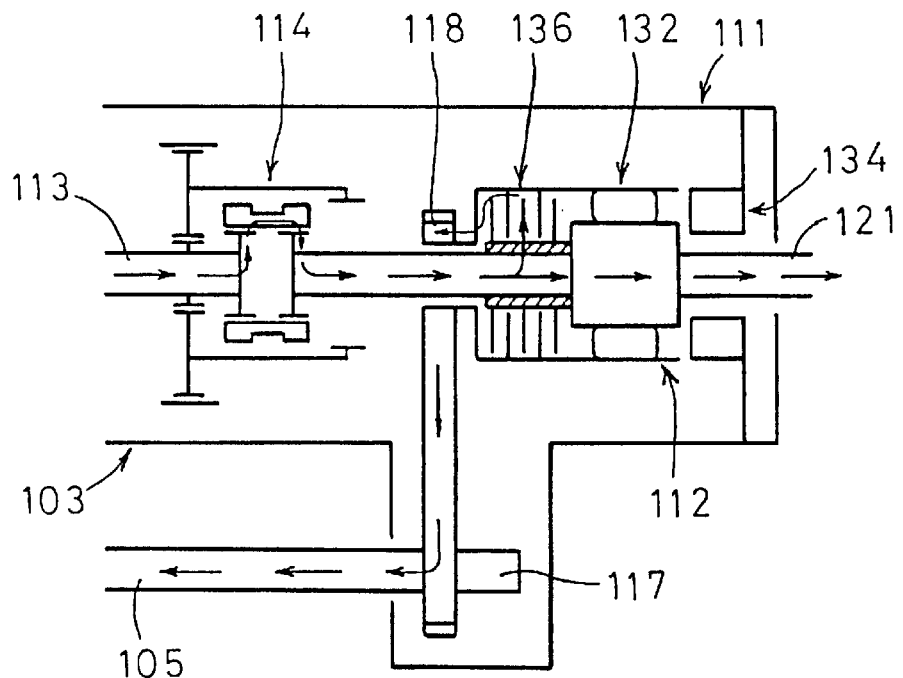
FIG. 39B is a view showing how the driving force is transmitted while the vehicle is being decelerated while traveling forward with the driving position in 4WD control position.

FIG. 39B shows how the engine power is distributed in the control mode while the vehicle is traveling forward at a constant speed, accelerated forward, or moving forward while turning a corner. While the vehicle is moving forward at a constant speed, the front and rear wheels are rotating at substantially the same speed. That is, the speed difference between the front and rear wheels are within the above predetermined value, so that the electromagnetic coil 137 remain deenergized, keeping the two-way clutch 132 free. The engine power is thus not delivered to the front wheels 104.

While the vehicle is decelerated by engine braking, the rotating speed of the rear wheels (input shaft), which is directly coupled to the engine, drops below that of the front wheels 104 (outer ring). In this state, the electromagnetic coil 137 is kept deenergized, so that the two-way clutch 132 is kept free. But the one-way clutch 135 engages as far as the front wheels are rotating faster than the rear wheels while the vehicle is moving forward. Thus, in this state, the torque (about 3–6 kgfm) of the wet type multiple-disc clutch 136 is transmitted to the front wheels 104, decelerating them. Torque on this order is enough to prevent the rear wheels 104a from slipping when the engine brake is applied while the car is travelling on a slippery road such as a snow-covered road.

While the car is turning a corner, too, the front wheels rotate faster than the rear wheels. Thus, the torque of the wet type multiple-disc clutch 136 is transmitted to the front wheels, reducing the speed difference between the front and rear wheels. But such small torque will not cause tight corner braking phenomenon.

Figure 40A:
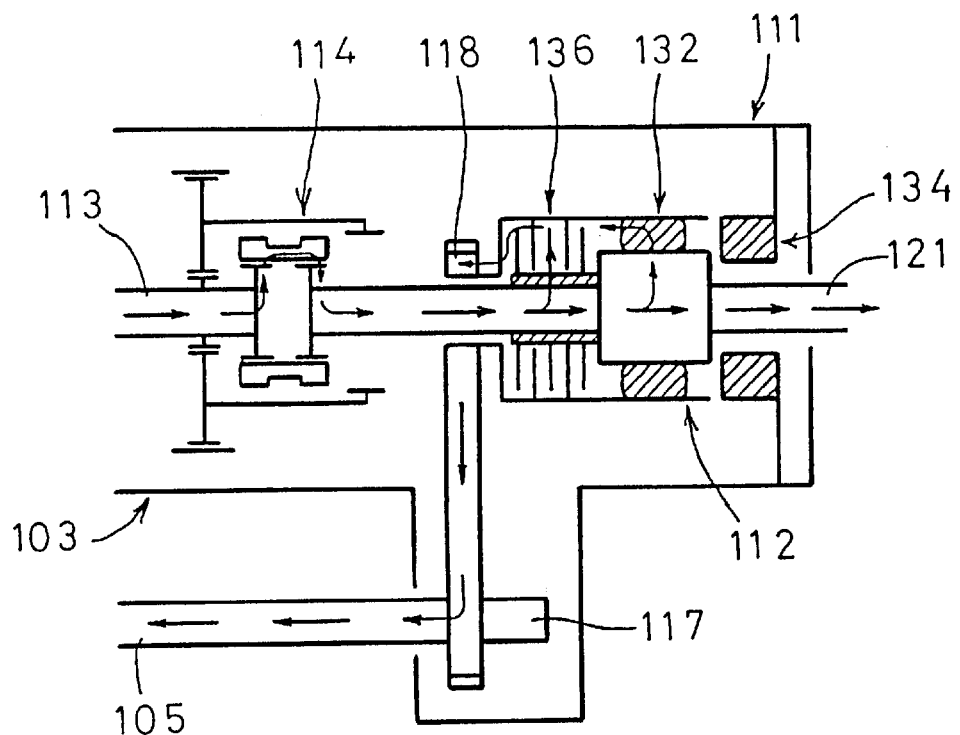
FIG. 40A is a view showing how the driving force is transmitted while the vehicle is being accelerated backward with the driving position in 4WD control position.

FIG. 40A shows how the engine force is distributed while the car is accelerated backward in the control mode. If the vehicle accelerates on a slippery road, the rear wheel speed may exceeds the front wheel speed in the same way as when the vehicle accelerates forward. The two-way clutch 132 thus locks, transmitting torque to the front wheels.

Figure 40B:
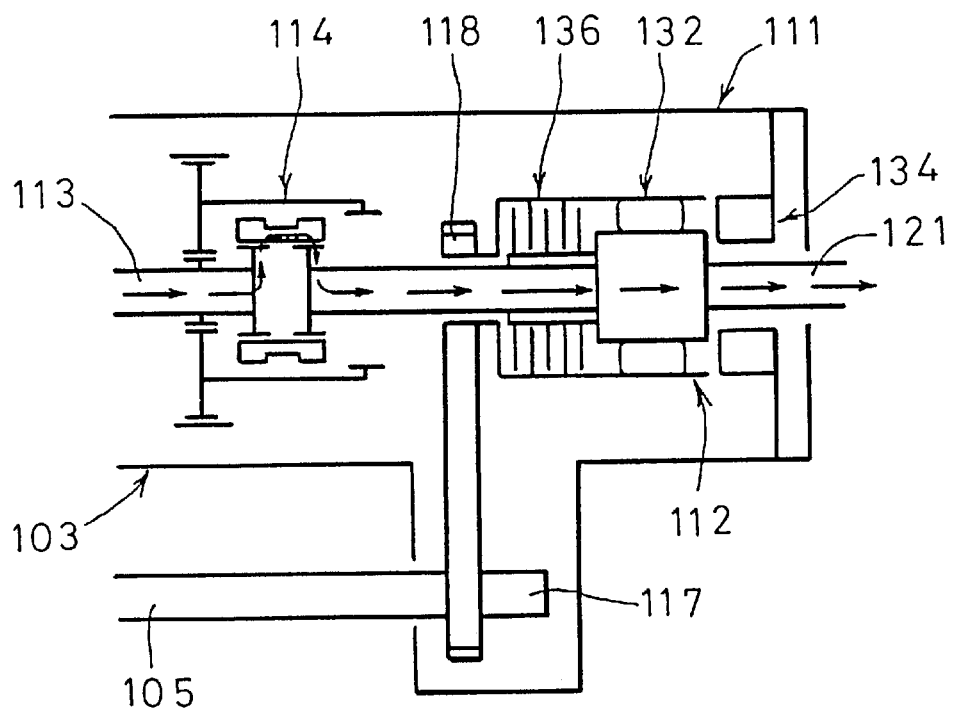
FIG. 40B is a view showing how the driving force is transmitted while the vehicle is being decelerated while traveling backward with the driving position in 4WD control position.

FIG. 40B shows how the engine power is distributed in the control mode while the vehicle is backing at a constant speed, accelerated backward, or moving backward while turning a corner.

While the vehicle is backing at a constant speed, the front and rear wheels are rotating at substantially the same speed. That is, the speed difference between the front and rear wheels are below the abovementioned predetermined value, so that the electromagnetic coil 137 remains deenergized, keeping the two-way clutch 132 free. The engine power is thus not delivered to the front wheels 104.

While the vehicle decelerates during backing by engine braking, the rotating speed of the rear wheels 104a (input shaft), which is directly coupled to the engine, drops below that of the front wheels 104 (outer ring). The one-way clutch 135 mounted between the input shaft 121. In addition, the wet type multiple-disc clutch 136 is adapted to disengage when the rotating speed of the input shaft 121 drops below that of the outer ring (to which are connected the outer plates of the wet multiple-disc clutch) while the vehicle is backing. Thus, in this state, the engine power is not delivered to the front wheels. That is, during the control mode, engine braking torque is not transmitted to the front wheels 104 only while the vehicle is backing. But this will pose no practical problem because the engine brake is rarely needed while the car is backing. That is, while the car is backing, its speed is significantly low, so that the foot brakes alone will be enough.

When the car is backing while turning a corner, the front wheels rotate faster than the rear wheels, as when the engine brake is being applied. In this state, both the two-way clutch 132 and the one-way clutch 135 disengage, so that the engine power is not transmitted to the front wheels. Hence no tight corner braking problem occurs.

When the antilock brake system (ABS) is turned on, the ABS actuation signal is sent to the ECU. In response, the ECU deenergizes the electromagnetic coil 137 in the rotation transmission device 112, thus disengaging the two-way clutch 132 (as shown in FIG. 34). In this state, only the torque (3–6 kgfm) of the wet type multiple-disc clutch 136 is distributed to the front wheels. Such small torque will not have any significant influence on the function of the ABS.

That is, during the control mode, enough driving force is transmitted to the front wheels through the two-way clutch as far as the car is being accelerated either forward or backward. But if the vehicle speed is constant, the engine brake is being applied, or the ABS is on, the torque of the wet type multiple-disc clutch 136 is transmitted to the front wheels 104 only while the car is moving forward.

The torque of the wet type multiple-disc clutch 136 is large enough to distribute engine braking torque to the front wheels but small enough not to cause tight corner braking problem.

In this or any subsequent embodiment, the wet type multiple-disc clutch 136 of the rotation transmission device 112 may be omitted. In this case, if the rear wheel speed sensor detects any imminent lockup tendency of one or both rear wheels, the two-way clutch 132 is locked.

Fifteenth Embodiment

Figure 41:
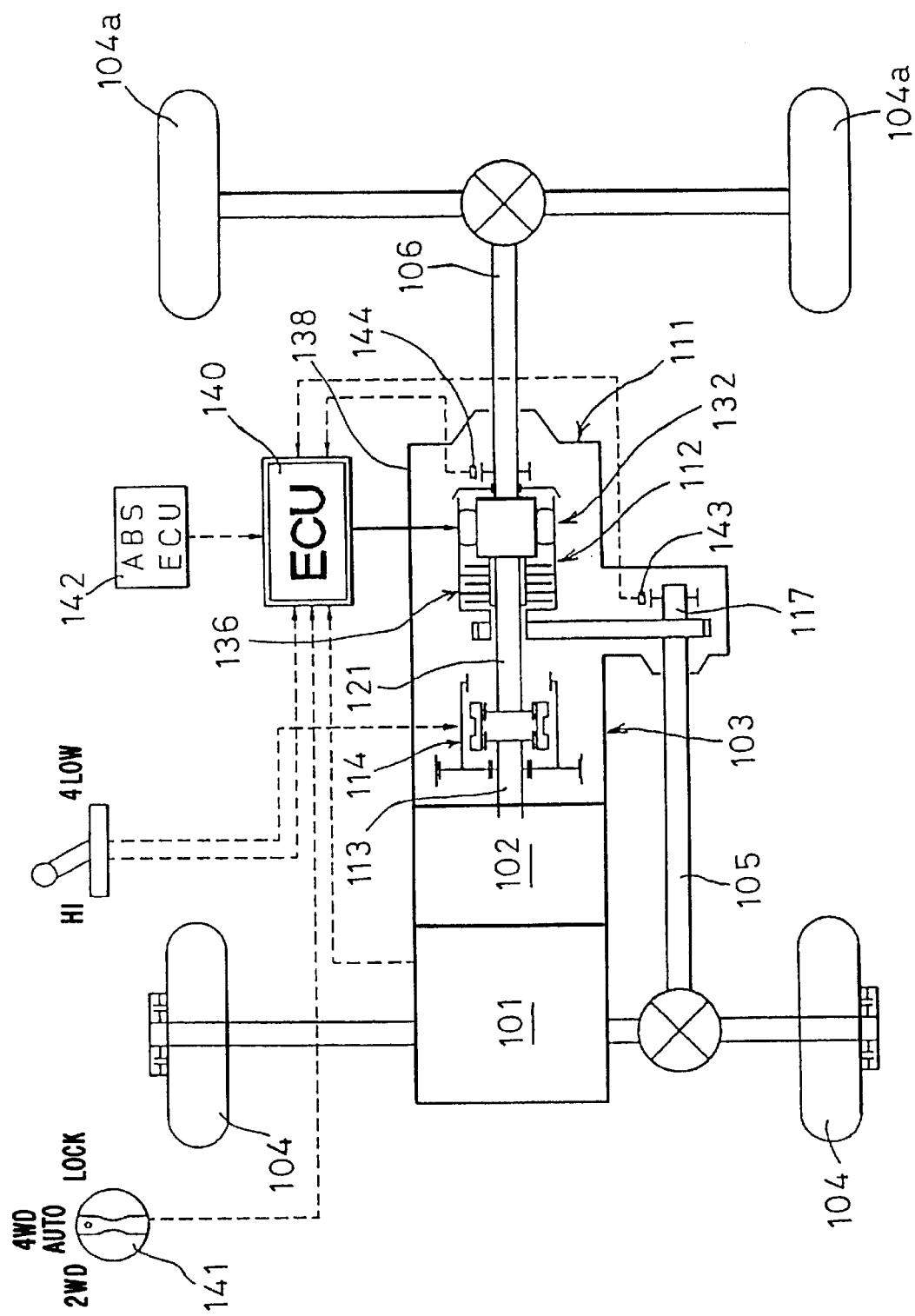
FIG. 41 is a plan view showing the layout of a 4WD vehicle on which is mounted a rotation transmission device of the fifteenth embodiment.
Figure 42:
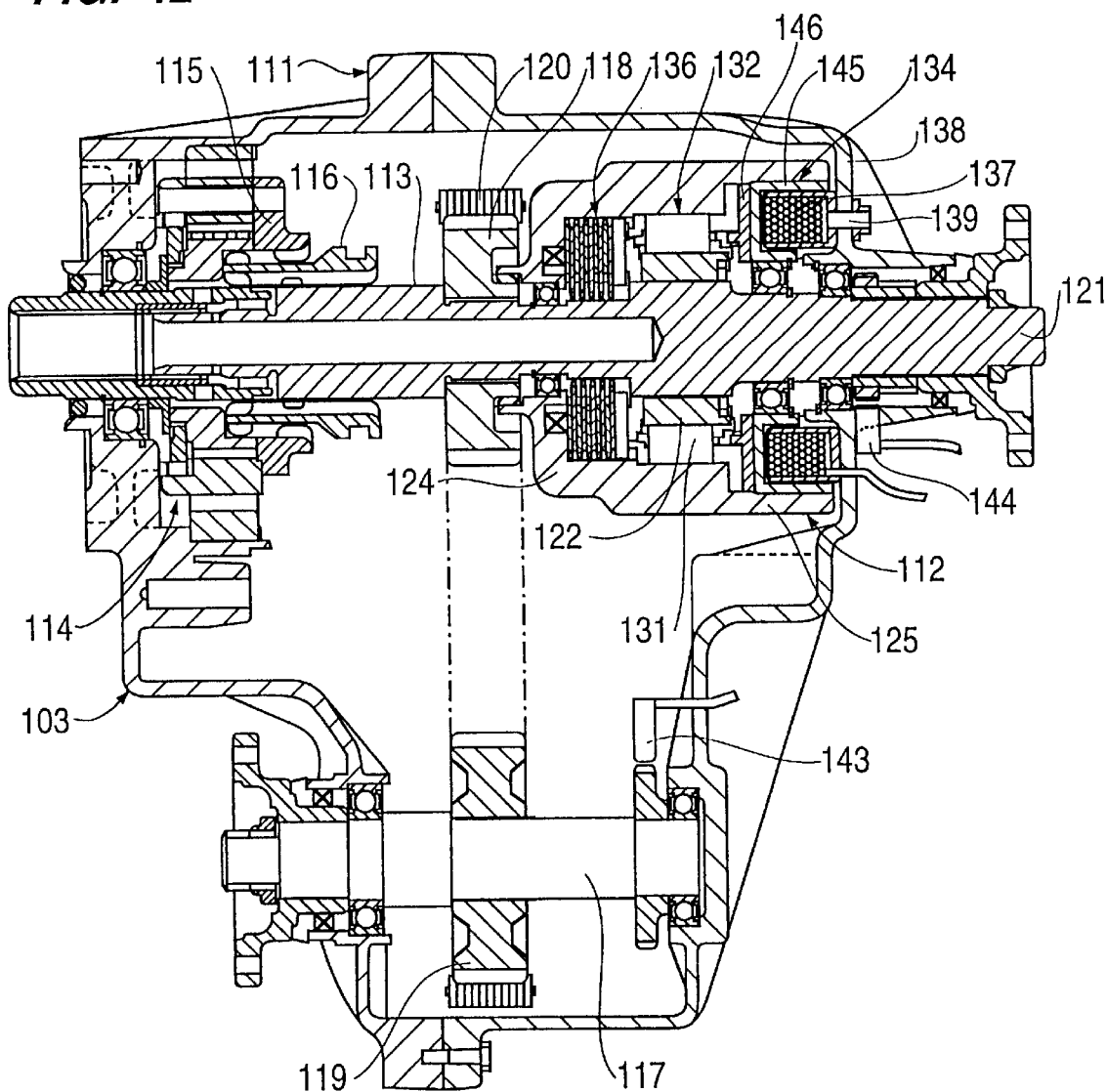
FIG. 42 is a sectional view of a transfer in which is mounted the rotation transmission device of the fifteenth embodiment.

FIGS. 41 and 42 show a fifteenth embodiment of the rotation transmission device, which is mounted on a 4WD. The fifteenth embodiment is, for economical reasons, not equipped with hub clutches or any other means for disconnecting the front differential 109 and the propeller shaft 105 from the front wheels during two-wheel drive mode.

FIG. 42 shows a section of the transfer. Unlike the fourteenth embodiment, it is not necessary to provide a one-way clutch as used in the first embodiment between the wet type multiple-disc clutch 136 and the input shaft 121. The rotation transmission device 112 of this embodiment is controlled and operates in substantially the same way as the fourteenth embodiment, except that the front wheel drive train keeps rotating even during two-wheel drive mode. In this arrangement, frictional torque produced by the wet type multiple-disk clutch 136 due to the relative rotation between the input shaft 121 (rear wheels) and the outer ring 125 (front wheels) is continuously distributed to the front wheels 104. But such torque is so small that this state is practically identical to the two-wheel drive mode.

Sixteenth Embodiment

Figure 43:
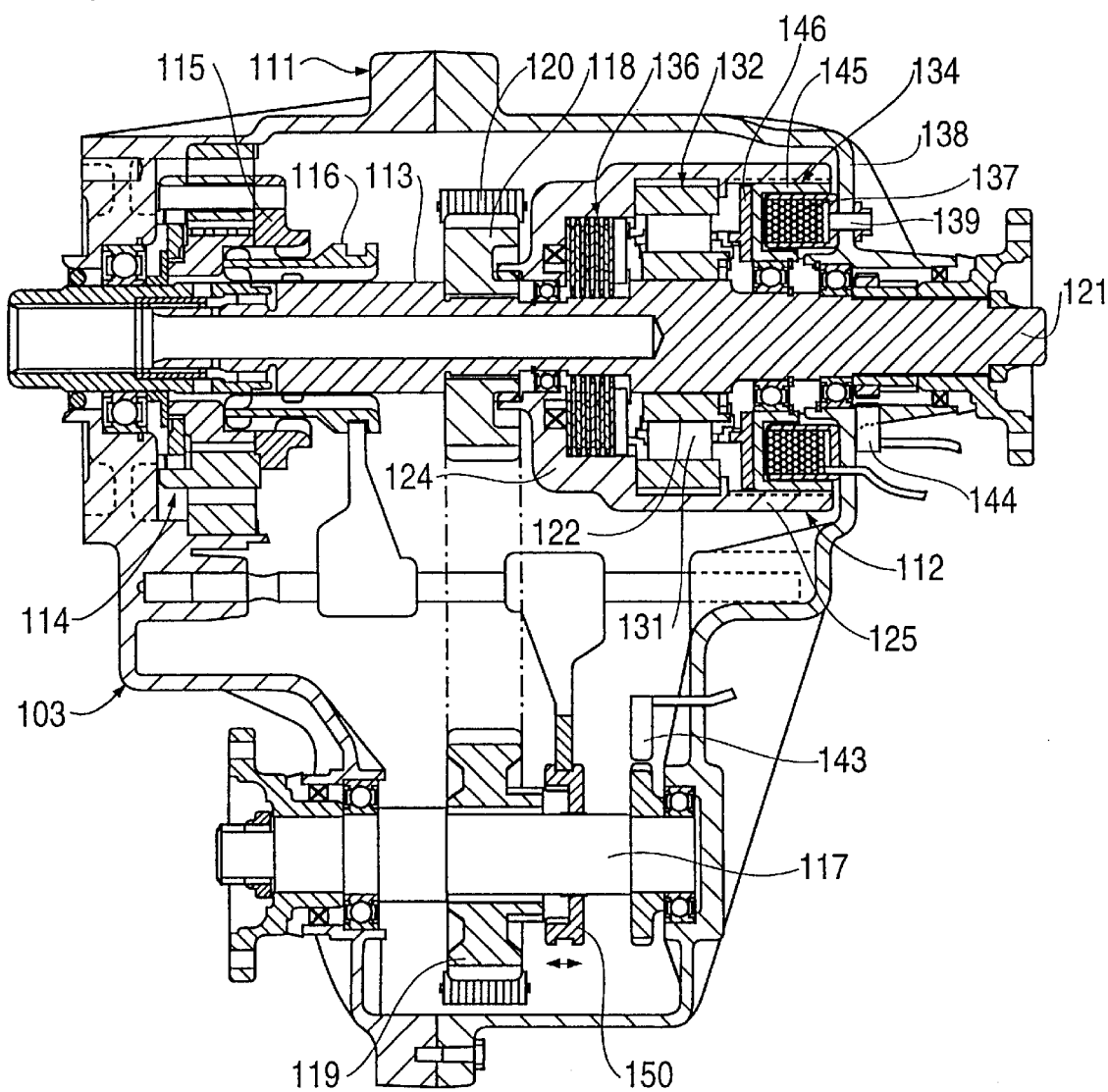
FIG. 43 is a sectional view of a transfer in which is mounted a rotation transmission device of the sixteenth embodiment.

FIG. 43 is a section of a transfer which is the sixteenth embodiment of the rotation transmission device. In the fourteenth embodiment, the front propeller shaft 105 is rotated during the two-wheel drive mode though only while the vehicle is backing. In the sixteenth embodiment, in order to prevent this problem, a dog clutch 150 is provided between the front output shaft 117 and the front sprocket 119. When the driver selects the two-wheel drive mode, the dog clutch 150 is adapted to disengage, so that the torque produced by the wet type multipledisc clutch 136 of the rotation transmission device 112 is not at all transmitted to the front propeller shaft 105 and thus to the front wheels 104. In the sixteenth embodiment, the one-way clutch-used in the fourteenth embodiment is not necessary.

During the four-wheel drive mode (locking mode or control mode), the dog clutch 150 is in engagement. In this state, the rotation transmission device is controlled and operates in the same way as the fifteenth embodiment.

Seventeenth Embodiment

Figure 44:
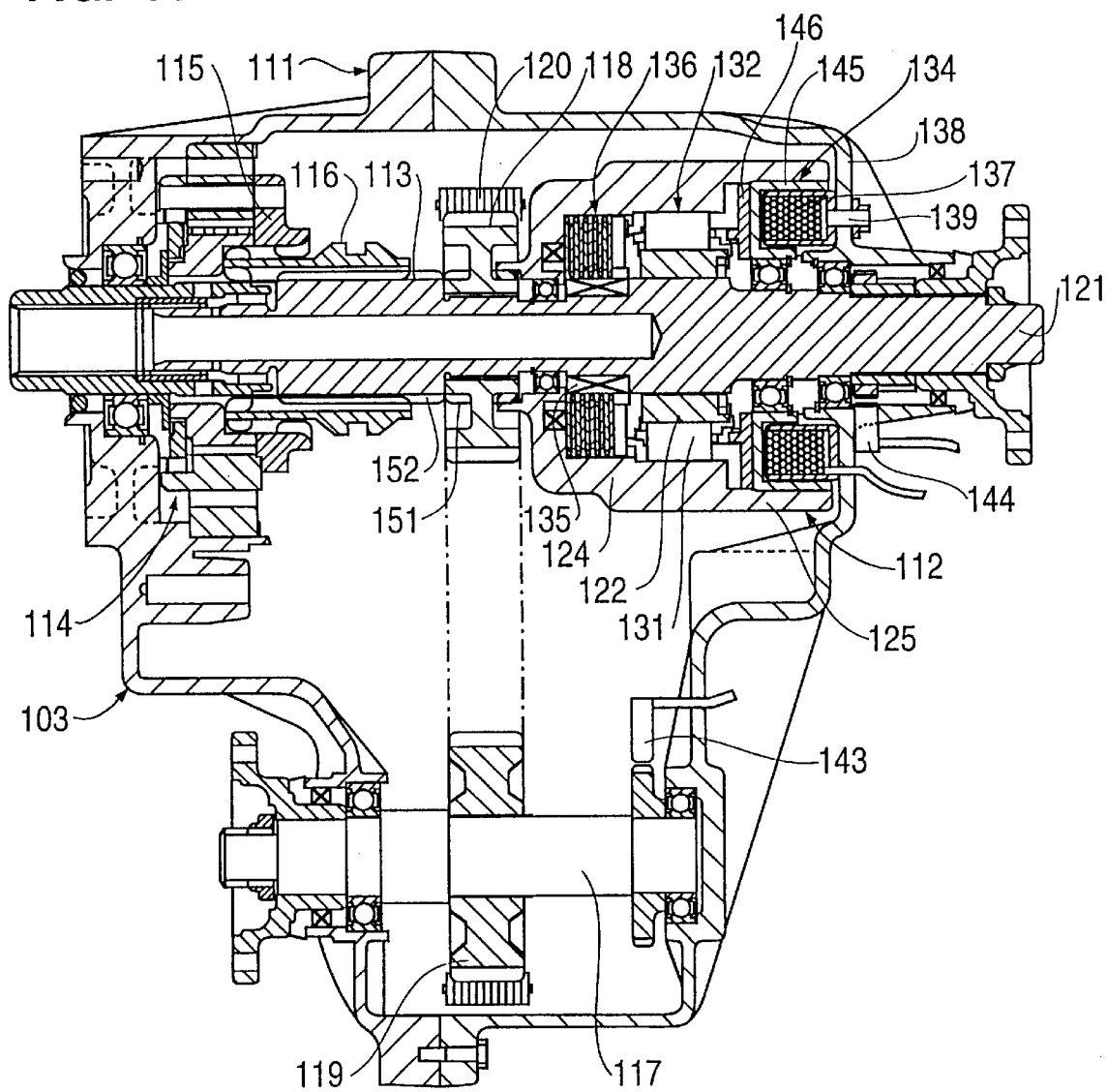
FIG. 44 is a sectional view of a transfer in which is mounted a rotation transmission device of the seventeenth embodiment.

FIG. 44 is a sectional view of the seventeenth embodiment of the rotation transmission device. As shown, sprockets and 152 are formed on the input shaft 121 and the sprocket 118 is coupled to the outer ring 125 of the rotation transmission device 112. When the driver selects 15 the 4WD low gear, the slide gear 116 moves to engage both sprockets 151 and 152, coupling the input shaft 121 and the sprocket 118. The front wheels 104 and the rear wheels 104a are thus coupled together through the sprockets, so that the engine power is not transmitted through the two-way clutch 132. In the 14th to 16th embodiments, it is necessary to keep the electromagnetic coil 137 of the rotation transmission device 112 energized during the 4WD locking mode. In the seventeenth embodiment, the electromagnetic coil 137 needs not be energized in this state, because the engine power is not transmitted through the rotation transmission device.

This arrangement is thus more economical.

In the seventeenth embodiment, when the 4WD low gear is selected, the rotating speed decreases and the torque increases correspondingly. But this large torque is not transmitted through the rotation transmission device. Thus, it is possible to use a rotation transmission device that is lower in permissible torque and thus more lightweight and compact.

Figure 45A:
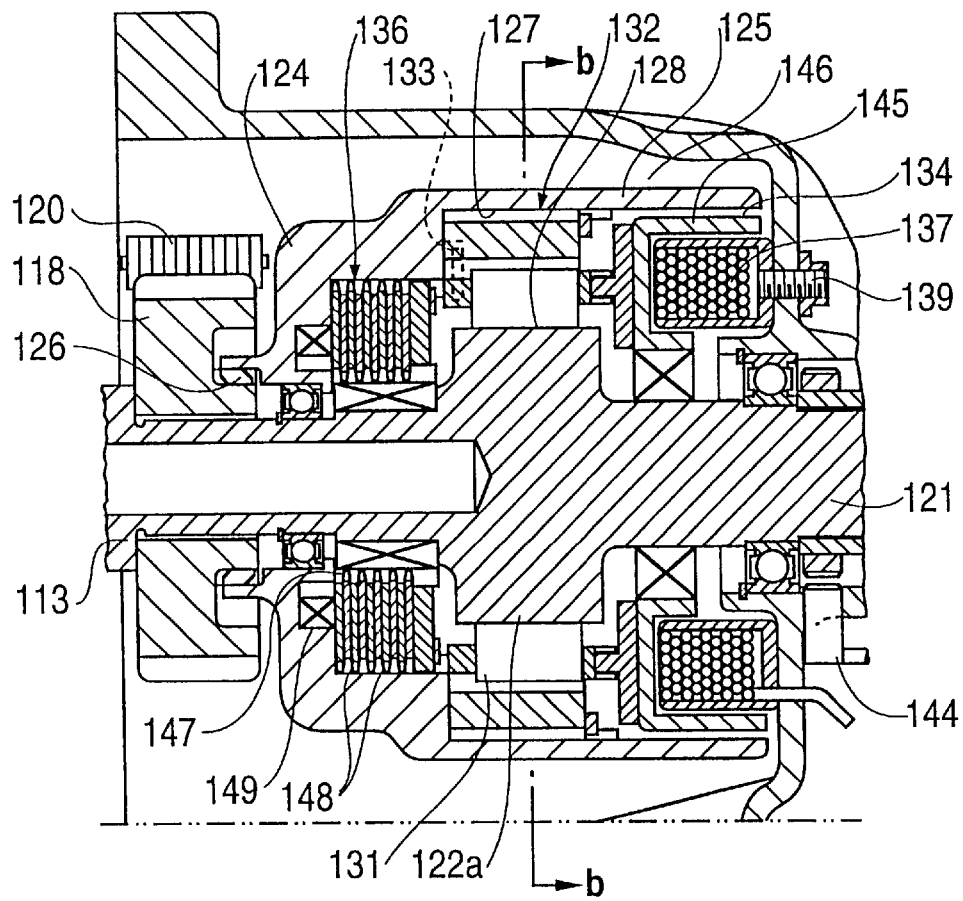
FIG. 45A is a partial enlarged sectional view of an alternate embodiment of the two-way clutch of the rotation transmission device.
Figure 45B:
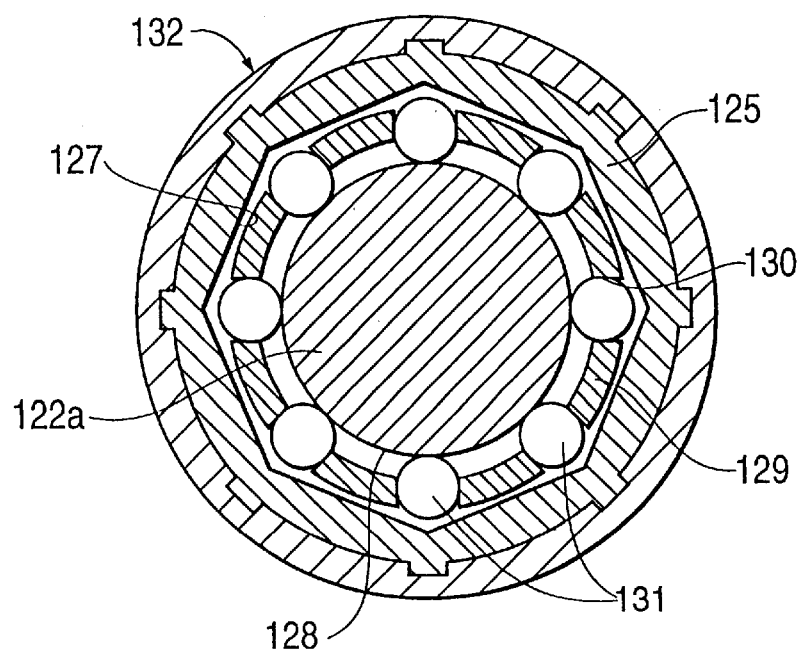
FIG. 45B is a sectional view taken along line b—b of FIG. 45A.

In any of the fourteenth to seventeenth embodiments, the two-way 10 clutch 132 may include an outer ring 125 with cam faces 127 having a polygonal section as a whole, and an inner ring 122a having a cylindrical outer face 128, as shown in FIGS. 45A and 45B. In this case, the retainer 129 and the inner ring 122a (which is an integral part of the input shaft 121 in the arrangement of FIG. 45) are pressed against each other by the electromagnetic clutch 134. Also, the rollers 131 of the two-way clutch 132 may be replaced by sprags.

In any of the fourteenth to seventeenth embodiments, the wet type multiple-disc clutch 136 is mounted between the input shaft 121 and the outer ring 125 in parallel to the two-way clutch 132. While the vehicle is traveling at a constant speed, the drive mode is maintained in the two-wheel (rear-wheel) drive position.

If one of the rear wheels slips while the vehicle accelerates, the electromagnetic clutch 134 is energized, and the two-way clutch 132 is locked. The drive mode thus changes to the four-wheel (4WD) drive position. When the engine brake is applied on a low-$\mu$ road, a portion of the engine braking torque is transmitted to the front wheels 104 not through the two-way clutch but through the wet type multiple-disc clutch 136.

The wet type multiple-disc clutch 136 includes discs that are always biased by a resilient member by a constant force, making it difficult for lubricating oil to penetrate into between the frictional surfaces. The life of the clutch 136 is thus short. Moreover, this constant-pressure type wet type multiple-disc clutch 136 applies dragging force between the front and rear wheels even while the vehicle is turning a corner. This makes the steering maneuver heavy and also is a potential cause of vehicle vibration. Also, this wet type multipledisc clutch 136 increases the axial length of the rotation transmission device.

Eighteenth Embodiment

The eighteenth embodiment shown in FIGS. 46–55 is free of these problems. In this embodiment, the wet type multiple-disc clutch 136 mounted in the rotation transmission device 112 of any of the fourteenth to seventeenth embodiments, is not used. Instead, engine braking torque is distributed to the front wheels 104 by electrically locking the two-way clutch 132. Without the clutch 136, the rotation transmission device of this embodiment is simpler more compact and less expensive.

Figure 46:
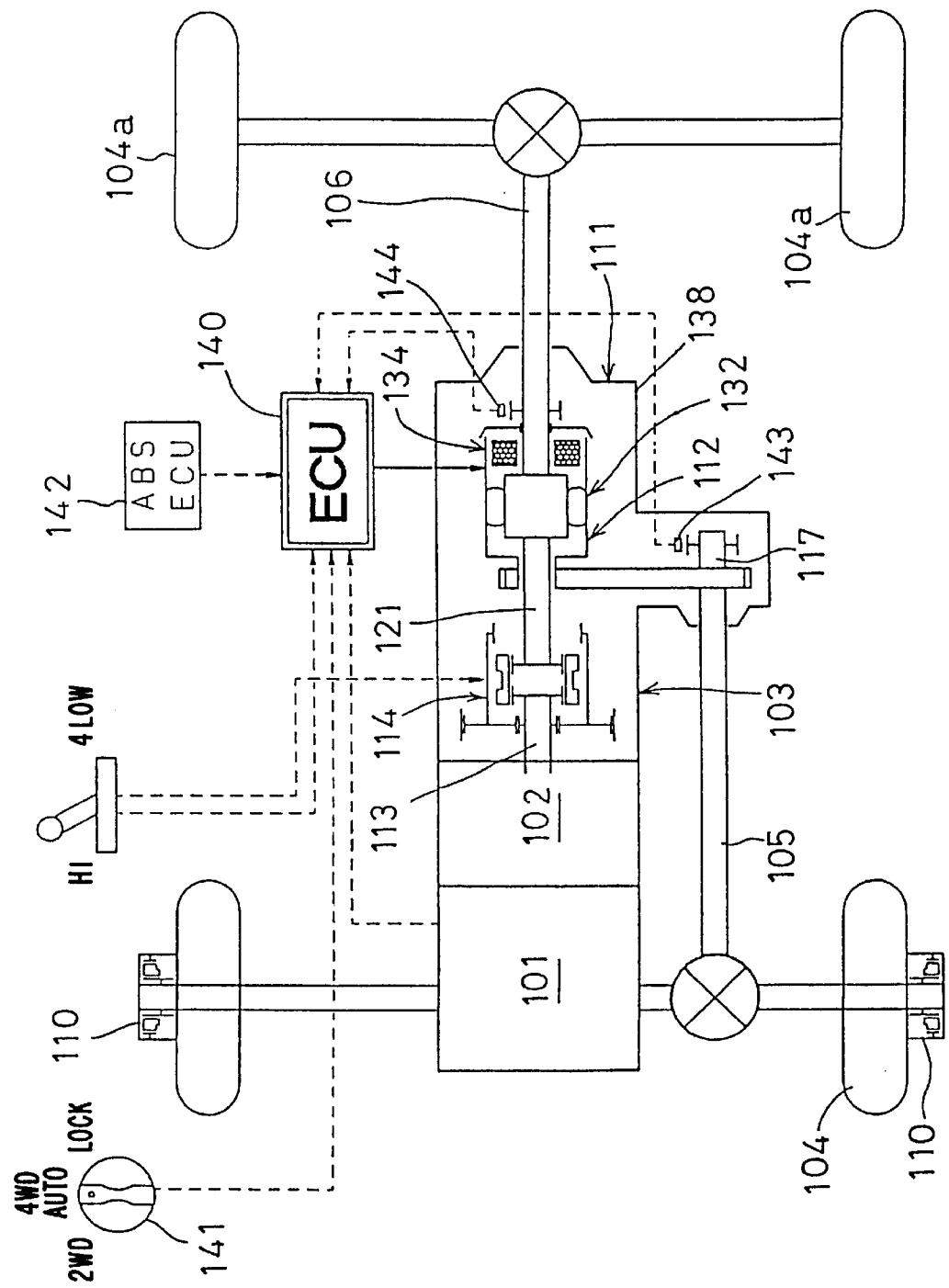
FIG. 46 is a plan view showing the layout of a 4WD car on which is mounted a rotation transmission device of the eighteenth embodiment.
Figure 47:
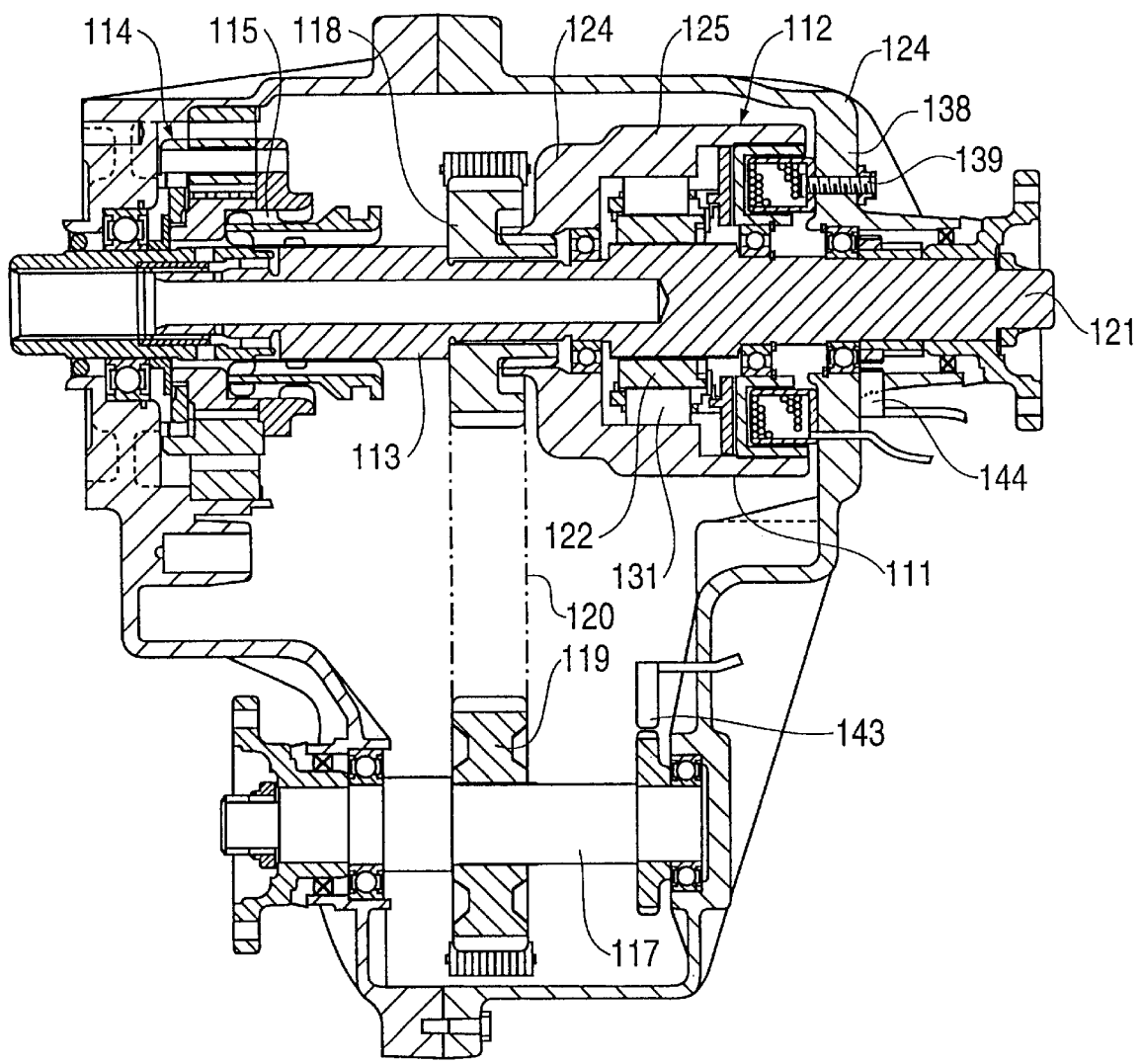
FIG. 47 is a sectional view of a transfer in which is mounted the rotation transmission device of the eighteenth embodiment.
Figure 48:
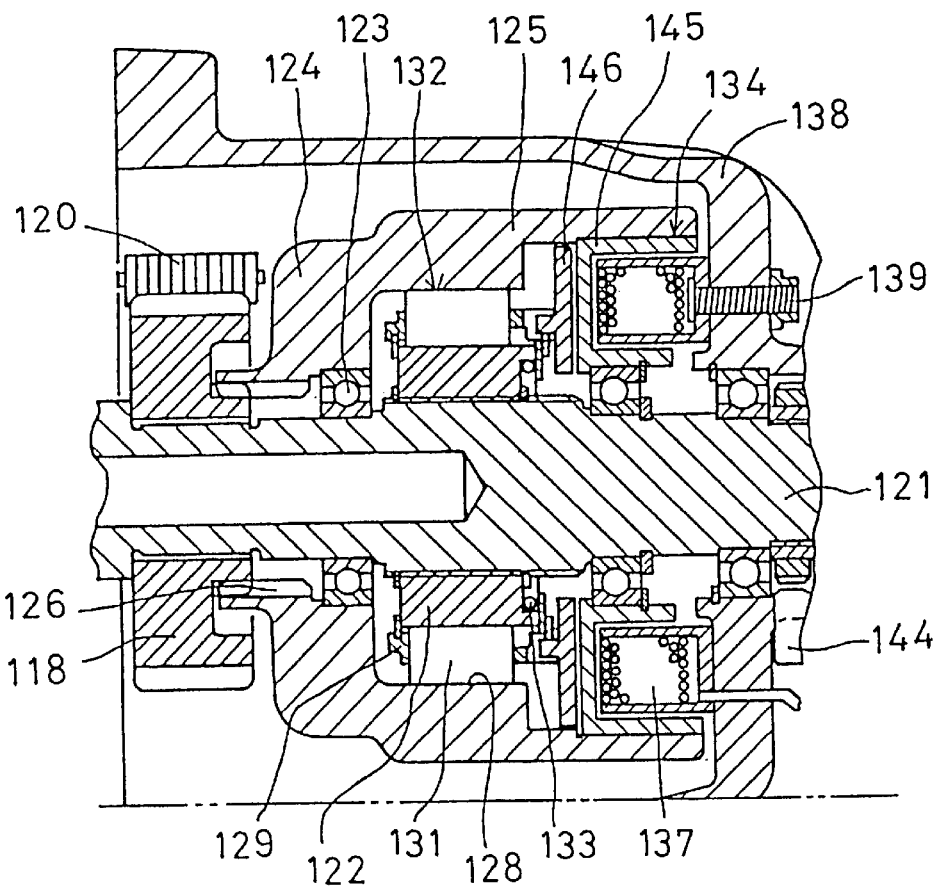
FIG. 48 is a partial enlarged sectional view of the rotation transmission device of FIG. 47.

FIG. 46 shows the layout of a 4WD in which the rotation transmission device 112 of the eighteenth embodiment is mounted. FIG. 47 is a section of a transfer which is the rotation transmission device of this embodiment. FIG. 48 shows the transfer in greater detail. Structurally, this embodiment is substantially the same as the fourteenth embodiment shown in FIGS. 31 and 32 except that it has no wet type multiple-disc clutch 136 inside the outer ring 125. The rotation transmission device 112 of this embodiment provides the vehicle with automatic 4WD control mode and locked 4WD mode in addition to the typical conventional part-time 4WD modes (2WD, 4WD-Hi and 4WD-Lo).

Referring to FIG. 47, the output from the transmission is transmitted through the high-low select gear train 114 to the rear propeller shaft 106. The high-low select gear 114 itself is conventional and includes a planetary gear set. Its high gear transmits the torque in a one-to-one relation, while the low gear reduces the rotation and thus increases the torque.

The rotation transmission device has an input shaft 121 connected to the rear propeller shaft 106, and an outer ring 125 coupled by serrations 126 to a chain sprocket 118 for distributing engine power to the front wheels. The sprocket 118 is rotatable relative to the input shaft 121.

The rotation transmission device further includes a cam ring 122 coupled to the input shaft 121 by serrations. The cam ring 122, the outer ring 125, and a retainer 129 and rollers 131 provided between the rings 122 and 125 form a two-way clutch 132.

As shown in FIG. 48, an electromagnetic coil 137 is nonrotatably fixed to a transfer case 138 by bolts 139. The coil 137 has electrodes passing through the transfer case 138 and connected to an external controller (hereinafter ECU) 140.

The ECU 140, shown in FIG. 46, receives signals indicating the rotating speeds of the front and rear wheels 104, 104a and signals from a mode selection switch 141 and an ABS ECU 142, and controls the current level supplied to the electromagnetic coil 137 based on these signals.

Figure 49:
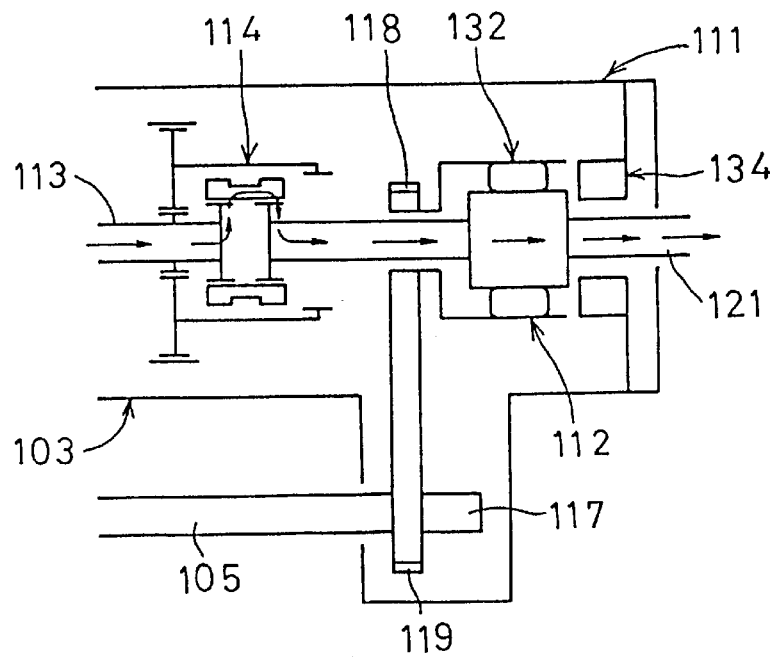
FIG. 49 is a view of the rotation transmission device of the eighteenth embodiment, showing how the driving force is transmitted during 2WD mode.

Now in operation, FIG. 49 shows the power transmission path while the vehicle is moving in a twowheel drive (2WD) position. Engine power is transmitted through the transmission and the high gear of the high-low select gear train 114 to the input shaft 121 of the rotation transmission device.

When the mode select switch 141 is in the two-wheel drive position, the electromagnetic coil 137 is deenergized, so that the two-way clutch 132 is held in the neutral position shown in FIG. 34. The input shaft 121 is-thus disconnected from the outer ring 125.

Figure 50:
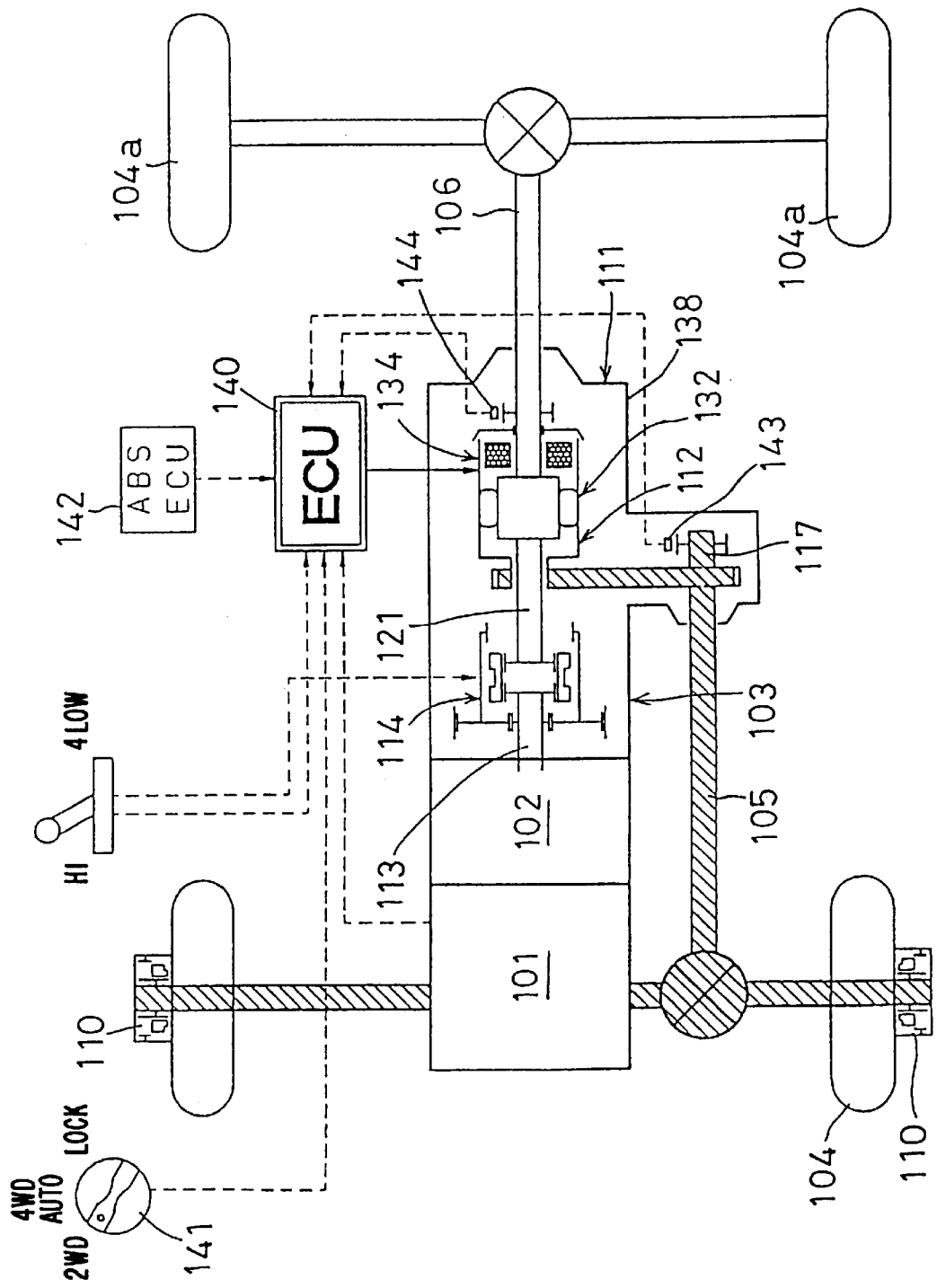
FIG. 50 is a plan view showing the layout while the vehicle is traveling in 2WD mode.

In this state, no engine force is delivered to the outer ring 125 and thus the front wheel drive train. Since the hub clutches 110 are also disengaged during the two-wheel drive mode, the front propeller shaft 105, front differential 109 and front drive shaft 108 do not rotate as shown in FIG. 50. This improves fuel economy.

Figure 51A:
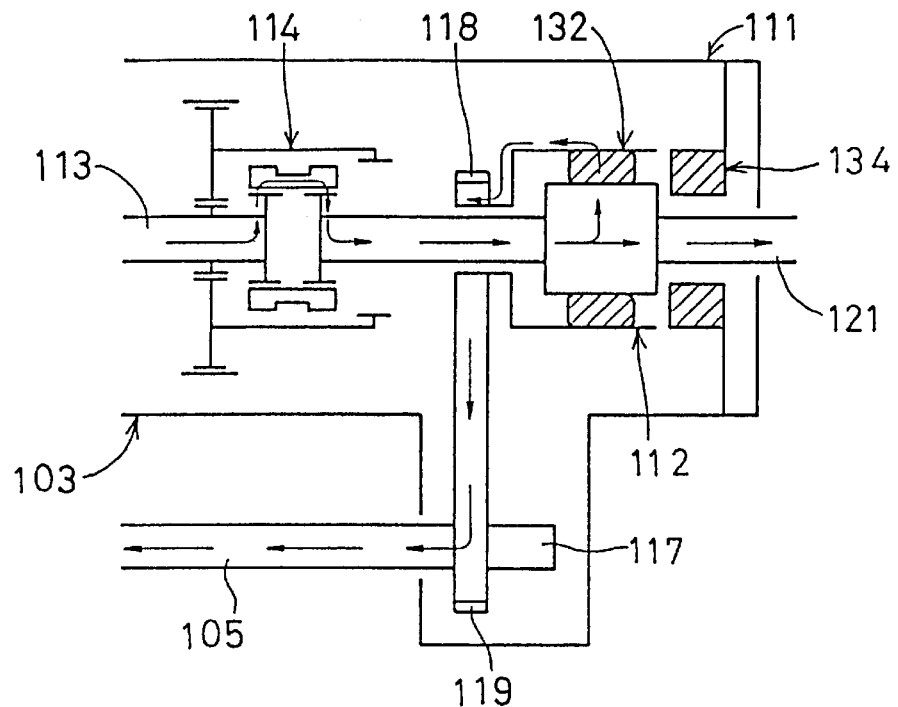
FIG. 51A is a view showing how the driving force is transmitted in 4WD-Hi position.

While the vehicle is moving with the drive mode in 4WD-Hi range locking position, engine power is distributed as shown in FIG. 51A. While the mode select switch 141 is in the locking position, the electromagnetic coil 137 is kept energized, so that the two-way clutch 132 is held in the position shown in FIG. 37A or 37B. In the position of FIG. 37A or 37B, the retainer 129 and the outer ring 125 are pressed against each other by the electromagnetic coil 137. Thus, when the input shaft 121 and the outer ring 125 rotate relative to each other, the rollers 131 will lock therebetween. The engine power transmitted from the transmission 102 through the high gear of the high-low select gear train 114 is thus distributed to the front wheels by the two-way clutch 132 of the rotation transmission device. All four vehicle wheels are now mechanically coupled together.

Figure 51B:
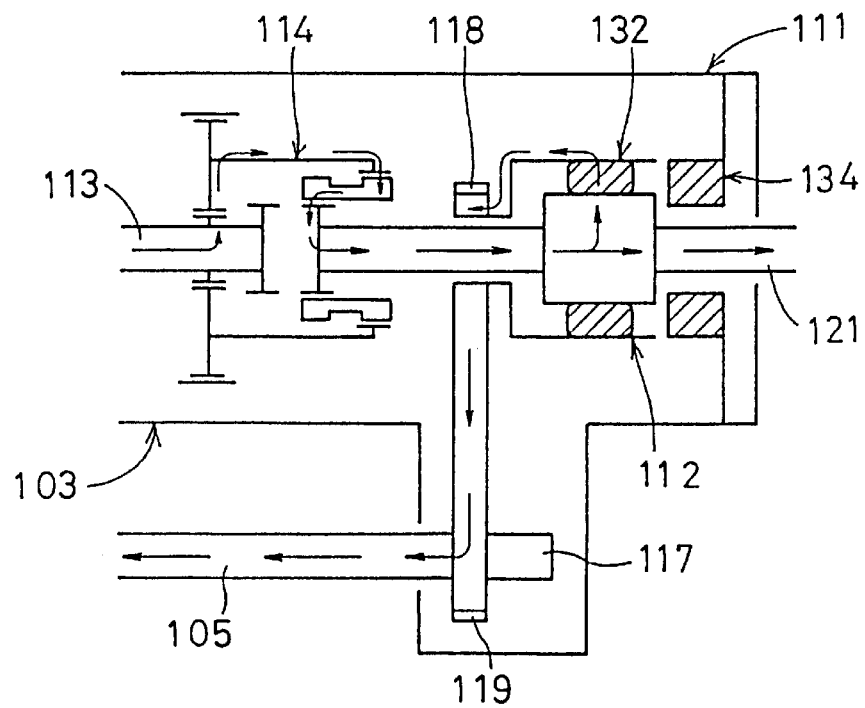
FIG. 51B is a view showing how the driving force is transmitted in 4WD-Lo position.

FIG. 51B shows how the engine power is distributed while the vehicle is moving with the drive mode in 4WD-Lo range locking position. Except that the engine power is transmitted through the low gear of the high-low select gear train 114, the operation of the rotation transmission device in the 4WD-Lo position is the same as in the 4WD-Hi position.

The control mode is now described. In the control mode, the power is transmitted through the high gear of the high-low select gear train to the input shaft 121 of the rotation transmission device.

Figure 52A:
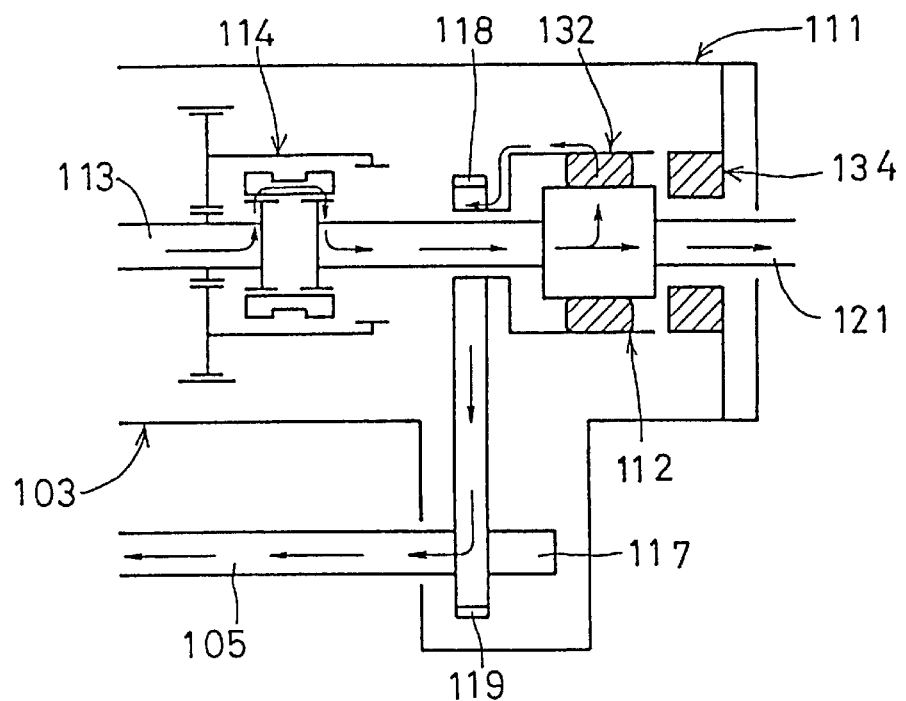
FIG. 52A is a view showing how the driving force is transmitted while the vehicle is accelerated with the driving mode in 4WD control position.

FIG. 52A shows how the engine power is distributed while the vehicle is accelerated in the control mode. If, in this state, one of the rear wheels slips e.g. while the vehicle accelerates on a slippery road so that the rotating speed of this rear wheel 104a (and the input shaft) exceeds that of the front wheels 104 (outer ring) by a predetermined value, the electromagnetic coil 137 is energized. The two-way clutch 132 thus locks, so that the engine power is transmitted through the clutch 132 to the front wheels.

Figure 52B:
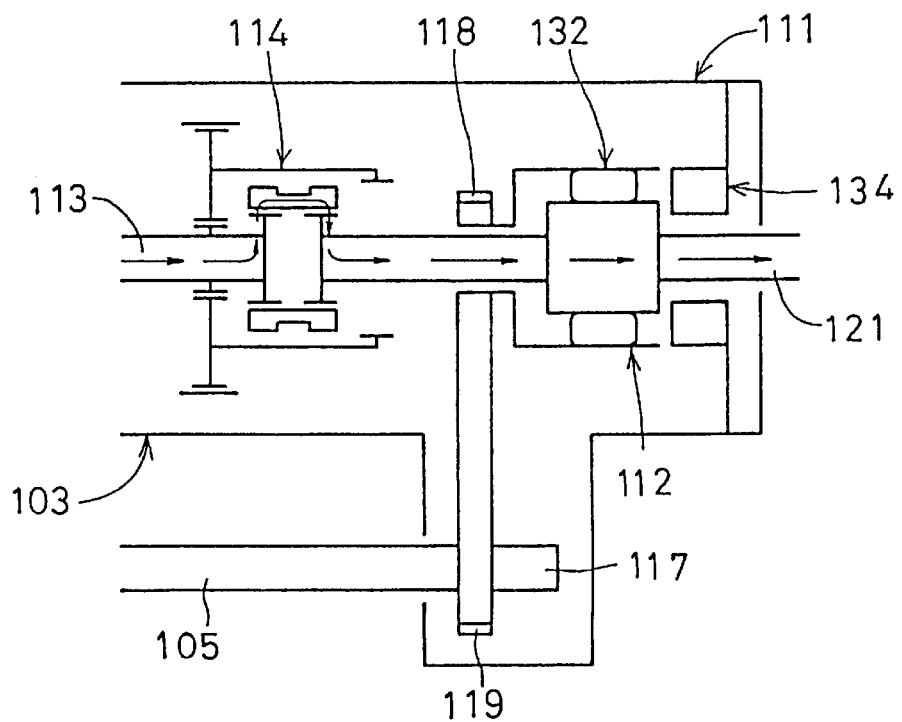
FIG. 52B is a view showing how the driving force is transmitted while the vehicle is turning a corner at a constant speed with the driving mode in 4WD control position.

FIG. 52B shows how the engine power is distributed in the control mode while the vehicle is traveling at a constant speed, or turning a corner.

While the vehicle is moving at a constant speed, the front and rear wheels are rotating at substantially the same speed. That is, the speed difference between the front and rear wheels are within the above predetermined value, so that the electromagnetic coil 137 remains deenergized, keeping the two-way clutch 132 disengaged. The engine power is thus not delivered to the front wheels 104.

When the engine brake is applied, the engine braking torque is transmitted through the input shaft 121 of the rotation transmission device to the rear wheels. If the vehicle is traveling on a high-$\mu$ road such as a dry paved road, a weak torque such as engine braking torque will not cause the rear wheels to slip. Thus, when the engine brake is applied while the vehicle is traveling on a high-$\mu$ road, the electromagnetic clutch 134 is not energized in this state (FIG. 53A), keeping the two-way clutch 132 unlocked. Thus, no tight corner braking phenomenon will occur.

Figure 53A:
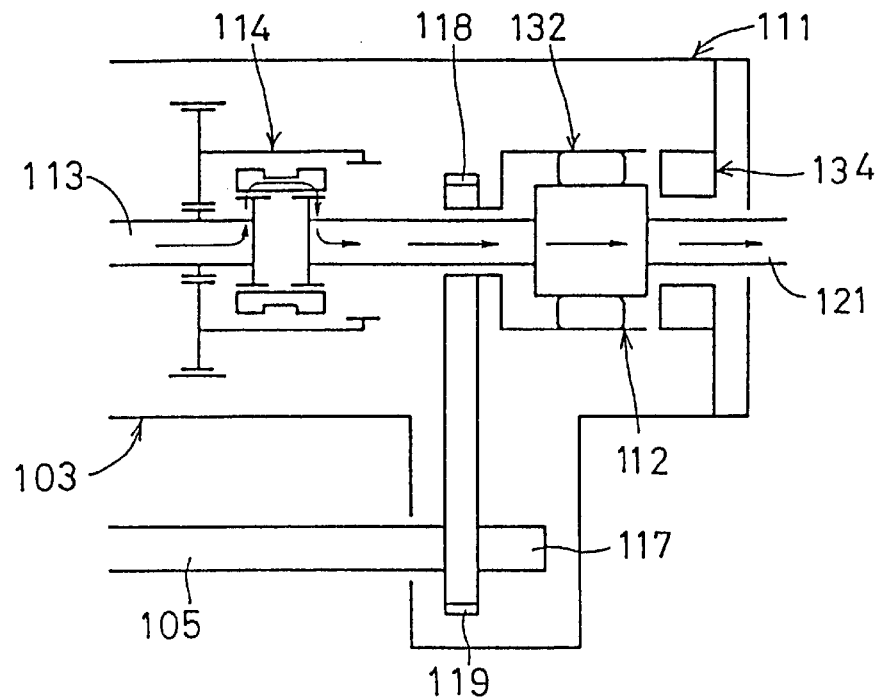
FIG. 53A is a view showing how the driving force is transmitted when the engine brake is applied on a high-$\mu$ road with the driving mode in 4WD control position.
Figure 53B:
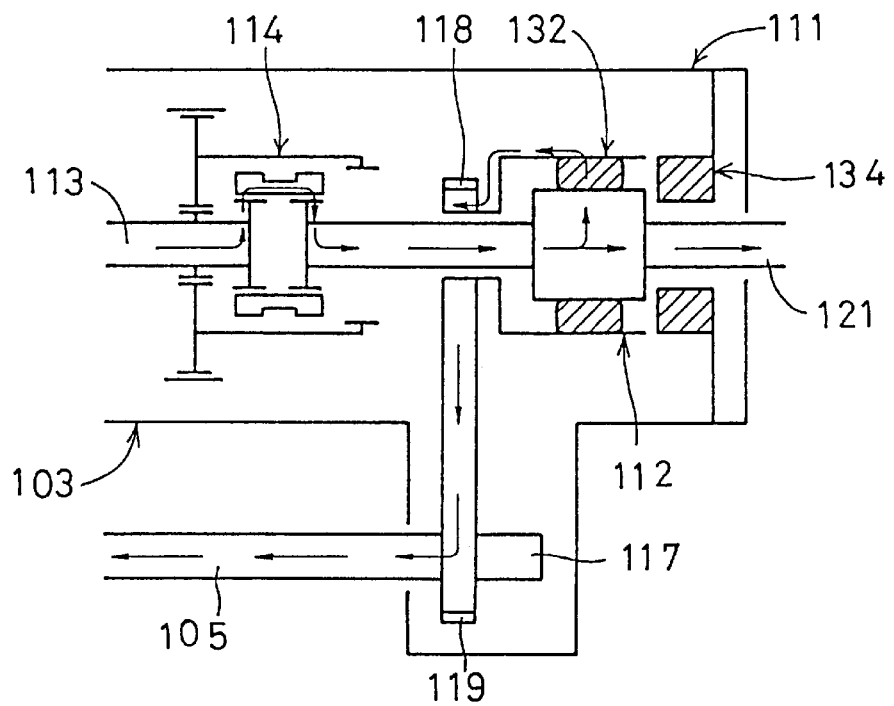
FIG. 53B is a view showing how the driving force is transmitted when the engine brake is applied on a low-$\mu$ road with the driving mode in 4WD control position.

But if the engine brake is applied while the vehicle is traveling on a low-$\mu$ road such as a snow-covered road, the rear wheels may slip and decelerate sharply to a nearly lockup state. If this happens, the electromagnetic coil 134 is energized to lock the two-way coil 132. This prevents the slipping of the rear wheels, because the engine braking torque is now partially distributed to the front wheels through the clutch 132. (FIG. 53B)

Figure 54:
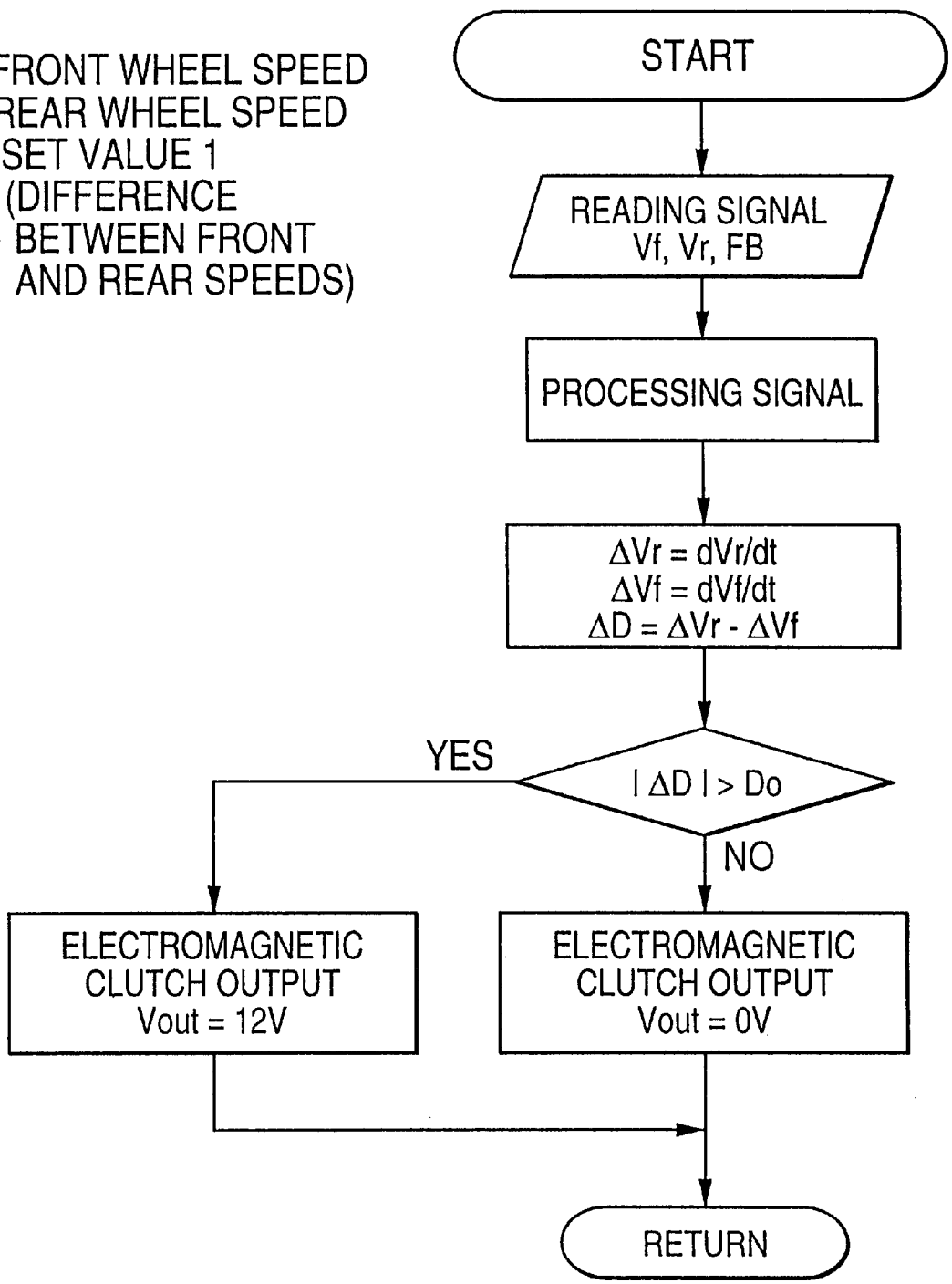
FIG. 54 is a flowchart showing how the antilock control is performed during engine braking.
Figure 55A:
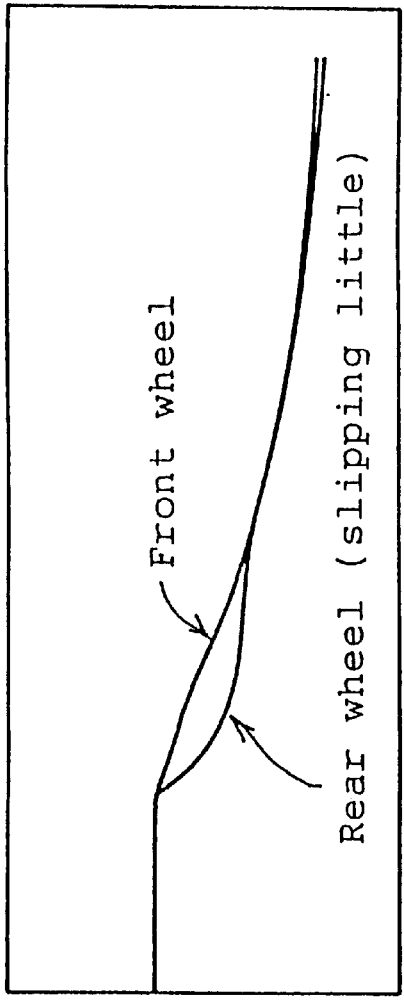
FIG. 55A to 55D show the wheel speeds when the engine brake is applied on a high-$\mu$ road, differences between wheel speed derivatives when the engine brake is applied on a a low-$\mu$ road, and differences between wheel speed derivatives when the engine brake is applied on a low-$\mu$ road, respectively.
Figure 55B:
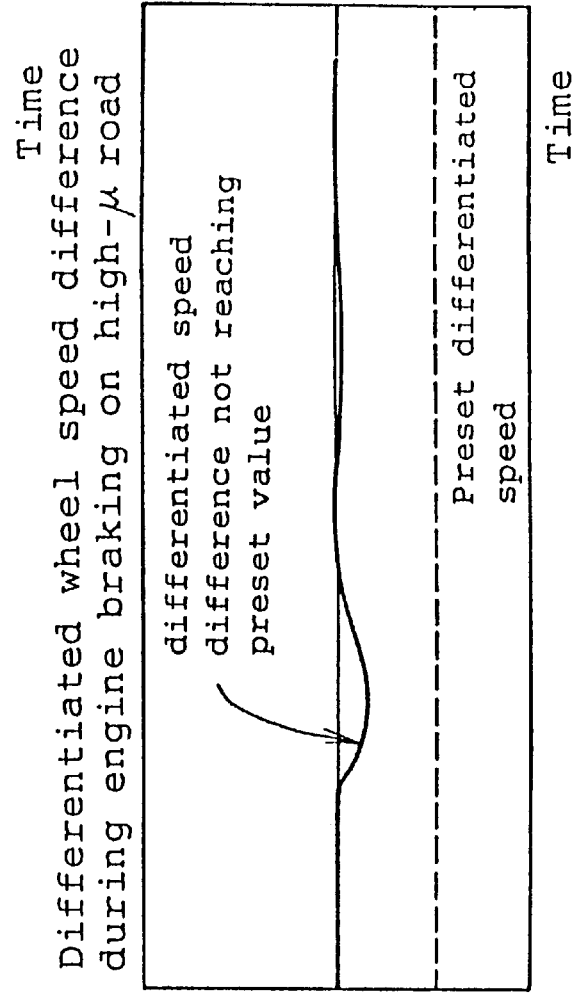
Figure 55C:
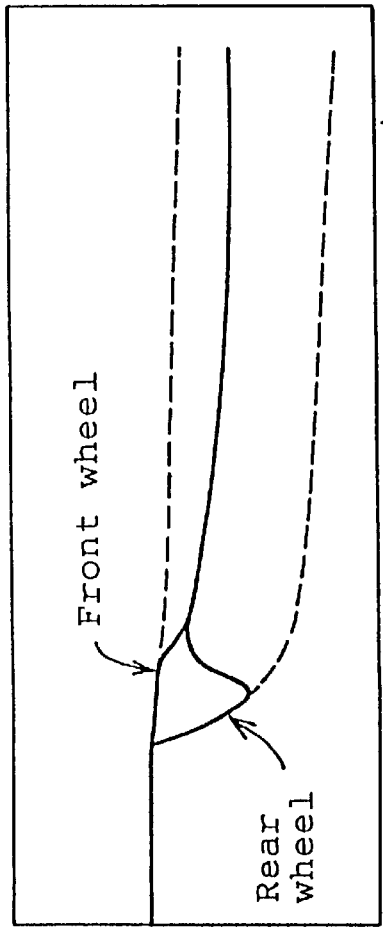
Figure 55D:
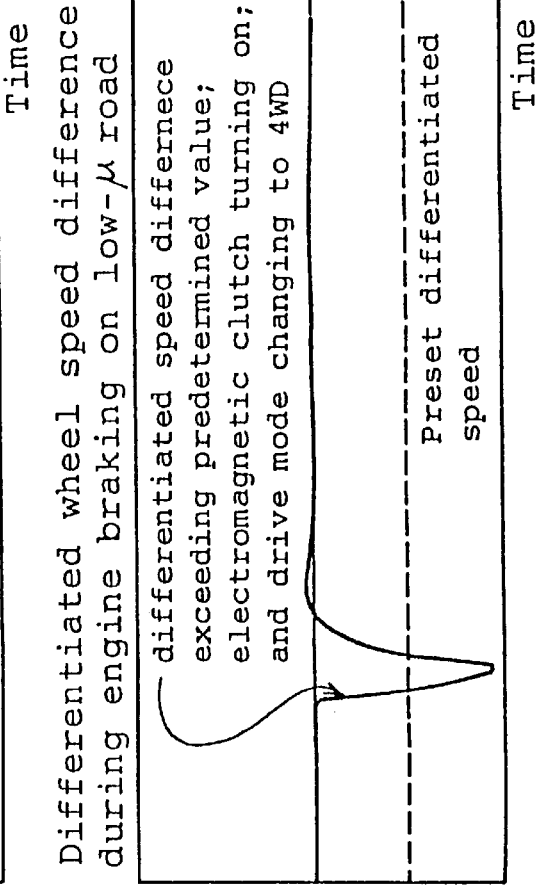

FIG. 54 is a flowchart showing the control steps during engine braking. While the engine brake is being applied, the ECU calculates the derivatives of the rotating speeds of the front wheels (outer ring) and the rear wheels (input shaft). If the rear wheels are slipping, at which time the deceleration of the rear wheels (derivative of the rear wheel speed) is greater than that of the front wheels (derivative of the front wheel speed), and the difference between the deceleration of the rear wheels and that of the front wheels is greater than a predetermined value, the two-way clutch 132 is locked to change the drive mode to the four-wheel drive position.

This condition can be expressed by the following formula.

$$|dV_R/dt - dV_F/dt| > D_1$$

$V_R$: Rear wheel speed
$V_F$: Front wheel speed
$D^1$: Set value

FIGS. 55A–55D show rotating speed waveforms and the derivatives of the rotating speeds of the front and rear wheels (decelerations of the front and rear wheels) when the engine brake is applied while the vehicle is traveling on a low-$\mu$ or high-$\mu$ road. If only the rear wheels slip on a low-$\mu$ road and the difference between the front and rear wheel derivatives exceeds the above predetermined value, the electromagnetic coil 134 is energized to change the drive mode to the four-wheel drive position, on a high-$\mu$ road, the rear wheels will rarely slip even when the engine brake is applied. Thus, the clutch remains deactivated, so that the two-wheel drive mode is maintained.

The two-way clutch 132 of this embodiment may include an outer ring with cam faces having a polygonal section as a whole, and an inner ring having a cylindrical outer face, as shown in FIG. 45B. In this case, the retainer and the inner ring (which is an integral part of the input shaft in the arrangement of FIG. 45B) are pressed against each other by the electromagnetic coil.

In any of the fourteenth to eighteenth embodiments, the outer ring 125 is an output member connected to the front wheels. However, the outer ring 125 may also be connected to the input shaft to input the engine power to the outer ring, with the inner ring coupled to the chain sprocket.

Also, the rotation transmission device may be mounted such that it can selectively transmit power between the front output shaft 117 and the front sprocket 119.

By mounting the rotation transmission device in the transfer, it is possible to minimize the inclination angle of the front propeller shaft and to reduce vehicle vibration while the vehicle is traveling.

The rotation transmission device provides 2-WD, locking and control modes, adding to the selectable control modes.

In the control mode, the rotation transmission device automatically changes the drive position between 2-WD and 4-WD irrespective of whether the vehicle is traveling on a high-$\mu$ road such as a paved road or a low-$\mu$ road such as a snow-covered road, thus promising the driver a comfortable and safe drive.

If one of the rear wheels slips due to engine braking, the two-way clutch is adapted to lock to distribute engine braking torque to all four wheels. Thus, a wet multiple-disc clutch is not necessary in this arrangement. This makes it possible to eliminate drawback on steering operations by a wet multiple-disc clutch. The vehicle can thus be driven smoothly both on a high-$\mu$ road and a low-$\mu$ road.

What is claimed:

1. An assembly to be located in a vehicle having a transmission and front and rear propeller shafts connected to the transmission, said assembly comprising:

a transfer case, adapted to be connected to the transmission, which includes an input shaft through which an output of the transmission can be transmitted to the rear propeller shaft and a portion of the output can be distributed to the front propeller shaft; and a rotation transmission mechanism, connected to said transfer case, which includes a two-way clutch, having engaging elements selected from the group consisting of: rollers and sprags, to selectively transmit torque between said input shaft and the front propeller shaft by engaging and disengaging said engaging elements, and an electromagnetic coil to engage and disengage said two-way clutch, thereby changing a drive mode between two-wheel drive and four-wheel drive positions, wherein said two-way clutch further comprises:

an inner member coaxially and nonrotatably coupled to said input shaft;

a chain sprocket coaxially and rotatably mounted on said input shaft;

an outer ring coaxially and nonrotatably coupled to said chain sprocket, one of said inner member and said outer ring comprising a cylindrical face and the other of said inner member and said outer ring comprising a plurality of cam faces, thereby forming a plurality of wedge-shaped spaces therebetween;

a retainer, located in said plurality of wedge-shaped spaces, having a plurality of pockets formed therein which contain said engaging elements;

a resilient member, engaged with said retainer and one of said inner member and said outer ring;

a friction flange fixed to one of said outer ring and said inner member; and an armature mounted to said retainer such that said armature is axially movable but nonrotatable with respect to said retainer, and such that said armature is responsive to a magnetic force produced by said electromagnetic coil to engage with said friction flange, thereby causing said inner member to engage with said outer ring.

2. The assembly as claimed in claim 1, wherein said resilient member maintains said engaging elements in a position in which said inner member is not engaged with said outer ring.

3. The assembly as claimed in claim 1, further comprising:

a control means for differentiating a vehicle rear wheel speed and a vehicle front wheel speed during vehicle deceleration, due to engine braking, and for controlling a current supplied to said electromagnetic coil according to differences between the differentiated vehicle rear wheel speed and the differentiated vehicle front wheel speed.

4. The assembly as claimed in claim 1, wherein:

said transfer case further comprises an input chain sprocket coaxially and rotatably mounted on said input shaft, and a slide gear mounted to said input shaft which selectively connects said input shaft to said input chain sprocket.

5. The assembly as claimed in claim 1, further comprising:

sensor means for detecting rotating speeds of the vehicle front and rear wheels or of the front and rear propeller shafts, which are thereby used to control a current supplied to said electromagnetic coil according to differences or changes in the rotating speeds of the vehicle front and rear wheels or of the front and rear propeller shafts.

6. The assembly as claimed in claim 1, further comprising:

a wet type multiple-disc clutch, located between one of said inner member and said input shaft and said outer ring and being in parallel with said two-way clutch, said wet type multiple-disc clutch having a plurality of first friction plates nonrotatably coupled to said one of said inner member and said input shaft, and a plurality of second friction plates nonrotatably coupled to said outer ring, said first plates being alternately provided between said second plates such that a friction torque may be produced between said first friction plates and said second friction plates.

7. The assembly as claimed in claim 6, further comprising:

a one-way clutch connecting one of said first friction plates and said second friction plates to said one of said inner member and said input shaft, such that said one-way clutch disengages when said one of said inner member and said input shaft rotates, relative to said outer ring, in the same direction in which vehicle wheels are rotating, while the vehicle moves forward.

8. The assembly as claimed in claim 6, wherein said transfer case further comprises:

an output shaft coupled to the front propeller shaft;

an output chain sprocket mounted to the front propeller shaft; and a dog clutch mounted between said output shaft and said output chain sprocket to disengage the front propeller during two-wheel drive mode.

9. The assembly as claimed in claim 6, wherein:

said transfer case further comprises a dog clutch mounted between said outer ring and said chain sprocket to disengage the front propeller shaft during a two-wheel drive mode.

10. The assembly as claimed in claim 1, further comprising:

a wet type multiple-disc clutch, located between one of said inner member and said input shaft and said outer ring and being in parallel with said two-way clutch, said wet type multiple-disc clutch having a plurality of first friction plates nonrotatably coupled to said one of said inner member and said input shaft, and a plurality of second friction plates nonrotatably coupled to said outer ring, said first plates being alternately disposed between said second plates such that a friction torque may be produced between said first friction plates and said second friction plates.

11. The assembly as claimed in claim 10, further comprising:

a one-way clutch connecting one of said first friction plates and said second friction plates to said one of said inner member and said input shaft, such that said one-way clutch disengages when said one of said inner member and said input shaft rotates, relative to said outer ring, in the same direction in which vehicle wheels are rotating, while the vehicle moves forward.

12. The assembly as claimed in claim 10, wherein said transfer case further comprises:

an output shaft coupled to the front propeller shaft;

an output chain sprocket mounted to the front propeller shaft; and a dog clutch mounted between said output shaft and said output chain sprocket to disengage the front propeller during two-wheel drive mode.

13. The assembly as claimed in claim 10, wherein:

said transfer case further comprises a dog clutch mounted between said outer ring and said chain sprocket to disengage the front propeller shaft during a two-wheel drive mode.

14. The assembly as claimed in claim 1, further comprising:

a control means for differentiating a vehicle rear wheel speed and a vehicle front wheel speed during vehicle deceleration, due to engine braking, and for controlling a current supplied to said electromagnetic coil according to differences between the differentiated vehicle rear wheel speed and the differentiated vehicle front wheel speed.

15. The assembly as claimed in claim 1, wherein:

said transfer case further comprises an input chain sprocket coaxially and rotatably mounted on said input shaft, and a slide gear mounted to said input shaft which selectively connects said input shaft to said input chain sprocket.

16. The assembly as claimed in claim 1, further comprising:

sensor means for detecting rotating speeds of the vehicle front and rear wheels or of the front and rear propeller shafts, which are thereby used to control a current supplied to said electromagnetic coil according to differences or changes in the rotating speeds of the vehicle front and rear wheels or of the front and rear propeller shafts.

17. An assembly to be located in a vehicle having a transmission and front and rear propeller shafts connected to the transmission, said assembly comprising:

a transfer case, adapted to be connected to the transmission, which includes an input shaft through which an output of the transmission can be transmitted to the rear propeller shaft and a portion of the output can be distributed to the front propeller shaft; and a rotation transmission mechanism, connected to said transfer case, which includes a two-way clutch, having engaging elements selected from the group consisting of: rollers and sprags, to selectively transmit torque between said input shaft and the front propeller shaft by engaging and disengaging said engaging elements, and an electromagnetic coil to engage and disengage said two-way clutch, thereby changing a drive mode between two-wheel drive and four-wheel drive positions, wherein said two-way clutch further comprises:

an outer ring coaxially and nonrotatably coupled to said input shaft;

a chain sprocket coaxially and rotatably mounted on said input shaft;

an inner member coaxially and nonrotatably coupled to said chain sprocket, one of said inner member and said outer ring comprising a cylindrical face and the other of said inner member and said outer ring comprising a plurality of cam faces, thereby forming a plurality of wedge-shaped spaces therebetween;

a retainer, located in said plurality of wedge-shaped spaces, having a plurality of pockets formed therein which contain said engaging elements;

a resilient member engaged with said retainer and one of said inner member and said outer ring;

a friction flange fixed to one of said outer ring and said inner member; and an armature mounted to said retainer such that said armature is axially movable but nonrotatable with respect to said retainer, and such that said armature is responsive to a magnetic force produced by said electromagnetic coil to engage with said friction flange, thereby causing said inner member to engage with said outer ring.

18. The assembly as claimed in claim 17, further comprising:

a control means for differentiating a vehicle rear wheel speed and a vehicle front wheel speed during vehicle deceleration, due to engine braking, and for controlling a current supplied to said electromagnetic coil according to differences between the differentiated vehicle rear wheel speed and the differentiated vehicle front wheel speed.

19. The assembly as claimed in claim 17, wherein:

said transfer case further comprises an input chain sprocket coaxially and rotatably mounted on said input shaft, and a slide gear mounted to said input shaft which selectively connects said input shaft to said input chain sprocket.

20. The assembly as claimed in claim 21, wherein:

said transfer case further comprises a dog clutch mounted between said outer ring and said chain sprocket to disengage the front propeller shaft during a two-wheel drive mode.

21. The assembly as claimed in claim 17, further comprising:

a wet type multiple-disc clutch, located between one of said inner member and said input shaft and said outer ring and being in parallel with said two-way clutch, said wet type multiple-disc clutch having a plurality of first friction plates nonrotatably coupled to said one of said inner member and said input shaft, and a plurality of second friction plates nonrotatably coupled to said outer ring, said first plates being alternately provided between said second plates such that a friction torque may be produced between said first friction plates and said second friction plates.

22. The assembly as claimed in claim 21, further comprising:

a one-way clutch connecting one of said first friction plates and said second friction plates to said one of said inner member and said input shaft, such that said one-way clutch disengages when said one of said inner member and said input shaft rotates, relative to said outer ring, in the same direction in which vehicle wheels are rotating, while the vehicle moves forward.

23. The assembly as claimed in claim 21, wherein said transfer case further comprises:

an output shaft coupled to the front propeller shaft;

an output chain sprocket mounted to the front propeller shaft; and a dog clutch mounted between said output shaft and said output chain sprocket to disengage the front propeller shaft during two-wheel drive mode.

24. The assembly as claimed in claim 17, further comprising:

sensor means for detecting rotating speeds of the vehicle front and rear wheels or of the front and rear propeller shafts, which are thereby used to control a current supplied to said electromagnetic coil according to differences or changes in the rotating speeds of the vehicle front and rear wheels or of the front and rear propeller shafts.

* * * * *